United States Patent
Kovacs

(10) Patent No.: US 10,215,619 B1
(45) Date of Patent: Feb. 26, 2019

(54) SCALE-BASED TIME SYNCHRONY

(71) Applicant: Physiowave, Inc., Santa Clara, CA (US)

(72) Inventor: Gregory T. Kovacs, Palo Alto, CA (US)

(73) Assignee: Physiowave, Inc., Menlo Park, CA (US)

( * ) Notice: Subject to any disclaimer, the term of this patent is extended or adjusted under 35 U.S.C. 154(b) by 184 days.

(21) Appl. No.: 15/257,569

(22) Filed: Sep. 6, 2016

(51) Int. Cl.
*G01G 19/50* (2006.01)
*G01G 23/36* (2006.01)
*H04W 56/00* (2009.01)
*H04W 12/08* (2009.01)
*H04W 76/14* (2018.01)

(52) U.S. Cl.
CPC .............. *G01G 19/50* (2013.01); *G01G 23/36* (2013.01); *H04W 12/08* (2013.01); *H04W 56/005* (2013.01); *H04W 76/14* (2018.02)

(58) Field of Classification Search
CPC .... G01G 19/50; G01G 23/36; G01G 23/3728; H04W 56/005
See application file for complete search history.

(56) References Cited

U.S. PATENT DOCUMENTS

| | | | |
|---|---|---|---|
| 3,702,113 A | 11/1972 | Blockley et al. | |
| 4,195,643 A | 4/1980 | Pratt, Jr. | |
| 4,362,164 A | 12/1982 | Little et al. | |
| 4,557,271 A | 12/1985 | Stoller et al. | |
| 4,657,025 A | 4/1987 | Orlando | |
| 4,679,569 A | 7/1987 | Lee | |
| 4,765,321 A | 8/1988 | Mohri | |
| 4,836,215 A | 6/1989 | Lee | |
| 4,898,182 A | 2/1990 | Hawkins et al. | |
| 4,947,857 A | 8/1990 | Albert et al. | |
| 4,958,638 A | 9/1990 | Sharpe et al. | |
| 5,314,389 A | 5/1994 | Dotan | |
| 5,431,170 A | 7/1995 | Mathews | |
| 5,620,003 A | 4/1997 | Sepponen | |
| 5,678,562 A | 10/1997 | Sellers | |
| 5,682,902 A | 11/1997 | Herleikson | |
| 5,701,894 A | 12/1997 | Cherry et al. | |
| 5,750,937 A | 5/1998 | Johnson et al. | |
| 5,782,238 A | 7/1998 | Beitler | |

(Continued)

*Primary Examiner* — Natalie Huls
(74) *Attorney, Agent, or Firm* — Crawford Maunu PLLC

(57) ABSTRACT

Certain aspects of the disclosure are directed to an apparatus including a weighing-scale platform, housing, and a plurality of sensors and sensor-data processing to collect a first set of physiological data while the user is standing on the platform. The first set of has an accuracy component that is dependent on or defined using a time-based interval or time-based metric. The apparatus further includes data-assimilation circuitry to provide synchronization by accessing a profile having information for identifying the user, accessing an indication of the time interval or metric derived from the first set of physiological data specific to the user, identifying a peripheral device including physiological-measuring circuitry with a second set of physiological data, the second set of physiological data being from and specific to the user, and while accounting for the time-based inaccuracies, comparing aspects of the first and second sets of physiological data.

24 Claims, 35 Drawing Sheets

(56) References Cited

U.S. PATENT DOCUMENTS

| | | | |
|---|---|---|---|
| 5,833,623 A | 11/1998 | Mann et al. | |
| 6,047,203 A | 4/2000 | Sackner et al. | |
| 6,080,110 A | 6/2000 | Thorgersen | |
| 6,168,563 B1 | 1/2001 | Brown | |
| 6,198,394 B1 | 3/2001 | Jacobsen et al. | |
| 6,205,547 B1 | 3/2001 | Davis | |
| 6,228,033 B1 | 5/2001 | Koobi et al. | |
| 6,292,690 B1 | 9/2001 | Petrucelli | |
| 6,331,162 B1 | 12/2001 | Mitchell | |
| 6,454,708 B1 | 9/2002 | Ferguson et al. | |
| 6,454,719 B1 | 9/2002 | Greenhut | |
| 6,516,221 B1 | 2/2003 | Hirouchi et al. | |
| 6,551,252 B2 | 4/2003 | Sackner et al. | |
| 6,594,759 B1 | 7/2003 | Wang | |
| 6,640,134 B2 | 10/2003 | Raymond et al. | |
| 6,685,634 B1 | 2/2004 | Fry | |
| 6,702,754 B2 | 3/2004 | Ogura et al. | |
| 6,705,990 B1 | 3/2004 | Gallant | |
| 6,734,856 B2 | 5/2004 | Ishikawa et al. | |
| 6,755,783 B2 | 6/2004 | Cosentino et al. | |
| 6,783,498 B2 | 8/2004 | Sackner et al. | |
| 6,790,178 B1 | 9/2004 | Mault et al. | |
| 6,814,705 B2 | 11/2004 | Kawaguchi | |
| 6,847,892 B2 | 1/2005 | Zhou et al. | |
| 6,875,174 B2 | 4/2005 | Braun et al. | |
| 6,898,299 B1 | 5/2005 | Brooks | |
| 6,962,566 B2 | 11/2005 | Quistgaard et al. | |
| 6,963,035 B2 | 11/2005 | Honda et al. | |
| 7,137,955 B2 | 11/2006 | Bartels et al. | |
| 7,257,438 B2 | 8/2007 | Kinast | |
| 7,313,435 B2 | 12/2007 | Nakada et al. | |
| 7,316,648 B2 | 1/2008 | Kelly et al. | |
| 7,336,266 B2 | 2/2008 | Hayward et al. | |
| 7,382,247 B2 | 6/2008 | Welch et al. | |
| 7,384,410 B2 | 6/2008 | Eggers et al. | |
| 7,417,536 B2 | 8/2008 | Lakshmanan et al. | |
| 7,459,644 B2 | 12/2008 | Kenmochi | |
| 7,502,643 B2 | 3/2009 | Farringdon et al. | |
| 7,593,632 B2 | 9/2009 | Schnell | |
| 7,668,588 B2 | 2/2010 | Kovacs | |
| 7,787,946 B2 | 8/2010 | Stahmann et al. | |
| 7,796,013 B2 | 9/2010 | Murakami et al. | |
| 7,846,104 B2 | 12/2010 | MacQuarrie et al. | |
| 7,899,522 B1 | 3/2011 | Koh et al. | |
| 8,200,320 B2 | 6/2012 | Kovacs | |
| 8,332,026 B2 | 12/2012 | Cha et al. | |
| 8,369,936 B2 | 2/2013 | Farringdon et al. | |
| 8,452,390 B2 | 5/2013 | Jensen | |
| 8,473,041 B2 | 6/2013 | Bartnik et al. | |
| 8,475,367 B1 | 7/2013 | Yuen et al. | |
| 8,475,368 B2 | 7/2013 | Tran et al. | |
| 8,529,409 B1 | 9/2013 | Lesea-Ames | |
| 8,548,556 B2 | 10/2013 | Jensen | |
| 8,639,226 B2 | 1/2014 | Hutchings et al. | |
| 8,682,424 B2 | 3/2014 | Tsoglin et al. | |
| 8,698,014 B1 | 4/2014 | Walstad | |
| 8,858,449 B2 | 10/2014 | Inan et al. | |
| 8,870,780 B2 | 10/2014 | Inan et al. | |
| 9,011,346 B2 | 4/2015 | Wiard et al. | |
| 9,055,871 B2 | 6/2015 | Inan et al. | |
| 9,215,991 B2 | 12/2015 | Inan et al. | |
| 9,241,637 B2 | 1/2016 | Wiard et al. | |
| 9,546,898 B2 * | 1/2017 | Kovacs | G01G 19/44 |
| 9,568,354 B2 * | 2/2017 | Kovacs | G01G 19/44 |
| 9,571,907 B2 * | 2/2017 | Slack | H04Q 9/02 |
| 9,649,039 B1 * | 5/2017 | Brady | A61B 5/02416 |
| 9,674,707 B2 * | 6/2017 | Boettcher | H04W 12/08 |
| 9,677,928 B2 * | 6/2017 | Lightstone | G01G 19/50 |
| 9,782,122 B1 * | 10/2017 | Pulliam | A61B 5/4824 |
| 2001/0030546 A1 | 10/2001 | Yamada et al. | |
| 2001/0044588 A1 | 11/2001 | Mault | |
| 2002/0002326 A1 | 1/2002 | Causey, III et al. | |
| 2002/0062090 A1 | 5/2002 | Chai et al. | |
| 2002/0188205 A1 | 12/2002 | Mills | |
| 2003/0050537 A1 | 3/2003 | Wessel | |
| 2003/0088196 A1 | 5/2003 | Steve | |
| 2003/0126593 A1 | 7/2003 | Mault | |
| 2003/0130567 A1 | 7/2003 | Mault et al. | |
| 2003/0130595 A1 | 7/2003 | Mault | |
| 2003/0149349 A1 | 8/2003 | Jensen | |
| 2003/0197614 A1 | 10/2003 | Smith et al. | |
| 2003/0233034 A1 | 12/2003 | Varri et al. | |
| 2004/0068379 A1 | 4/2004 | Morgan et al. | |
| 2004/0073127 A1 | 4/2004 | Istvan et al. | |
| 2004/0097802 A1 | 5/2004 | Cohen | |
| 2004/0138517 A1 | 7/2004 | Osorio et al. | |
| 2004/0211599 A1 | 10/2004 | Kasinoff | |
| 2004/0249258 A1 | 12/2004 | Tupin, Jr. et al. | |
| 2005/0004483 A1 | 1/2005 | Lin | |
| 2005/0017602 A1 | 1/2005 | Arms et al. | |
| 2005/0033124 A1 | 2/2005 | Kelly et al. | |
| 2005/0043645 A1 | 2/2005 | Ono et al. | |
| 2005/0113703 A1 | 5/2005 | Farringdon et al. | |
| 2005/0119711 A1 | 6/2005 | Cho et al. | |
| 2005/0171451 A1 | 8/2005 | Yeo et al. | |
| 2005/0203349 A1 | 9/2005 | Nanikashvili | |
| 2005/0206518 A1 | 9/2005 | Welch et al. | |
| 2005/0215868 A1 | 9/2005 | Kenjou et al. | |
| 2005/0247494 A1 | 11/2005 | Montagnino | |
| 2005/0283198 A1 | 12/2005 | Haubrich et al. | |
| 2006/0049955 A1 | 3/2006 | Blum et al. | |
| 2006/0079942 A1 | 4/2006 | Deno et al. | |
| 2006/0106646 A1 | 5/2006 | Squilla et al. | |
| 2006/0111641 A1 | 5/2006 | Manera et al. | |
| 2006/0116589 A1 | 6/2006 | Park | |
| 2006/0122525 A1 | 6/2006 | Shusterman | |
| 2006/0149139 A1 | 7/2006 | Bonmassar et al. | |
| 2006/0154642 A1 | 7/2006 | Scannell | |
| 2006/0155589 A1 | 7/2006 | Lane et al. | |
| 2007/0055324 A1 | 3/2007 | Thompson et al. | |
| 2007/0069887 A1 | 3/2007 | Welch et al. | |
| 2007/0161913 A1 | 7/2007 | Farrell et al. | |
| 2007/0167286 A1 | 7/2007 | Roes | |
| 2007/0197878 A1 | 8/2007 | Shklarski | |
| 2007/0208232 A1 | 9/2007 | Kovacs | |
| 2007/0208233 A1 | 9/2007 | Kovacs | |
| 2007/0287928 A1 | 12/2007 | Kiviniemi et al. | |
| 2007/0293770 A1 | 12/2007 | Bour et al. | |
| 2008/0027679 A1 | 1/2008 | Shklarski | |
| 2008/0073128 A1 | 3/2008 | Umemoto | |
| 2008/0154645 A1 | 6/2008 | Takehara | |
| 2008/0161700 A1 | 7/2008 | Sachanandani et al. | |
| 2008/0183090 A1 | 7/2008 | Farringdon et al. | |
| 2008/0194975 A1 | 8/2008 | MacQuarrie et al. | |
| 2008/0208009 A1 | 8/2008 | Shklarski | |
| 2008/0221404 A1 | 9/2008 | Tso | |
| 2008/0246629 A1 | 10/2008 | Tsui et al. | |
| 2008/0281222 A1 | 11/2008 | Fukada | |
| 2008/0306393 A1 | 12/2008 | Ting et al. | |
| 2009/0016582 A1 | 1/2009 | Penn et al. | |
| 2009/0024044 A1 | 1/2009 | Virtanen et al. | |
| 2009/0102296 A1 | 4/2009 | Greene et al. | |
| 2009/0182204 A1 | 7/2009 | Semler et al. | |
| 2009/0203972 A1 | 8/2009 | Heneghan et al. | |
| 2009/0240194 A1 | 9/2009 | Keimel et al. | |
| 2009/0284496 A1 | 11/2009 | Oki | |
| 2009/0287933 A1 | 11/2009 | Beckwith et al. | |
| 2009/0315733 A1 | 12/2009 | Bischoff | |
| 2010/0004715 A1 | 1/2010 | Fahey | |
| 2010/0016685 A1 | 1/2010 | Muehlsteff et al. | |
| 2010/0094147 A1 | 4/2010 | Inan et al. | |
| 2010/0174205 A1 | 7/2010 | Wegerif | |
| 2010/0210921 A1 | 8/2010 | Park et al. | |
| 2010/0262044 A1 | 10/2010 | Siegler | |
| 2011/0040352 A1 | 2/2011 | Gerber et al. | |
| 2011/0054359 A1 | 3/2011 | Sazonov et al. | |
| 2011/0080181 A1 | 4/2011 | Sato et al. | |
| 2011/0152695 A1 | 6/2011 | Granqvist et al. | |
| 2011/0240379 A1 | 10/2011 | Forshaw et al. | |
| 2011/0245710 A1 | 10/2011 | Jensen | |
| 2011/0310005 A1 | 12/2011 | Chen | |
| 2012/0003933 A1 | 1/2012 | Baker et al. | |
| 2012/0065895 A1 | 3/2012 | Saul | |
| 2012/0071792 A1 | 3/2012 | Pfeffer et al. | |

(56) References Cited

U.S. PATENT DOCUMENTS

| | | |
|---|---|---|
| 2012/0123219 A1 | 5/2012 | Georgiev et al. |
| 2012/0165622 A1 | 6/2012 | Rodriguez et al. |
| 2012/0245476 A1 | 9/2012 | Skeri et al. |
| 2012/0266250 A1 | 10/2012 | Uhl |
| 2012/0283587 A1 | 11/2012 | Gosh et al. |
| 2012/0302843 A1 | 11/2012 | Otsubo et al. |
| 2012/0318869 A1 | 12/2012 | Edmonds |
| 2013/0006669 A1 | 1/2013 | Nakamura |
| 2013/0056285 A1 | 3/2013 | Meagher |
| 2013/0113506 A1 | 5/2013 | Poupyrev et al. |
| 2013/0226601 A1 | 8/2013 | Razmi et al. |
| 2013/0289889 A1 | 10/2013 | Yuen et al. |
| 2013/0310700 A1 | 11/2013 | Wiard et al. |
| 2014/0089836 A1 | 3/2014 | Damani et al. |
| 2014/0094707 A1 | 4/2014 | Farringdon et al. |
| 2014/0121540 A1 | 5/2014 | Raskin |
| 2014/0142396 A1 | 5/2014 | Ricks et al. |
| 2014/0142437 A1 | 5/2014 | Inan et al. |
| 2014/0172314 A1 | 6/2014 | Baarman |
| 2014/0182952 A1 | 7/2014 | Yuen et al. |
| 2014/0221849 A1 | 8/2014 | Farringdon et al. |
| 2014/0221850 A1 | 8/2014 | Farringdon et al. |
| 2015/0107910 A1 | 4/2015 | Villard et al. |
| 2015/0112209 A1 | 4/2015 | Blaber et al. |
| 2015/0160068 A1 | 6/2015 | Carreel et al. |
| 2015/0168205 A1 | 6/2015 | Lee |
| 2015/0193497 A1 | 7/2015 | Tallamy et al. |
| 2015/0201844 A1 | 7/2015 | Nakagawa |
| 2015/0289802 A1 | 10/2015 | Thomas et al. |
| 2015/0331491 A1 | 11/2015 | Rumreich |
| 2015/0335291 A1 | 11/2015 | Saadi et al. |
| 2015/0338265 A1 | 11/2015 | Carreel et al. |
| 2016/0029905 A1 | 2/2016 | Kovacs |
| 2016/0116326 A1 | 4/2016 | Sharma |
| 2016/0258806 A1* | 9/2016 | Chiu .................. G01G 23/37 |
| 2016/0317043 A1 | 11/2016 | Campo et al. |
| 2017/0042425 A1* | 2/2017 | Ramlall ............... A61B 5/0024 |
| 2017/0164901 A1* | 6/2017 | Shusterman ......... A61B 5/7217 |
| 2017/0173390 A1* | 6/2017 | Quy .................. A63B 24/0062 |
| 2017/0296070 A1* | 10/2017 | Wegerich ........... A61B 5/02055 |
| 2017/0347894 A1* | 12/2017 | Bhushan ............. A61B 5/0205 |
| 2018/0099678 A1* | 4/2018 | Absmeier ............ B60W 40/08 |
| 2018/0110021 A1* | 4/2018 | Ban .................... H04W 4/008 |
| 2018/0132783 A1* | 5/2018 | Wang ................. A61B 5/4833 |

\* cited by examiner

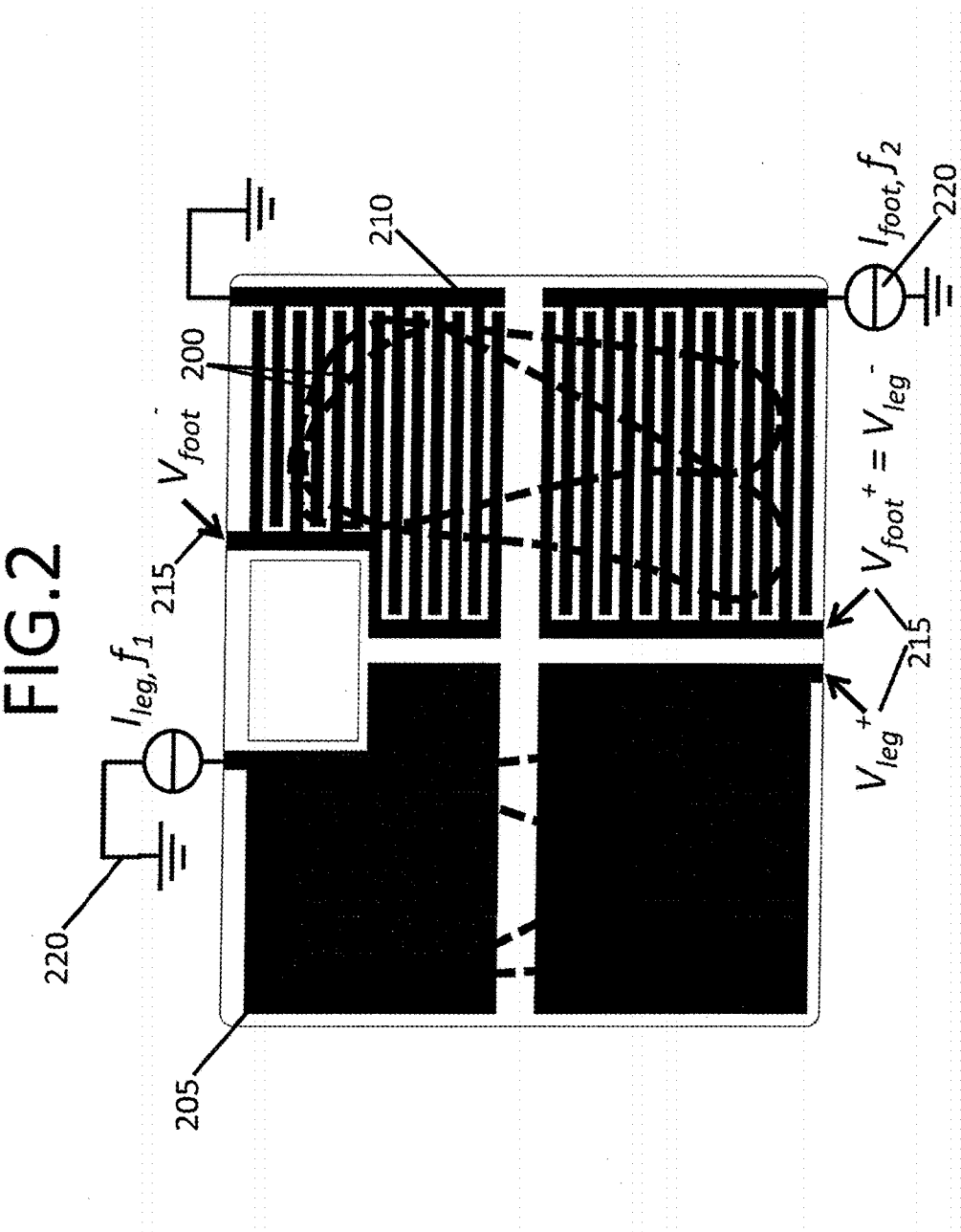

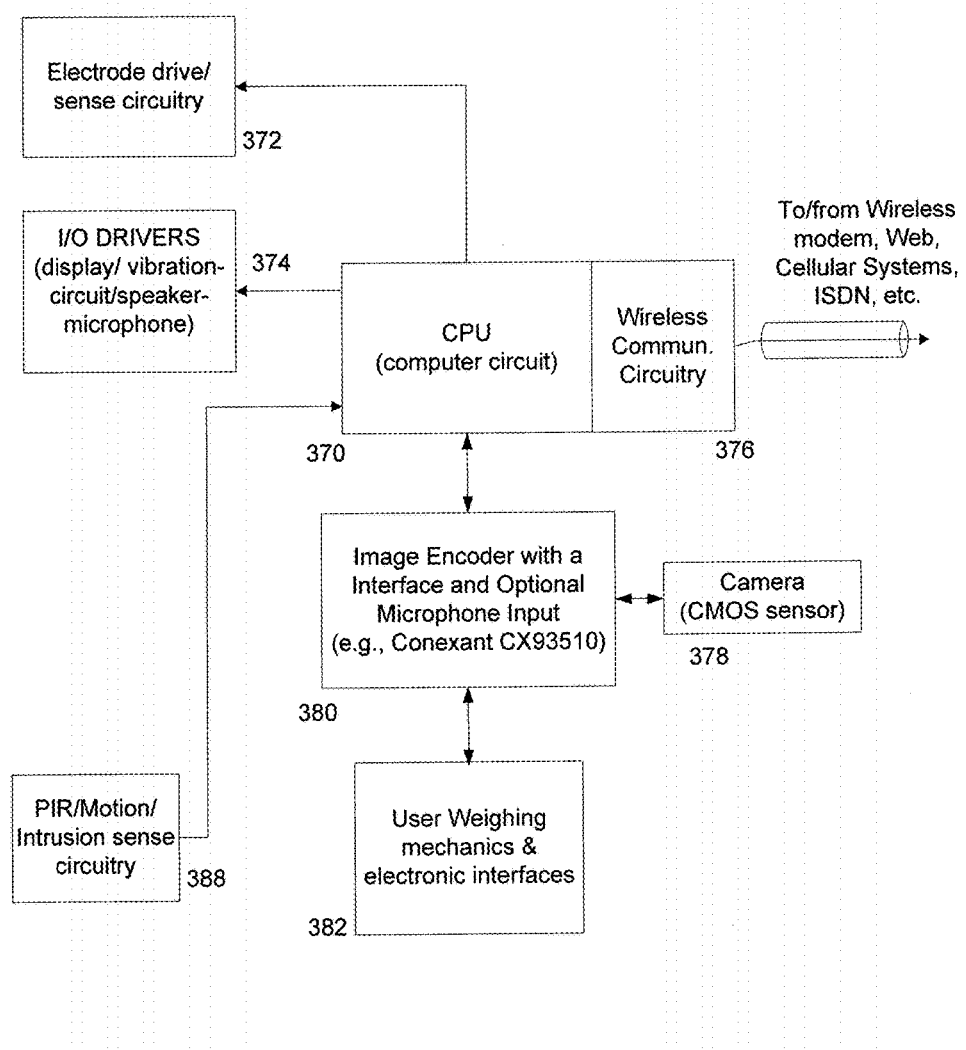

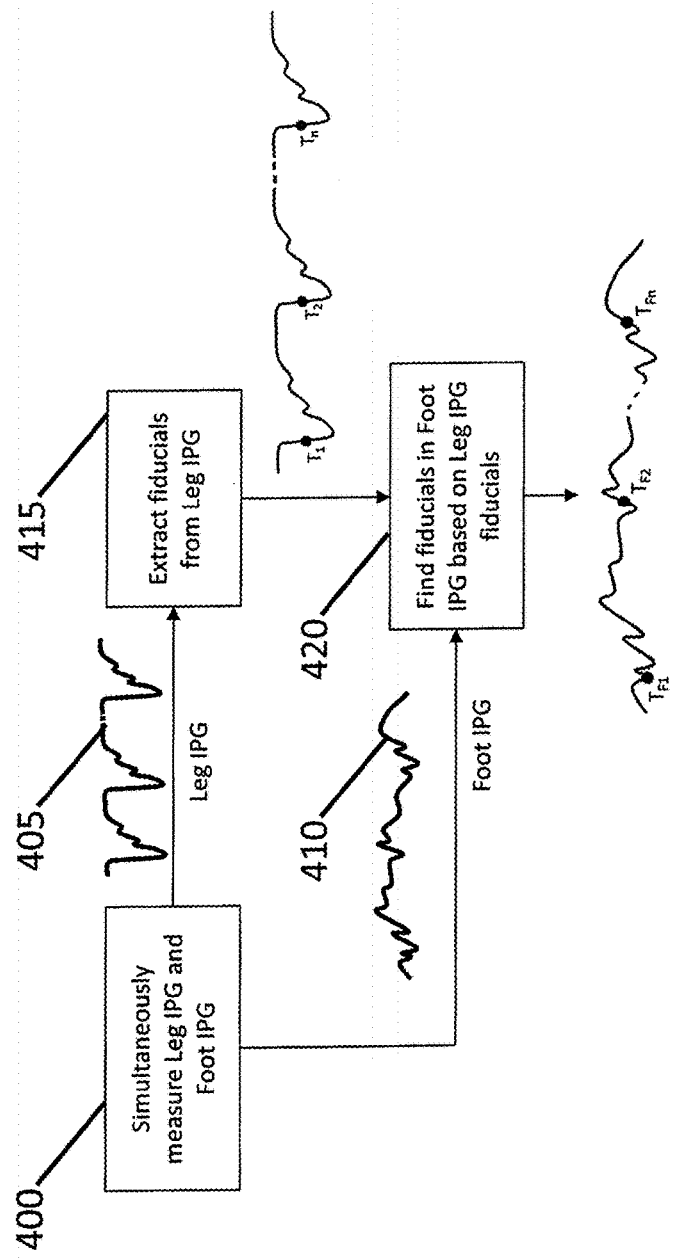

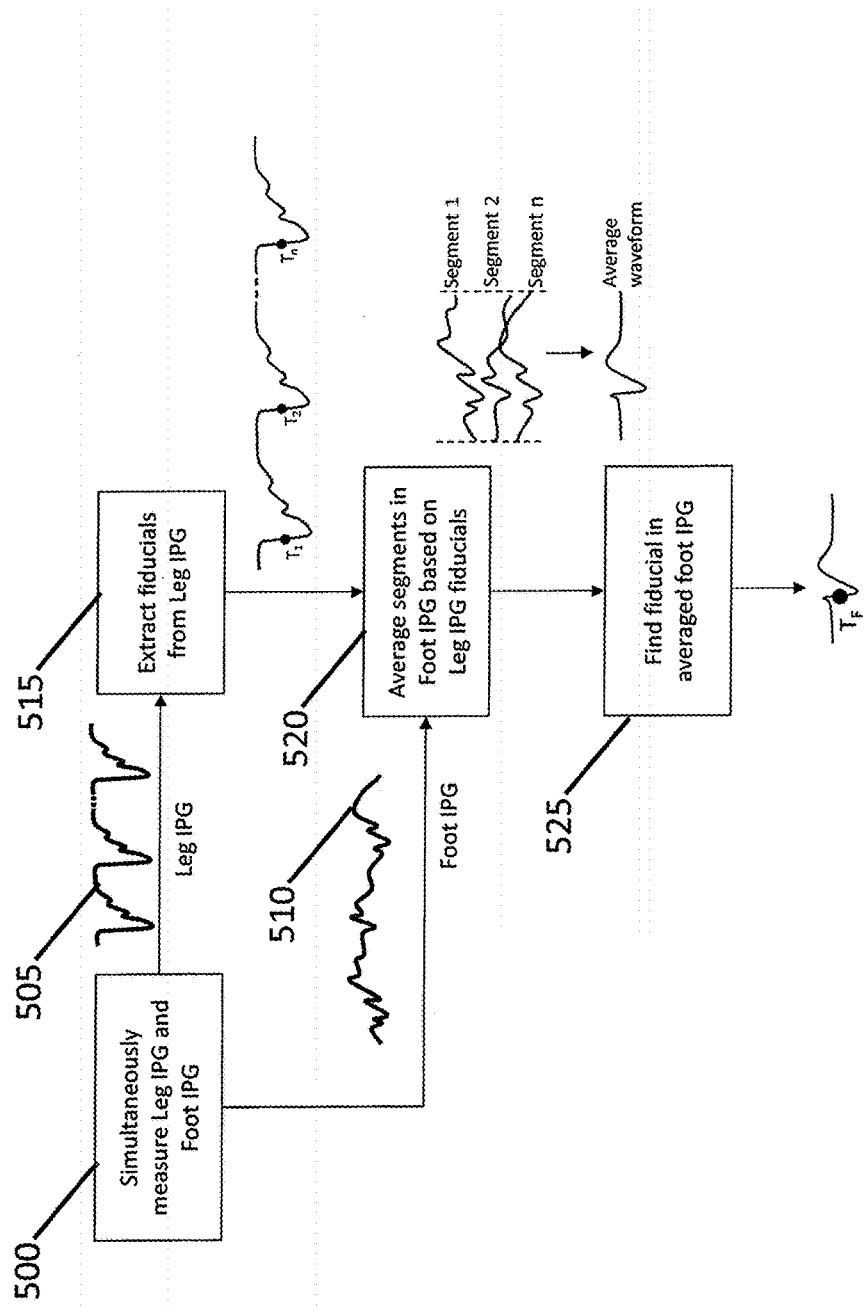

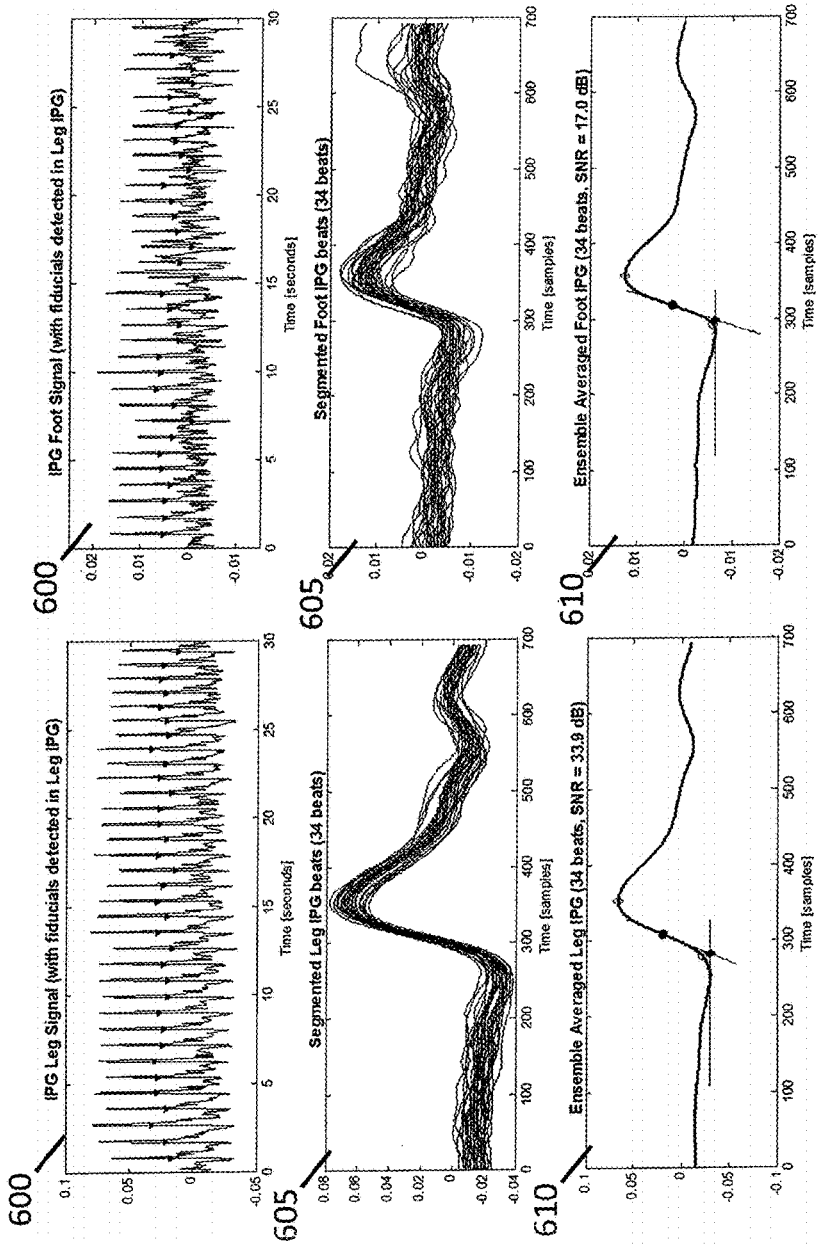

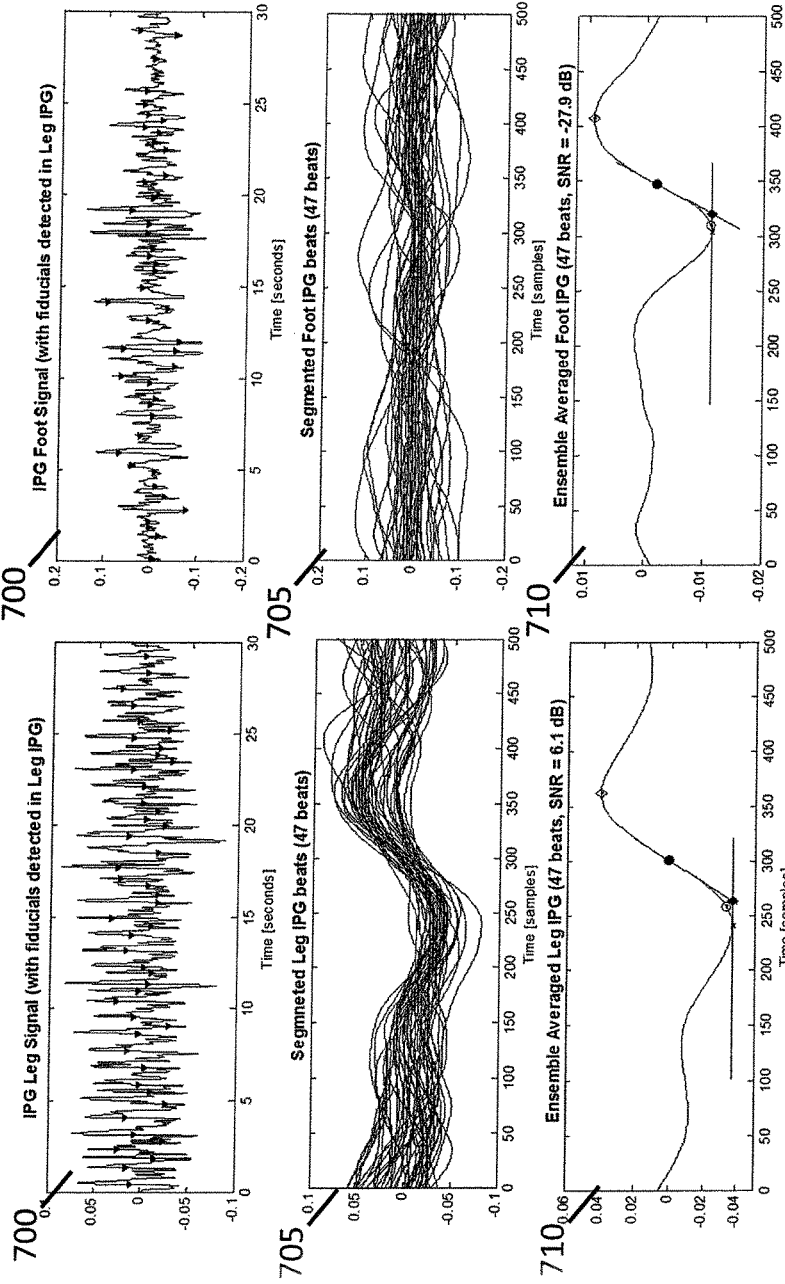

Metric of Leg IPG triggering robustness, based on various heart rates in 61 subjects for a standardized 30-second recording interval

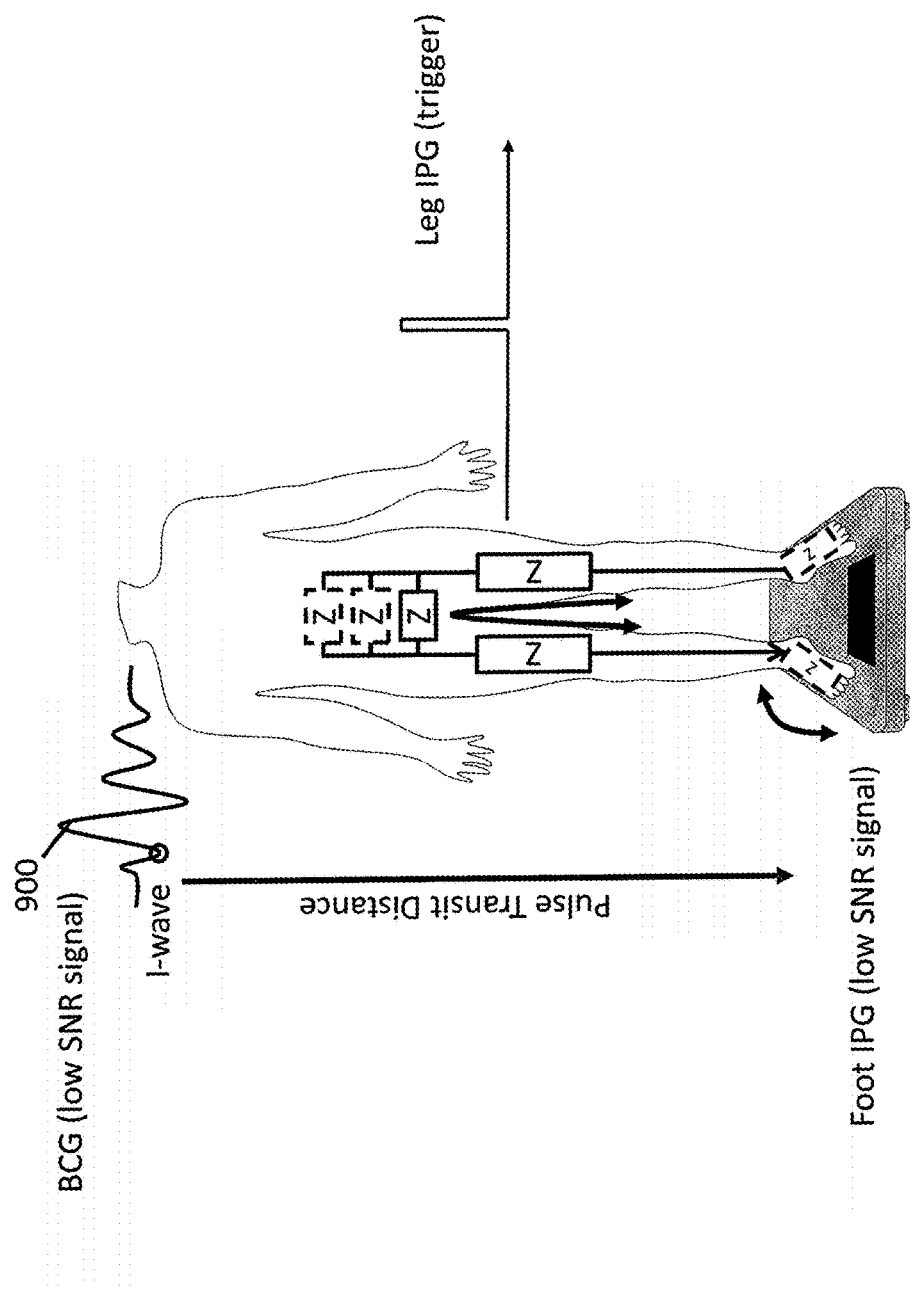

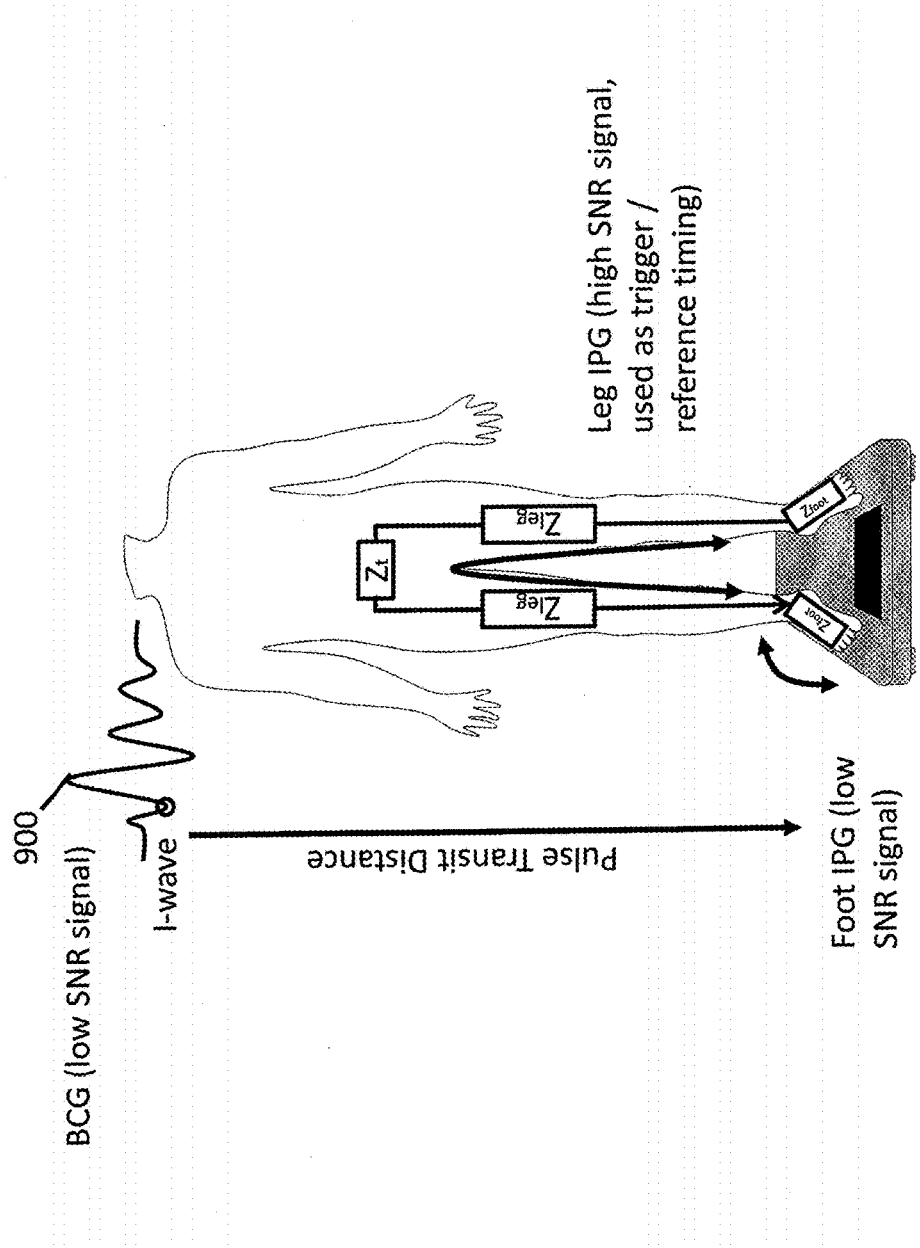

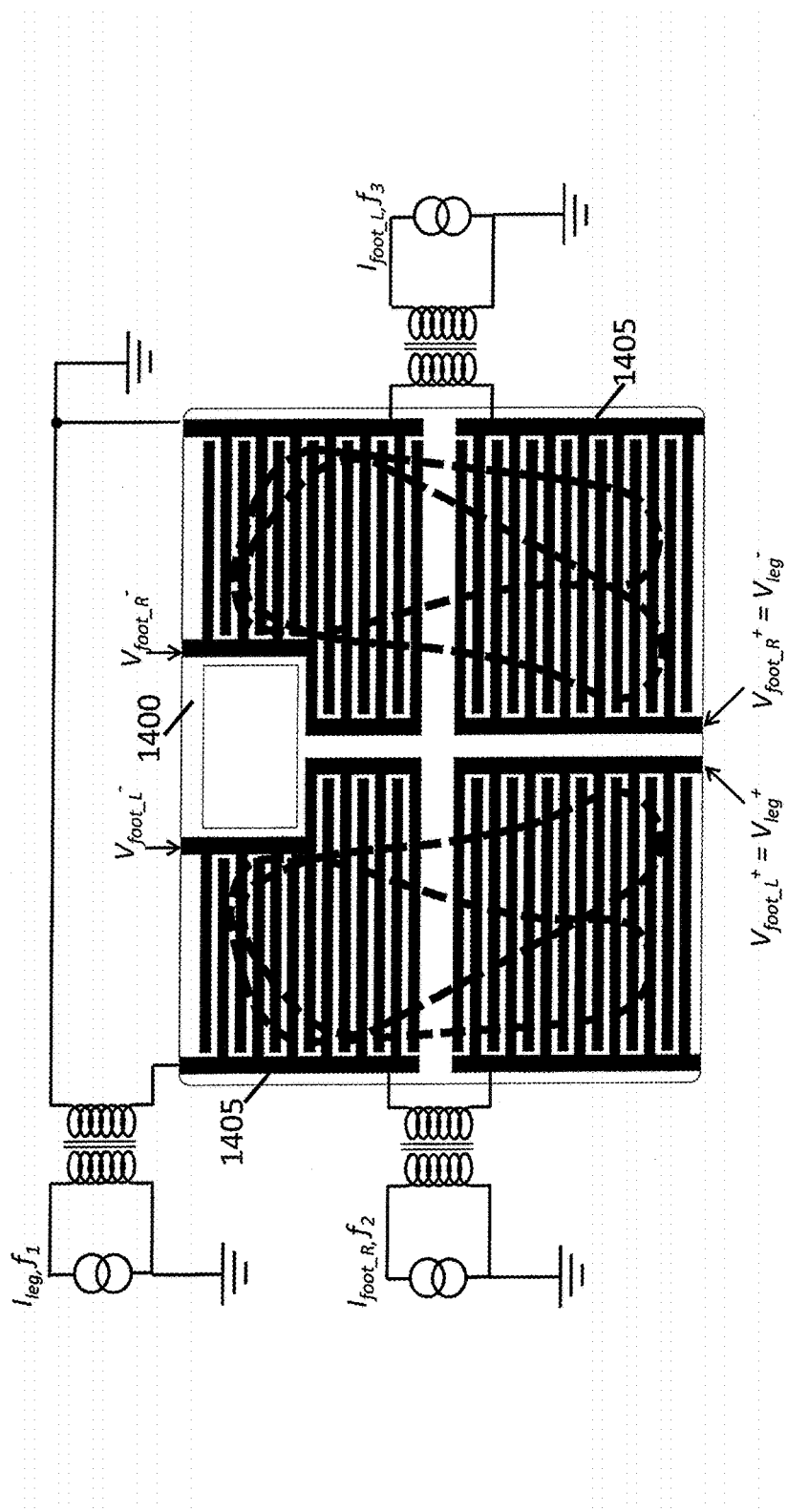

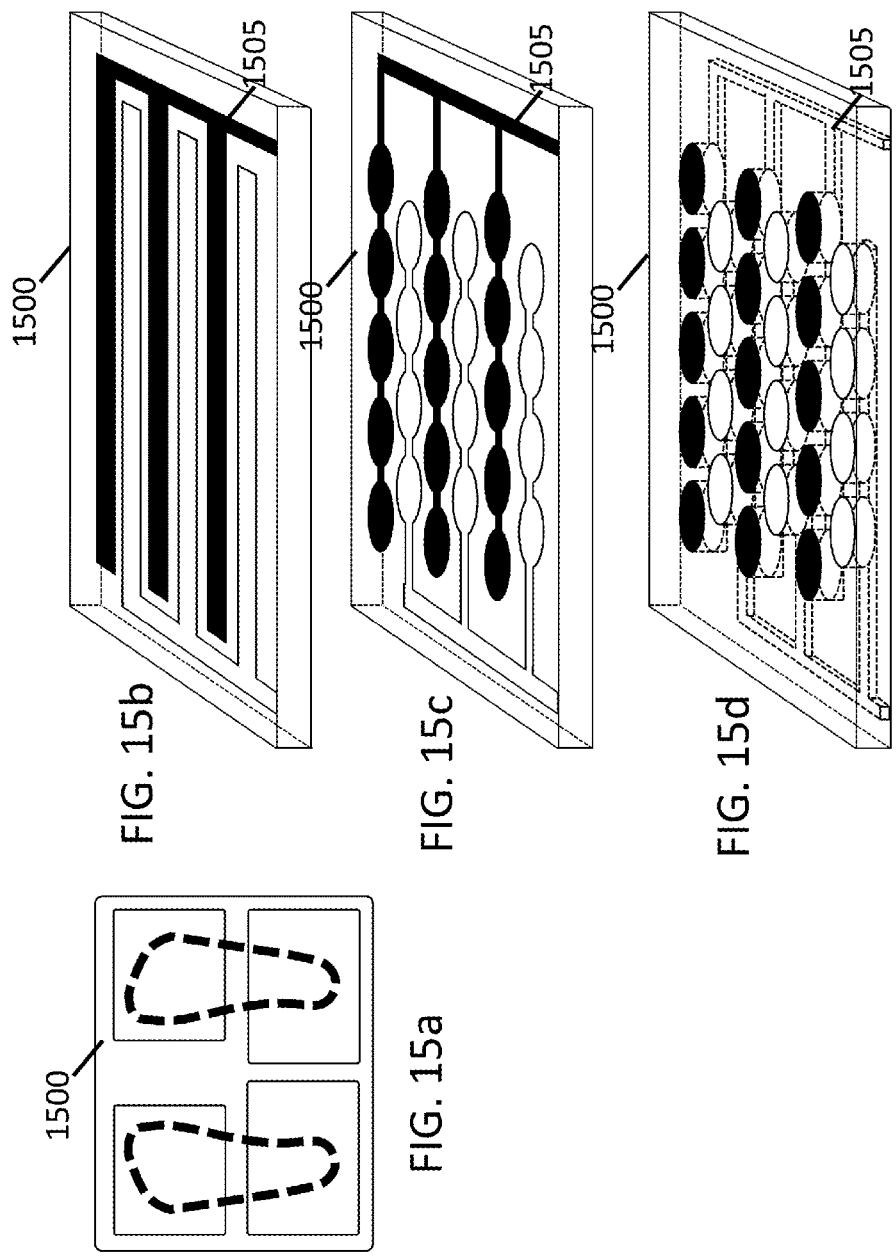

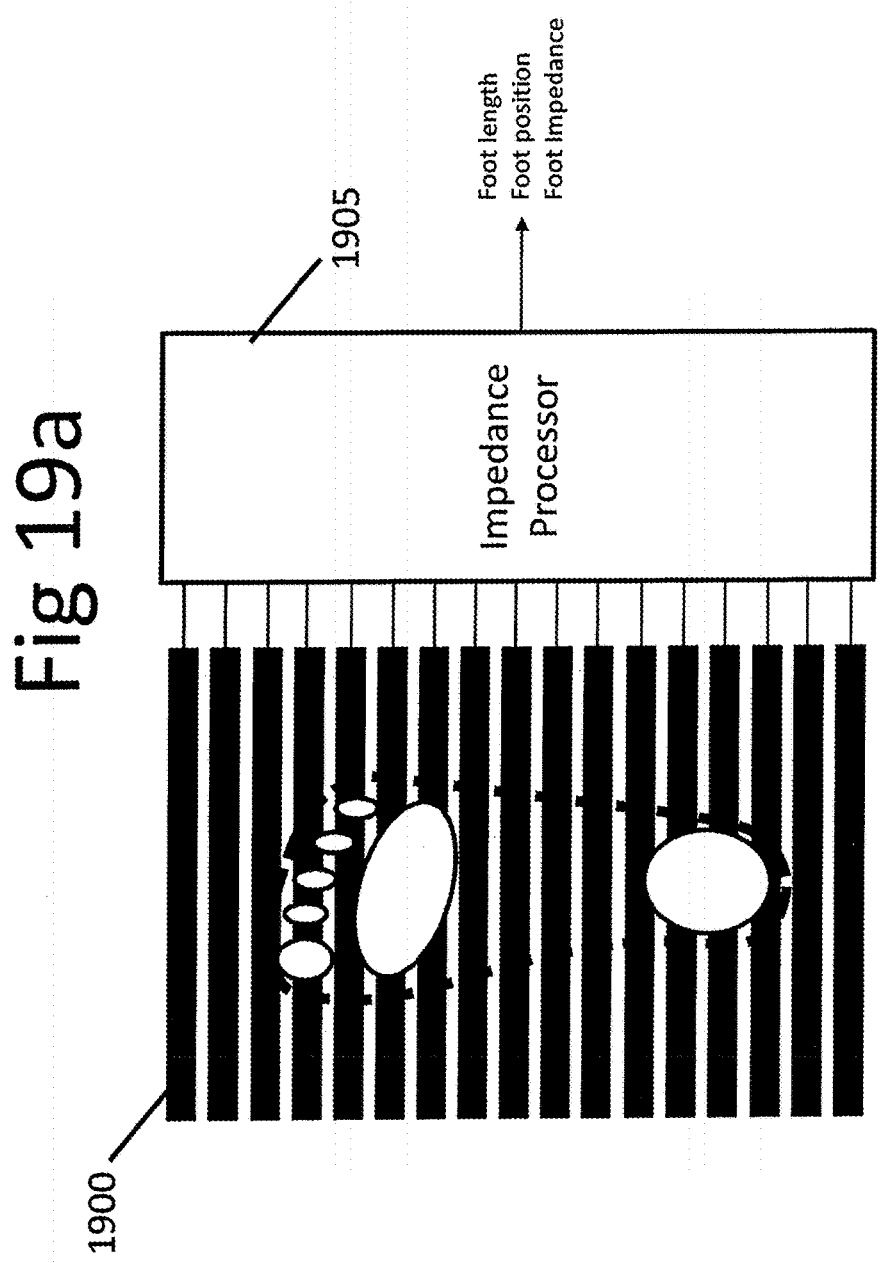

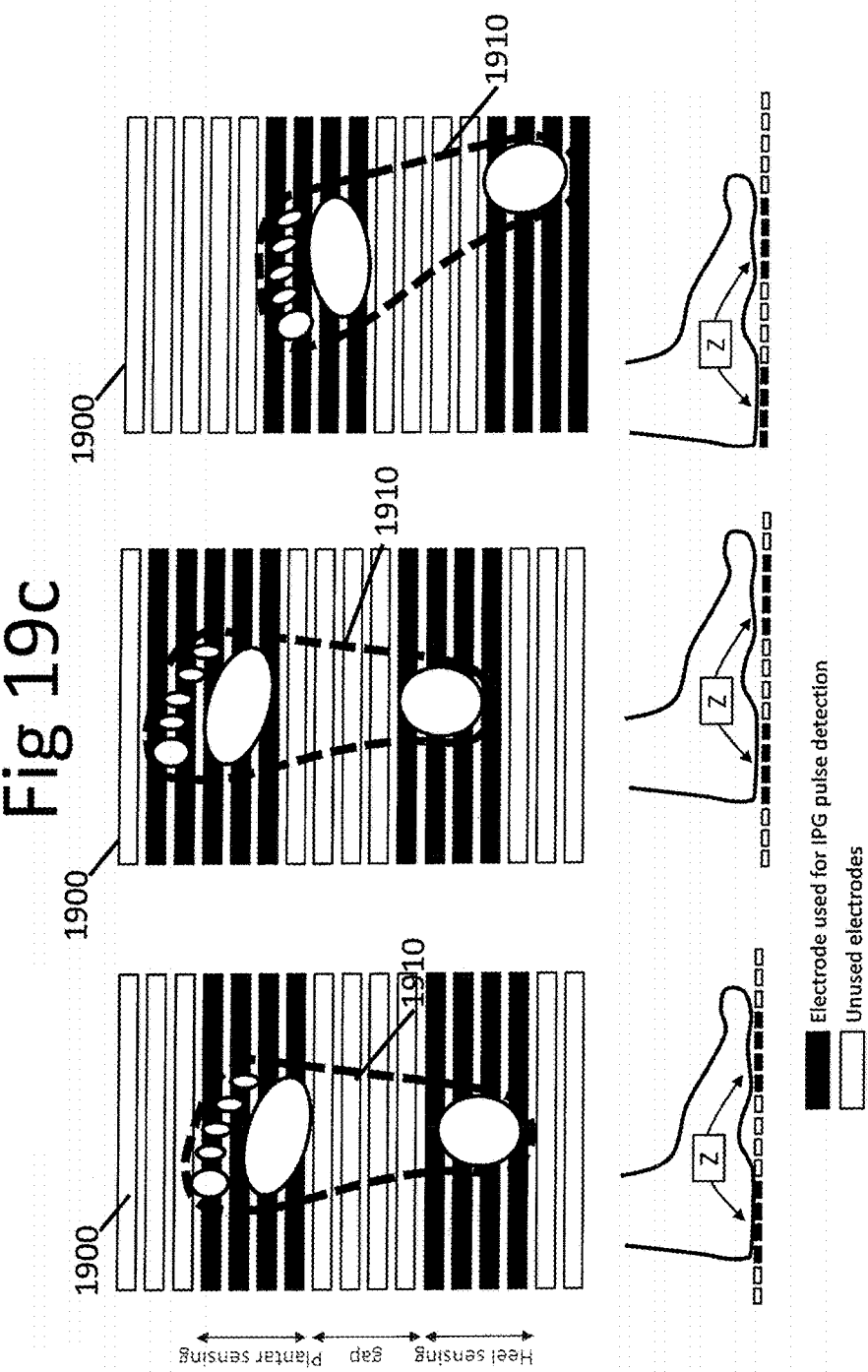

SCALE-BASED TIME SYNCHRONY

OVERVIEW

Various aspects of the present disclosure are directed toward methods, systems and apparatuses that are useful for time-synchronizing physiological data of a scale and a peripheral device, such as a user wearable device.

A variety of aspects of the present disclosure are directed to monitoring different physiological characteristics for many different applications. For instance, physiological monitoring instruments are often used to measure a number of patient vital signs, including blood oxygen level, body temperature, respiration rate and electrical activity for electrocardiogram (ECG) or electroencephalogram (EEG) measurements. For ECG measurements, a number of electrocardiograph leads may be connected to a patient's skin, and are used to obtain a signal from the patient.

Obtaining physiological signals (e.g., data) can often require specialty equipment and intervention with medical professionals. For many applications, such requirements may be costly or burdensome. These and other matters have presented challenges to monitoring physiological characteristics.

Aspects of the present disclosure are directed to time-synchronizing a scale with a peripheral device (e.g., a user wearable device), such as for purposes of calibrating the peripheral device for cardiac parameters, for providing data to a physician, and for other scale-based services. When using data from both the scale and the peripheral device, lack of time synchrony can cause issues such as cardiac parameters from each device not coordinating, and/or being inaccurate, and/or not identifying the correct data to output. For example, a user exercises while wearing a peripheral device that monitors one or more physiological parameters, and the peripheral device outputs the physiological parameters to a scale for further processing. The time used by the peripheral device can cause for a cardiac parameter (e.g., waveform) to be inaccurate. For example, if the peripheral device has time drifted, one second on the peripheral device can be more or less than an actual second. To avoid such an event, the peripheral device time can be synchronized with the time of the scale. The scale can communicate a message to the peripheral device asking for the time and the peripheral device responds with a return message that includes the time according to the peripheral device. The message itself (e.g., an amount of time for the message to be received) includes a time-latency. The scale calculates the time-latency using data in the return message (e.g., based on the time that the message was sent and the time (according to the scale) that the return message was received, among other techniques). Using the time-latency and the time in the return message, the scale or other external circuitry determines an adjustment to the time of the peripheral device and provides the same to the peripheral device to synchronize the time In various specific aspects, even after time is synchronized, time drift can occur (e.g., an offset). The scale time is used as the absolute time. The scale can periodically (e.g., once an hour, once a day, once week) (re)time synchronize the peripheral device and/or data obtained from the peripheral device. The data collected by the peripheral device is used for various analytics and provided to other sources based on the timing of the data. Accordingly, correct time can be beneficial for the scale and/or peripheral device to accurately determine which data to use for the analytics and/or to provide to other sources. For example, cardiac waveforms immediately after an event occurs (e.g., exercise) is used to diagnose a user for various conditions. The time synchrony is used to provide correct data to a physician and/or external circuitry for diagnosis purposes.

In other related specific aspects, the peripheral device may have time updated by other sources, in addition to the scale. For example, a user can manually update the time of the peripheral device and/or the time can be updated by a global positioning system (GPS) or other wireless communication. The scale can determine whether the peripheral device has been updated after the last time synchrony with the scale. For example, the message output to the peripheral device includes a request for any time update that has occurred, identification of the source, when the update occurred, and the time the peripheral device was set to. In such embodiments, the scale is a time master and the peripheral device is a slave, however, the peripheral device includes additional time masters. The scale, based on the return message from the peripheral device, corrects for any time drift from the last update of the peripheral device in response to the source being a trusted time source.

A number of aspects are directed to an apparatus including a weighing-scale platform, a weighing-scale housing, and data-assimilation circuitry. The weighing-scale platform and weighing-scale housing are configured and arranged for a user to stand on the platform. In the housing is a plurality sensors and sensor-data processing circuitry, which collect a first set of physiological data from the plurality of sensors and specific to the user while the user is standing on the platform. The first set of physiological data from the user has an accuracy component that is dependent on or defined using a time-based interval or time-based metric (e.g., of the scale). The data-assimilation circuitry provides synchronization by accessing a profile having information for identifying the user in response to the user standing on the platform, accessing an indication of the time interval or metric derived from the first set of physiological data specific to the user, and identifying a peripheral device including physiological-measuring circuitry with a second set of physiological data, the second set of physiological data being from and specific to the user and being subject to time-based inaccuracies. Further, while accounting for the time-based inaccuracies, the data-assimilation circuitry compares aspects of the first and second sets of physiological data. The synchronization can include time-synchronizing the peripheral device to the time of the scale and/or adjusting (e.g., normalizing) the second set of physiological data to account for the time-based inaccuracies.

Other specific aspects are directed to an apparatus for user with the weighing-scale platform and weighing-scale housing. The housing encloses a plurality of sensors and sensor-data processing circuitry that collects a first set of physiological data from the plurality of sensors and specific to the user while the user is standing on the platform. The apparatus can be external circuitry (e.g., standalone or server CPU) and/or a peripheral device. The apparatus includes data-assimilation circuitry to provide synchronization of the first set of physiological data by accessing a profile having information for identifying the user in response to the user standing on the platform, accessing an indication of the time interval or metric derived from the first set of physiological data specific to the user, and providing a second set of physiological data derived from physiological-measuring circuitry. The second set of physiological data being from and specific to the user and being subject to time-based inaccuracies. Further, while accounting for the time-based inaccuracies of the second set of physiological data relative to an accuracy component in the first set of physiological data, the data-assimilation circuitry compares aspects of the first and second sets of physiological data. Providing the second set of physiological data can include identifying a peripheral device and/or otherwise obtaining the second set of physiological data via the physiological-measuring circuitry. For example, the apparatus is external circuitry, identifies the peripheral device, and communicates with the peripheral device to obtain the second set of physiological data. In other aspects, the apparatus is the peripheral device, which provides the second set of physiological data by obtaining the second set and/or identifying the second set of physiological data as stored in memory of the peripheral device (or cloud system).

In a number of a specific aspects, a system includes a scale, a peripheral device, and optionally, external circuitry. For example, a particular user stands on the scale before and after exercise to take various physiological measurements. The scale collects various physiological data such as heart rate, weight, data indicative of pulse wave velocity (PWV), cardiogram data (ECG, BCG, etc.), heart age, body-mass-index, etc. For example, the present disclosure relates to electronic body scales that use impedance-based biometric measurements. Various other aspects of the present disclosure are directed to biometric measurements such as body composition and cardiovascular information. Impedance measurements are made through the feet to measure fat percentage, muscle mass percentage and body water percentage. Additionally, foot impedance-based cardiovascular measurements are made for an ECG and sensing the properties of blood pulsations in the arteries, also known as impedance plethysmography (IPG), where both techniques are used to quantify heart rate and/or pulse arrival timings (PAT). Cardiovascular IPG measures the change in impedance through the corresponding arteries between the sensing electrode pair segments synchronous to each heartbeat.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which:

FIG. 2 shows an example of the insensitivity to foot placement on scale electrodes with multiple excitation and sensing current paths, consistent with various aspects of the present disclosure;

FIG. 3c depicts an example block diagram of circuitry for operating core circuits and modules, including for example those of FIGS. 3a-b, used in various specific embodiments of the present disclosure;

FIG. 4 shows an example block diagram depicting signal processing steps to obtain fiducial references from the individual Leg IPG "beats", which are subsequently used to obtain fiducials in the Foot IPG, consistent with various aspects of the present disclosure;

FIG. 5 shows an example flowchart depicting signal processing to segment individual Foot IPG "beats" to produce an averaged IPG waveform of improved signal-to-noise ratio (SNR), which is subsequently used to determine the fiducial of the averaged Foot IPG, consistent with various aspects of the present disclosure;

FIG. 6a shows examples of the Leg IPG signal with fiducials; the segmented Leg IPG into beats; and the ensemble-averaged Leg IPG beat with fiducials and calculated SNR, for an exemplary high-quality recording, consistent with various aspects of the present disclosure;

FIG. 6b shows examples of the Foot IPG signal with fiducials derived from the Leg IPG fiducials; the segmented Foot IPG into beats; and the ensemble-averaged Foot IPG beat with fiducials and calculated SNR, for an exemplary high-quality recording, consistent with various aspects of the present disclosure;

FIG. 7a shows examples of the Leg IPG signal with fiducials; the segmented Leg IPG into beats; and the ensemble-averaged Leg IPG beat with fiducials and calculated SNR, for an exemplary low-quality recording, consistent with various aspects of the present disclosure;

FIG. 7b shows examples of the Foot IPG signal with fiducials derived from the Leg IPG fiducials; the segmented Foot IPG into beats; and the ensemble-averaged Foot IPG beat with fiducials and calculated SNR, for an exemplary low-quality recording, consistent with various aspects of the present disclosure;

FIGS. 9a-b show an example configuration to obtain the pulse transit time (PTT), using the first IPG as the triggering pulse for the Foot IPG and ballistocardiogram (BCG), consistent with various aspects of the present disclosure;

FIG. 14c shows another example approach to floating current sources is the use of transformer-coupled current sources, consistent with various aspects of the present disclosure;

FIGS. 15a-d show an example breakdown of a scale with interleaved foot electrodes to inject and sense current from one foot to another foot, and within one foot, consistent with various aspects of the present disclosure;

FIGS. 19a-c show example impedance as measured through different parts of the foot based on the foot position, consistent with various aspects of the present disclosure.

Figure 1A:
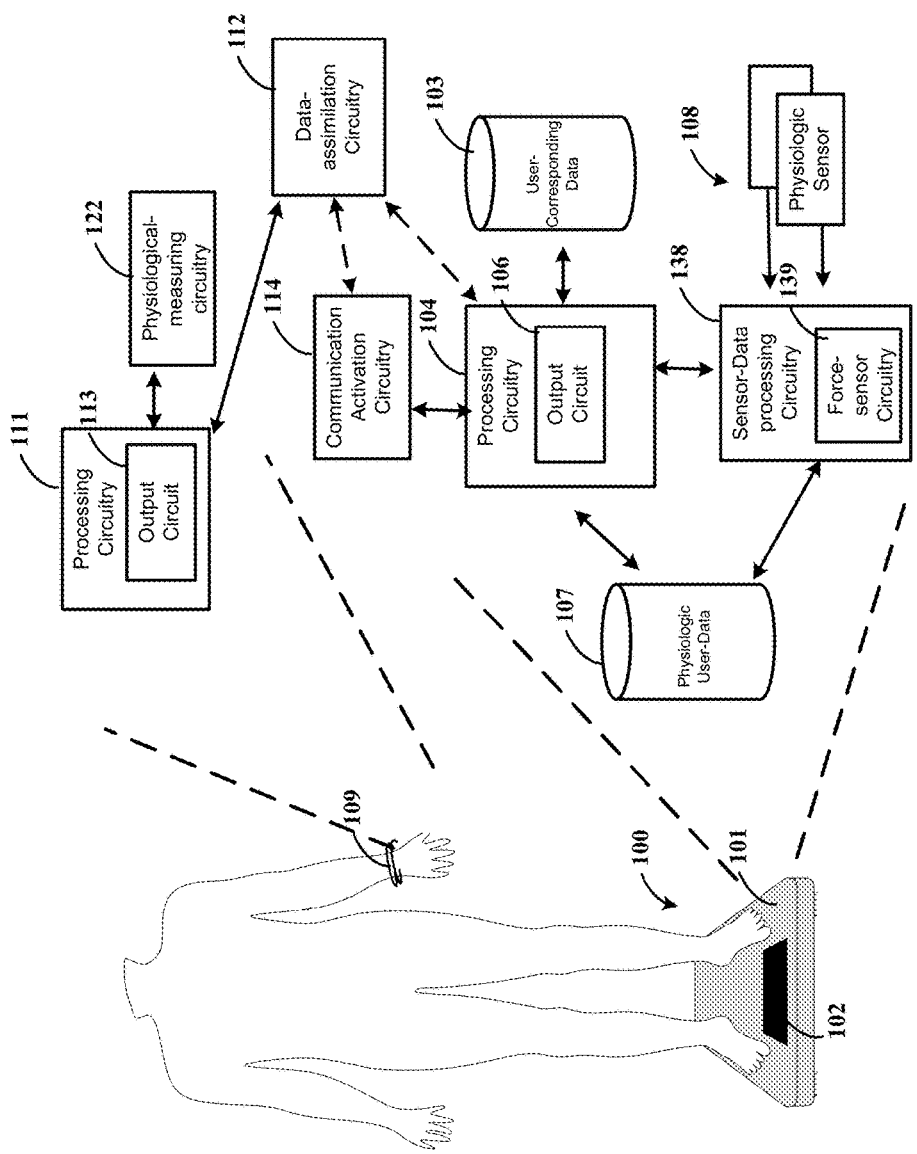
FIG. 1a shows an apparatus consistent with aspects of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DESCRIPTION

Aspects of the present disclosure are believed to be applicable to a variety of different types of apparatuses, systems, and methods involving time-synchronizing data of a peripheral device using data of a scale. In certain implementations, aspects of the present disclosure have been shown to be beneficial when used in the context of a scale-based system, including a weighing scale, a peripheral device, one or more other user devices, a standalone user CPU, and the World Wide Web. In specific embodiments, the scale is used to update a time of the peripheral device so that the two devices are time-synchronized. In other embodiments, the scale is used to assimilate data from the peripheral device with data from the scale by accounting for the time-based inaccuracies of the data from the peripheral device. In further specific embodiments, the scale is used to time-synchronize with the peripheral device by outputting a message to the peripheral device requesting "what time it is" and using the return message from the peripheral to determine a time adjustment. The scale can determine the time adjustment by determining a time-latency between when the message was sent to the peripheral device and when the message was received by the peripheral device and adjusting the time difference between the time in the return message and the scale time by the time-latency. The scale outputs the time adjustment to the peripheral device, which updates its time. These and other aspects can be implemented to address challenges, including those discussed in the background above. While not necessarily so limited, various aspects may be appreciated through a discussion of examples using such exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Embodiments of the present disclosure are directed to time-synchronizing a scale with a peripheral device, such as for purposes of calibrating the peripheral device for a cardiac measurement, accounting for time-based inaccuracies in the data from the peripheral device, for providing data to a physician, and for other scale-based services. When using data from both the scale and the peripheral device, lack of time synchrony can cause issues such as the cardiac parameters from each device not coordinating and/or being inaccurate. For example, a user exercises while wearing a peripheral device that monitors one or more physiological parameters, and the peripheral device, outputs the physiological parameter to a scale for further processing. The time implemented by the peripheral device can cause for physiological data (e.g., a cardiac waveform) to be inaccurate if the peripheral device has time drifted from actual time resulting in one second on the peripheral device from being more or less than an actual second.

The time can be synchronized with the time of the scale by adjusting the time of the peripheral device and/or adjusting data from the peripheral device to account for the time based inaccuracy. The scale can have a time-based interval or metric (e.g., time used by the scale) that is based on or derived from a time standard. The scale can communicate a message to the peripheral device asking for the time and the peripheral device responds with a return message that includes the time. The time taken for the message to be received by the peripheral device can have an associated time-latency. The scale (or other circuitry, such as external circuitry) calculates the time-latency based on the time that the message was sent by the scale and the time (at the scale) that the return message is received, as further described herein. Using the time-latency and the time in the return message, the scale or other external circuitry determines an adjustment to the time of the peripheral device and provides the same to the peripheral device to synchronize the time.

In various specific embodiments, after time is synchronized, a time drift can occur (e.g., an offset). The scale is used as the absolute time and to periodically (re)time-synchronize the scale. The data collected by the peripheral device is used for various analytics and provided to other sources based on the timing of the data. Correct time can be beneficial for the scale and/or peripheral device to accurately determine which data to use for the analytics and/or to provide to other sources. For example, cardiac waveforms immediately after an event occurs (e.g., exercise) is used to diagnose a user for various conditions. The time synchrony can be used to provide correct data to a physician and/or external circuitry for diagnosis purposes.

In other related embodiments, the peripheral device may have time updated by other sources in addition to the scale. For example, a user can manually update the time of peripheral device and/or the time can be updated by a global positioning system (GPS) or other wireless communication. The scale (or external circuitry) can determine that the peripheral device has been updated after the last time-synchronization of the scale. For example, the output time message to the peripheral device includes a request for any time update that has occurred, identification of the source, when the update occurred, and the time the peripheral device was set to. In such embodiments, the scale is a "time" master and the peripheral device is a slave, however, the peripheral device may include additional time masters. The scale, based on the return or other message, corrects from any time drift from the last update to the peripheral device in response to the source being a trusted time source. As GPS time updates can result in increased power consumption, use of the scale to provide updates can allow for GPS updates to be turned off by the user and/or reduced, resulting in greater battery life.

A number of embodiments are directed to an apparatus including a weighing-scale platform, a weighing-scale housing, and data-assimilation circuitry. The weighing-scale platform and weighing-scale housing are configured and arranged for a user to stand on the platform. In the housing is a plurality sensors and sensor-data processing circuitry, which collect a first set of physiological data from the plurality of sensors and specific to the user while the user is standing on the platform. The first set of physiological data from the user has an accuracy component that is dependent on or defined using a time-based interval or time-based metric (e.g., of the scale). The data-assimilation circuitry provides synchronization by accessing a profile having information for identifying the user in response to the user standing on the platform, accessing an indication of the time interval or metric derived from the first set of physiological data specific to the user, and identifying a peripheral device including physiological-measuring circuitry with a second set of physiological data, the second set of physiological data being from and specific to the user and being subject to time-based inaccuracies. Further, while accounting for the time-based inaccuracies, the data-assimilation circuitry compares aspects of the first and second sets of physiological data. The synchronization can include time-synchronizing the peripheral device to the time of the scale and/or adjusting (e.g., normalizing) the second set of physiological data to account for the time-based inaccuracies.

Other specific embodiments are directed to an apparatus for user with the weighing-scale platform and weighing-scale housing. The housing encloses a plurality of sensors and sensor-data processing circuitry that collects a first set of physiological data from the plurality of sensors and specific to the user while the user is standing on the platform. The apparatus can be external circuitry (e.g., standalone or server CPU) and/or a peripheral device. The apparatus includes data-assimilation circuitry to provide synchronization of the first set of physiological data by accessing a profile having information for identifying the user in response to the user standing on the platform, accessing an indication of the time interval or metric derived from the first set of physiological data specific to the user, and providing a second set of physiological data derived from physiological-measuring circuitry. The second set of physiological data being from and specific to the user, and being subject to time-based inaccuracies. Further, while accounting for the time-based inaccuracies of the second set of physiological data relative to an accuracy component in the first set of physiological data, the data-assimilation circuitry compares aspects of the first and second sets of physiological data. Providing the second set of physiological data can include identifying a peripheral device and/or otherwise obtaining the second set of physiological data via the physiological-measuring circuitry. For example, the apparatus is external circuitry that identifies the peripheral device, and communicates with the peripheral device to obtain the second set of physiological data. In other aspects, the apparatus is the peripheral device, which provides the second set of physiological data by obtaining the second set of physiological data using physiological-measuring circuitry of the peripheral device and/or identifying the second set of data as stored in memory (of the peripheral device or via a Cloud system).

The scale and the peripheral device collect physiological data from the user, including cardiac parameters such as waveforms. The accuracy of the cardiac parameters can depend on the accuracy of time. For example, if the peripheral device has time drifted, time according to the peripheral device may be longer or shorter than actual time, the resulting cardiac parameter being inaccurate. The scale may have circuitry that reduces time drift and/or has a more accurate time. The scale may not be constantly used by the user, whereas the peripheral device may be constantly used and/or may be used at a greater rate. For example, the peripheral device may collect data while the user is exercising, such as on a bicycle, running outside, swimming, etc. The peripheral device, as further described herein, includes physiological-measuring circuitry (e.g., sensor circuitry) configured to collect the respective data. Example peripheral devices include a heart rate monitor, a smartwatch, a fitness band/watch, and smart glasses, among other devices. As the peripheral device may be used at a greater rate by the user and/or during times that the scale cannot obtain measurements, the scale may aggregate data from the scale and the peripheral device to provide additional data for further processing and analysis purposes.

The scale collects various physiological data, such as heart rate, weight, data indicative of pulse wave velocity (PWV), cardiogram data (ECG, BCG, etc.), heart age, body-mass-index, etc. For example, the present disclosure relates to electronic body scales that use impedance-based biometric measurements. Various other embodiments of the present disclosure are directed to biometric measurements such as body composition and cardiovascular information. Impedance measurements are made through the feet to measure fat percentage, muscle mass percentage and body water percentage. Additionally, foot impedance-based cardiovascular measurements are made for an ECG and sensing the properties of blood pulsations in the arteries, also known as impedance plethysmography (IPG), where both techniques are used to quantify heart rate and/or pulse arrival timings (PAT). Cardiovascular IPG measures the change in impedance through the corresponding arteries between the sensing electrode pair segments synchronous to each heartbeat.

In accordance with a number of embodiments, physiological parameter data is collected using a weighing scale that the user stands on. The user or similarly-venued personnel (e.g., co-workers, friends, roommates, colleagues), may use the apparatus in the home, office, doctor's office, or other such venue on a regular and frequent basis. The scale includes a platform which is part of a housing or enclosure and a user-display to output user-specific information for the user while the user is standing on the platform. The platform includes a surface area with electrodes that are integrated and configured and arranged for engaging a user as he or she steps onto the platform. Within the housing is processing circuitry that includes a CPU (e.g., one or more computer processor circuits) and a memory circuit with user-corresponding data stored in the memory circuit. The platform, over which the electrodes are integrated, is integrated and communicatively connected with the processing circuitry. The processing circuitry is programmed with modules as a set of integrated circuitry which is configured and arranged for automatically obtaining a plurality of measurement signals (e.g., signals indicative of cardio-physiological data) from the plurality of electrodes. The processing circuitry generates, from the signals, physiological data manifested as user-data. In some embodiments, the scale collects highly sensitive user data, such as cardiogram data and data indicative of disorders and disease, and other user data, such as demographic information and weight.

The scale, in various embodiments, includes input/output circuitry that receives data from other user devices, such as a peripheral device, and outputs various data to other external circuitry, such as a standalone user CPU and/or a server CPU (e.g., at a datacenter). The scale aggregates scale-obtained data with data from one or more user devices, including the peripheral device. The one or more user devices collect various sensitive user data, such as exercise data, food intake or liquid intake data, sleep data, cardiogram data, among other information. The scale, in various embodiments, aggregates data from the various devices and outputs the data to the server CPU. For example, using the input/output circuitry, the scale receives various sensitive user data from one or more user devices, such as the exercise monitoring equipment, a smartphone, a smartwatch, a tablet, and/or other circuitry and devices. The peripheral device, in some embodiments, is used more often than the scale and/or used to collect data that the scale cannot, such as exercise logging and sleep habits. Thereby, data obtained by the scale and the user device is aggregated and/or combined and used to determine various cardio-related data that is of a higher quality (e.g., more accurate, less noise, more information) and/or more detailed than data from one of the respective devices.

In accordance with various embodiments, the user data is based on sensing, detection, and quantification of at least two simultaneously acquired impedance-based signals. The simultaneously acquired impedance-based signals are associated with quasi-periodic electro-mechanical cardiovascular functions, and simultaneous cardiovascular signals measured by the impedance sensors, due to the beating of an individual's heart, where the measured signals are used to determine at least one cardiovascular related characteristic of the user for determining the heart activity, health, or abnormality associated with the user's cardiovascular system. The sensors can be embedded in a user platform, such as a weighing scale-based platform, where the user stands stationary on the platform, with the user's feet in contact with the platform, where the impedance measurements are obtained where the user is standing with bare feet.

In certain embodiments, the plurality of impedance-measurement signals include at least two impedance-measurement signals between the one foot and another location. Further, in certain embodiments, a signal is obtained, based on the timing reference, which is indicative of synchronous information and that corresponds to information in a BCG. Additionally, the methods can include conveying modulated current between selected ones of the electrodes. The plurality of impedance-measurement signals may, for example, be carried out in response to current conveyed between selected ones of the electrodes. Additionally, the methods, consistent with various aspects of the present disclosure, include a step of providing an IPG measurement within the one foot. Additionally, in certain embodiments, the two electrodes contacting one foot of the user are configured in an inter-digitated pattern of positions over a base unit that contains circuitry communicatively coupled to the inter-digitated pattern. The circuitry uses the inter-digitated pattern of positions for the step of determining a plurality of pulse characteristic signals based on the plurality of impedance-measurement signals, and for providing an IPG measurement within the one foot. As discussed further herein, and further described in U.S. patent application Ser. No. 14/338,266 filed on Oct. 7, 2015 (now U.S. Pat. No. 10,130,273), which is herein fully incorporated by reference for its specific teaching of inter-digitated pattern and general teaching of sensor circuitry, the circuitry can obtain the physiological data in a number of manners.

In medical (and security) applications, for example, the impedance measurements obtained from the plurality of integrated electrodes can be used to provide various cardio-related information that is user-specific including, as non-limiting examples, synchronous information obtained from the user and that corresponds to information in a ballisto-cardiogram (BCG) and impedance plethysmography (IPG) measurements. By ensuring that the user, for whom such data was obtained, matches other biometric data as obtained concurrently for the same user, medical (and security) personnel can then assess, diagnose and/or identify with high degrees of confidence and accuracy.

In a number of specific embodiments, the user activates a time-calibration service/feature of the scale. For example, the user stands on the scale and identifies the peripheral device, including how to synchronize the two devices, using a foot-controlled user interface (FUI). The scale authorizes the communication and/or the synchronization by recognizing the user using scale-based biometrics and based on authorization from the peripheral device, in some specific embodiments. In response to the synchronization, the scale outputs a message requesting a time value from the peripheral device. The peripheral device, in response to the message, outputs a response message with an indication of the time. The scale receives the return message and calculates a time-latency using data in the return message (e.g., by calculating the amount of processing time for the scale to provide the time and the amount of time for the message to be received at the peripheral device). Further, using the time-latency, the scale determines a time difference between the scale and the peripheral device. A time difference between the scale and the peripheral device refers to or includes a difference in relative time according to the scale and relative time according to the peripheral device.

The scale can determine the difference by comparing the time according to the scale with the time provided in the return message, taking into account the time-latency (e.g., subtracting or other function). The scale outputs the adjustment to the peripheral device to time synchronize a time of the peripheral device with the scale and/or normalizes data from the peripheral device to perform time-synchrony. Further, the scale (or other device) can periodically re-synchronizes to prevent time drift. For example, the peripheral device can slowly time drift away from actual time after the time-synchronization and/or send additional physiological data that has time-based inaccuracies. In specific embodiments, over time, the scale can identify a reoccurring time drift (e.g., every ten days, the peripheral device falls behind by one second) and provides the same to the peripheral device to automatically correct for the identified reoccurring time drift. Although, the time drift may not be constant over time in various embodiments.

Turning now to the figures, FIG. 1a shows an apparatus consistent with aspects of the present disclosure. The apparatus includes a scale 100 and a peripheral device 109. The scale 100 and peripheral device 109, in various embodiments, communicate various cardio-related data and other sensitive user data. The scale 100 collects and aggregates sensitive user data from both the scale 100 and the peripheral device 109. The scale 100 is used, in various embodiments, to calibrate a time of the peripheral device 109 and/or data from the peripheral device 109 by time-synchronizing the peripheral device 109 or data with the time of the scale 100. In specific aspects, data-assimilation circuitry 112 provides the synchronization.

The time-synchronization can account for time-based inaccuracies of the peripheral device 109. For example, both the scale 100 and the peripheral device 109 collect physiological data. The accuracy of the data from the peripheral device 109 and/or which data from the peripheral device 109 that is used by the scale 100 for aggregation, processing, and/or communication to other sources can be dependent on the relative time of the peripheral device 109. For example, the accuracy of a cardiac waveform generated using data from the peripheral device 109 is affected by the time. As a specific example, if a second associated with a time/a clock of the peripheral device 109 is faster or slower than an actual second, an electrocardiogram (ECG) or even a heart rate of the user can be inaccurate. Further, cardio-data collected after an event, such as after exercise or in response to an issue with a cardiac parameter, can be useful for diagnosis purposes. The scale 100 outputs respective data based on a time stamp of the data. If the time stamp of data from the peripheral device 109 is inaccurate, the correct data may not be aggregated and/or output.

In a number of embodiments, the user activates the time-synchronization. For example, the user activates a time-synchronization feature/service by providing an input to the scale 100 and/or another device in communication with the scale 100, such as the peripheral device 109 and/or another user device (e.g., external circuitry such as a server or standalone CPU). The input indicates an interest to activate (e.g., set-up) a time-synchronization feature/service and a number of set-up parameters of the service. The set-up parameters can include identification of the peripheral device 109 and how to communicate with the same. In various embodiments, the scale 100 has wireless communication capabilities, such as Bluetooth, and synchronization is performed by the user verifying identification of the peripheral device 109 and/or entering a code to the FUI of the scale 100, as further described herein. As further described herein, an override option, to override the time-synchrony, can also be presented to the user via the peripheral device 109 and/or the FUI of the scale 100.

Both the scale 100 and the peripheral device 109 collect sensitive user data. Sensitive user data, as used herein, includes data obtained by the scale 100 and/or the peripheral device 109 that is related to user health, lifestyle, and/or identification. For example, both the scale 100 and the peripheral device 109 collect physiological data including cardio-related data (e.g., cardiac waveforms including BCG and/or ECG). In addition, the peripheral device 109 can collect other exercise data and/or sleep data, among other data. Combining or otherwise assimilating the sensitive user data from the scale 100 and the peripheral device 109 is beneficial in identifying various risks of the user for conditions, in tracking the user's progress, and/or in making suggestions to the user. However, separately sending the data to a standalone CPU and/or server CPU is time consuming and can be frustrating for many users. Further, the scale 100, in various embodiments, verifies identification of the user using a scale-based biometric to increase security of the data communication. For example, as discussed further herein, in various embodiments, the scale 100 has a hierarchy of security measures depending on the sensitivity of the user data. For example, different scale-obtained biometrics are used to authorize communication of different levels of sensitive user data. Further, the user can adjust the settings of the various biometrics and levels of sensitive user data.

The scale 100, in various embodiments, includes a platform 101 and a user display 102. The user, as illustrated by FIG. 1a is standing on the platform 101 of the apparatus. The user display 102 is arranged with the platform 101. As illustrated by the dotted lines of FIG. 1a, the apparatus further includes processing circuitry 104, sensor-data processing circuitry 138, physiologic sensors 108, communication activation circuitry 114, and an output circuit 106. That is, the dotted lines illustrate a closer view of components of the scale 100.

The physiologic sensors 108, in various embodiments, include a plurality of electrodes integrated with the platform 101. The electrodes and corresponding force-sensor circuitry 139 are configured to engage the user with electrical signals and to collect signals indicative of the user's identity and cardio-physiological measurements while the user is standing on the platform 101. For example, the signals are indicative of physiological parameters of the user and/or are indicative of or include physiological data, such as data indicative of a BCG or ECG and/or actual body weight or heart rate data, among other data. As discussed further below, the signals can be force signals. The user display 102 is arranged with the platform 101 and the electrodes to output user-specific information for the user while standing on the platform 101. The processing circuitry 104 includes a CPU and a memory circuit with user-corresponding data 103 stored in the memory circuit. The processing circuitry 104 is arranged under the platform 101 upon which the user stands, and is electrically integrated with the force-sensor circuitry 139 and the plurality of electrodes (e.g., the physiologic sensors 108).

The data indicative of the identity of the user includes, in various embodiments, user-corresponding data, biometric data obtained using the electrodes and/or force sensor circuitry, voice recognition data, images of the user, input from a user's device, and/or a combination thereof and as discussed in further detail herein. The user-corresponding data 103 includes information about the user (that is or is not obtained using the physiologic sensors 108), such as demographic information or historical information. Example user-corresponding data includes height, gender, age, ethnicity, exercise habits, eating habits, cholesterol levels, previous health conditions or treatments, family medical history, and/or a historical record of variations in one or more of the listed data. The user-corresponding data 103 is obtained directly from the user (e.g., the user inputs to the scale) and/or from another circuit (e.g., a smart device, such as a cellular telephone, smart watch and/or fitness device, cloud system, etc.). The user-corresponding data 103 is input and/or received prior to and/or in response to the user standing on the scale.

In various embodiments, the processing circuitry 104 is electrically integrated with the force-sensor circuitry 139 and the plurality of electrodes are configured to process data obtained by the sensor-data processing circuitry 138 while the user is standing on the platform 101. The processing circuitry 104, for example, generates physiological data 107 (e.g., cardio-related data) corresponding to the collected signals and that is manifested as user data. Further, the processing circuitry 104 generates data indicative of the identity of the user, such as a scale-based biometric, a user ID and/or other user identification metadata. The user ID is identified, for example, in response to confirming the identification of the user using the collected signals indicative of the user's identity (e.g., a scale-based biometric).

The user data, in some embodiments, includes the raw signals, body weight, body mass index, heart rate, body-fat percentage, cardiovascular age, balance, tremors, among other non-regulated physiological data. In various embodiments, the processing circuitry 104, with the user display 102, displays at least a portion of the user data to the user. For example, unregulated user data is displayed to the user, such as user weight. Alternatively or in addition, the user data is stored. For example, the user data is stored on the memory circuit of the processing circuitry (e.g., the physiological data database 107 illustrated by FIG. 1a). The processing circuitry 104, in various embodiments, correlates the collected user data (e.g., physiological data) with user-corresponding data, such as storing identification metadata that identifies the user with the respective data.

In various embodiments, in response to the user standing on the platform 101, the processing circuitry 104 transitions the scale from a reduced power-consumption mode of operation to at least one higher power-consumption mode of operation. As discussed further herein with regard to FIG. 2, the different modes of operation, in some embodiments, include a sleep mode that uses a reduced amount of power and an awake mode that uses an additional amount of power as compared to the sleep mode. In a number of embodiments, the user display 102, sensor-data processing circuitry 138, and the processing circuitry 104 (among other components) transition from the reduced power-consumption mode of operation to the higher power-consumption mode of operation.

The processing circuitry 104 identifies a scale-based biometric of the user using the collected signals. For example, the scale-based biometric includes foot length, foot width, weight, voice recognition, facial recognition, and a combination thereof. In various embodiments, the scale-based biometric corresponds to a user ID and is used to verify the identity of the user. Using the scale-based biometric, the user data is validated as concerning the user associated with the scale-based biometric. The user data includes data indicative of the user's identity and the generated physiological data.

As illustrated, the peripheral device 109 includes physiological-measuring circuitry (e.g., sensor circuitry) 122, processing circuitry 111, and an output circuit 113. In various embodiments, the peripheral device 109 is a cellphone, a smartwatch, other smart devices, a tablet, a (photo) plethysmogram, a two terminal ECG sensor, and a combination thereof. The peripheral device 109 includes physiological-measuring circuitry 122 configured to collect various signals. For example, the peripheral device 109 collects signals indicative of physiological data and indicative of the user's identity. The physiological data, as used herein, includes cardio-related data and other sensitive user data, such as heartrate, body-mass-index, and weight, and is collected from a user. The physiological data obtained by the peripheral device 109 can be obtained during or after exercise and as is sometimes referred to as "a second set of physiological data."

The peripheral device 109, in various embodiments, communicates various physiological data and other sensitive user data. For example, the peripheral device 109 communicates, using the output circuit 113, to the scale 100 (and/or data-assimilation circuitry 112) during an exercise session. Specifically, the peripheral device 109 collects physiological data indicative of a physiological parameter, such as heart rate of the user, during an exercise test.

In various embodiments, the peripheral device 109 collects signals indicative of the user's identity. The collected signals indicative of the user's identity include the authorization data to authorize use of the peripheral device 109 and, optionally, is sent to the scale 100 to authorize communication. For example, the peripheral device 109 identifies the authorization data of the user using the collected signals indicative of the user's identity and, therefrom, validates the collected signals as concerning the user associated with the authorization data and/or a user profile.

Example authorization data includes data selected from the group consisting of a password, a passcode, a biometric, a cellphone ID, and a combination thereof. A peripheral device-based biometric, in various embodiments, includes biometrics selected from the group consisting of: a finger print, voice recognition, facial recognition, DNA, iris recognition, typing rhythm, and a combination thereof, in various embodiments. Responsive to collecting the authorization data and/or verifying the authorization data as corresponding to the user, the peripheral device 109 outputs the authorization data to the scale 100. The authorization data is collected, in various embodiments, prior to, during, and/or after, the scale 100 collecting various signals.

In some embodiments, the scale 100, optionally, receives the authorization data and, in response to both the authorization data and the scale-based biometric corresponding to the user, activates communication between the scale 100 and the peripheral device 109. For example, the scale includes a communication activation circuitry 114 to activate the communication. The communication activation circuitry 114, in some embodiments, includes an AND gate to activate the communication in response to receiving both the identified scale-based biometric and the authorization data that correspond to the same user. Although embodiments are not so limited and the communication activation circuitry can include various circuit components and/or processing circuitry to activate the communication and/or verify both the scale-based biometric and the authorization data correspond to the specific user. Further, in various specific embodiments, the communication is activated in response to the scale-based biometric identified using the scale 100 and verification of the peripheral device 109 based on data in a user profile corresponding with the user (e.g., identification of the user device) and/or within the sensitive user data sent by the peripheral device 109.

In response to the activation, the peripheral device 109 outputs sensitive user data to the scale 100. For example, the output circuit 106 receives the sensitive user data from the peripheral device 109 and, in response, outputs the sensitive user data to the processing circuitry 104. In various embodiments, the output circuit 106 displays on the user display 102 the user's weight and the data indicative of the user's identity and/or the generated physiological data corresponding to the collected signals. The communication, in various embodiments, includes a wireless communication and/or utilizes a cloud system.

The scale 100 receives the sensitive user data and validates the sensitive user data as concerning a specific user associated with a user profile (based on the communication activation and/or a user ID within the user data), such as using authorization data and/or other identifying data in the sensitive user data. The sensitive user data includes data collected using sensor circuitry, such as accelerometers and/or electrodes, and/or using processing circuitry. For example, a user inputs sensitive user data to peripheral device 109 and/or another standalone CPU.

In some embodiments, the peripheral device 109, using the physiological-measuring circuitry 122 and the processing circuitry 111, collects signals indicative of physiological data. For example, the physiological-measuring circuitry 122, includes electrodes and/or other circuitry configured and arranged to collect the signals. The signals include recordings of electrical activity of the user's heart over a period of time and that are collected by placing electrodes on the user's body. The electrodes detect electrical changes on the skin and/or other surface that arise from the heart muscle depolarizing during each heartbeat. That is, the signals are indicative, in various embodiments, of an ECG of the user. The processing circuitry 111 of the peripheral device 109 receives the collected signals, and, therefrom generates the cardio-physiological data (e.g., the ECG). The peripheral device 109 can include a two-terminal ECG sensor and/or a plethysmogram sensor, in various embodiments. The output circuitry 113 outputs the sensitive user data to the scale 100 and/or the data-assimilation circuitry 112 (e.g., external circuitry).

Further, the scale 100 aggregates the sensitive user data obtained by the scale 100 (e.g., user data) with the sensitive user data from the peripheral device 109. For example, the aggregation includes combining and/or correlating the data. In addition, the scale 100 can securely communicate the aggregated sensitive user data to external circuitry using a secure connection to a server, by verifying the communication using a scale-obtained biometric, and/or by performing additional security measures on the data.

In various embodiments, the scale 100 correlates portions of the user data obtained by the scale 100 with the sensitive user data obtained by the peripheral device 109. The correlation includes placing the physiological data in phase, in the same and/or similar time range, in the same and/or similar time scale, and/or other correlation. For example, the -physiological data from the scale 100, in a number of embodiments, includes data indicative of a BCG and the physiological data from the peripheral device 109 includes data indicative of an ECG. The correlation includes placing the BCG data in phase with the ECG data, such that the two cardiogram waveforms correspond to one another. Alternatively or in addition, the BCG and ECG data includes time stamps and the correlation includes matching the data based on the time stamps. The correlated data is stored in a user profile corresponding with the user, such as a user profile stored on the scale 100.

As previously described, in various embodiments, the time of the peripheral device 109 can be inaccurate, due to time drifting and/or inaccurate set up. The scale and/or data-assimilation circuitry 112 can be used to adjust the time of the peripheral device 109, which can increase accuracy of the peripheral device 109 and/or be used to determine which data to aggregate or output. The data-assimilation circuitry 112 is circuitry configured to assimilate physiological data from the scale 100 with physiological data from the peripheral device 109. In various embodiments, the data-assimilation circuitry 112 is located on the scale 100, on external circuitry (e.g., server CPU and/or standalone CPU), and/or on the peripheral device 109. Further, the data-assimilation circuitry 112 can be located on a combination of the scale 100, the external circuitry, and/or the peripheral device 109. For example, data-assimilation circuitry 112 can be located in the weighing-scale housing and integrated with the sensor-data processing circuitry 138. In other embodiments, the data-assimilation circuitry 112 is remote from the weighing-scale platform and housing, and communicatively coupled thereto via a communication channel defined by the communication circuitry of the scale (e.g., output circuit 106).

The first set of physiological data obtained by the scale 100 can have an accuracy component that is dependent on or define using a time-based interval or time-based metric. A time-based interval or time-based metric includes or refers to a rate of time as defined by circuitry and/or a device. For example, the time-based interval can include a passage of a second (or more) according to the scale. The second set of physiological data obtained by the peripheral device 109 (e.g., via the physiological-measuring circuitry 122) can be subject to time-based inaccuracies due to a time-based interval or time-based metric according to the peripheral device 109.

The data-assimilation circuitry 112 can provide synchronization by accessing a profile having information for identifying the user in response to the user standing on the platform 101 of the scale 100. The profile (sometimes referred to as a "user profile") can be stored on memory of the scale and/or memory of external circuitry. As previously described, the user can be identified via scale-obtained biometric using the scale 100. In some embodiments, the scale-obtained biometric and/or the other user identifying information is output to the data-assimilation circuitry 112. The data-assimilation circuitry 112 can access an indication of the time interval or metric derived from the first set of physiological data. The time interval or metric can be stored in memory that the data-assimilation circuitry 112 can access and/or can be calculated using the first set of physiological data and/or additional data.

The data-assimilation circuitry 112 can provide the second set of physiological data derived from physiological-measuring circuitry of the peripheral device 109. In various embodiments, the second set of physiological data is provided by identifying the peripheral device 109. For example, in implementations where the data-assimilation circuitry 112 is located on the scale 100 and/or external circuitry, the scale 100 and/external circuity identifies the peripheral device and communicates with the peripheral device 109 to obtain the second set of physiological data. In implementations in which the assimilation circuitry 112 is located on the peripheral device 109, the data is provided by obtaining the data using the physiological-measuring circuitry of the peripheral device 109 and/or locating the data in memory of the peripheral device 109.

The data-assimilation circuitry 112 accounts for the time-based inaccuracies of the second set of physiological data relative to an accuracy component (e.g., the time-based interval or time-based metric) of the first set of physiological data. The time-based inaccuracies can be accounted for concurrently with and derived from comparing aspects of the first and second sets of physiological data. The time-based inaccuracy can be determined and/or otherwise accounted for based on the time-based interval or time-based metric of the scale 100. Accounting for the time-based inaccuracies, in various embodiments, includes adjusting the second set of physiological data and/or adjusting a time-based interval or time-based metric of the peripheral device 109 (e.g., normalizing the second set of physiological data to reflect the time-based interval or metric of the scale and/or adjusting the time-based interval of metric of the peripheral device). The comparison of the sets of data, in specific embodiments, can include combining the data sets, obtaining additional meaning or correlations, outputting portions based on the comparison, among other actions as described throughout the present disclosure. For example, the comparison can include correlates portions of the physiological data sets, such as placing the data in phase, in the same and/or similar time range, in the same and/or similar time scale, and/or other correlation.

In some specific embodiments, the scale 100 (or the external circuitry or peripheral device 109) can derive the time interval and/or metric. For example, the scale 100 calculates a time difference between the scale and the peripheral device 109 by outputting a message requesting a time of the peripheral device 109. The scale 100 receives a return message back with the time according the peripheral device 109 and calculates a difference from the time according to the scale 100.

In various related embodiments, a time-latency effects the calculated time difference. Time-latency, as used herein, includes or refers to an amount of time for a message to travel from the source to the destination. For example, a time-latency can include the time for the message to travel from the scale to the peripheral device 109, the time for the peripheral device 109 to process the message and/or the time for the return message to travel from the peripheral device 109 to the scale (e.g., the round trip time including the time for the signal to be sent, plus the processing time by the peripheral device 109 and the length of time for the return message to be received). The time difference is determined based on the time according to the scale 100 that the message was sent and the time according to the peripheral device 109 in the return message, taking into account the time-latency.

As a specific example, the time-latency is the time according to the scale 100 that the message was sent minus the time according to the scale that the return message was received and divided by two (as the peripheral device 109 provides a time stamp prior to sending the return message back). In other specific examples, the time-latency is calculated by the scale 100 based on data in the return message. For example, the return message can include a time stamp of when the message is received at the peripheral device 109 and a time stamp of when the return message is output. The scale 100 calculates the processing time of the peripheral device 109 (e.g., the time taken to output a return message) by determining the difference in time between the two time stamps, such as the subtracting the time stamp of when the message is received from the time stamp of when the return message is output to provide a relative amount of time for processing the message. The scale uses the processing time to determine the time-latency associated with the amount of time for the message to be received by the peripheral device 109. For example, the scale subtracts the time according to the scale that the message was output from the time according to the scale that the return message is received at the scale and also subtracting the processing time of the peripheral device. The product can be divided by two to account for one-way travel time of the message (and not the round trip of the message and the return message).

The following illustrates the above described function of the processing time of the peripheral device $Pt_{wd}$:

$$Pt_{wd} = (\text{Time}_{mr} - \text{Time}_{ro}) \quad \text{Eq. 1,}$$

wherein $\text{Time}_{mr}$ includes a time stamp accordingly to the peripheral device 109 of when the message from the scale 100 is received and $\text{Time}_{ro}$ includes a time stamp according to the peripheral device 109 of when the return message is output to the scale 100. Further, the following illustrates an example function of determining the time-latency $L_T$:

$$L_T = [(\text{Time}_{mo} - \text{Time}_{rr}) - Pt_{wd}]/2 \quad \text{Eq. 2,}$$

wherein the $\text{Time}_{mo}$ includes the time according to the scale 100 that the message is output (that requests the time according to the peripheral device 109). The $\text{Time}_{rr}$ includes the time according to the scale 100 that the return message is received by the scale 100. In other embodiments, the time-latency and/or processing time of the peripheral device 109 is a value that is known by the scale 100 (e.g., a predetermined value). Although embodiments are not so limited and the time-latency can be calculated in a variety of manners.

Further, the scale 100 uses the time-latency and processing time to determine the time difference between the time according to the scale 100 and time according to the peripheral device 109. For example, the time difference $\text{Time}_{difference}$ can be calculated by:

$$\text{Time}_{difference} = \text{Time}_{mo} - \text{Time}_{rm} - L_T \quad \text{Eq. 3,}$$

Wherein the $\text{Time}_{mo}$ includes the time according to the scale 100 that the message is output. The $\text{Time}_{rm}$ includes the time according to the peripheral device 109 that is included in the response message. In some embodiments, the $\text{Time}_{rm}$ includes a time stamp by the peripheral device 109 of when the message from the scale 100 is received ($\text{Time}_{mr}$). And $L_T$ includes time-latency, which can be calculated according to one of the various described techniques.

The time-synchronization can be repeated in various embodiments. For example, time-synchronization can be repeated at periodic times. The repetition can mitigate or avoid the peripheral device 109 from drifting away from the time of the scale 100. In other embodiments, the time-synchronization is repeated immediately before specific services are performed, as physiological data is provided by the peripheral device, and/or measurements are obtained by the peripheral device 109 (e.g., responsive to the user standing on the scale 100 and/or the scale 100 otherwise transitioning from a low power mode to a higher power mode of operation). In specific embodiments, the user requests a cardiac waveform and/or indicates that they are exercising. In response to the request and/or indication, the time-synchronization is repeated.

Although the above-embodiment describes adjusting the time of the peripheral device, embodiments are not so limited. For example, the second set of physiological data can be adjusted to account for the time-based inaccuracies. The adjustment can be by data-assimilation circuitry 112 of the scale 100, of the peripheral device 109, or from other external circuitry. The second set of physiological data obtained by the peripheral device 109 is corrected and/or normalized based on the time interval or metric of the scale 100 (e.g., a time scale of the scale 100 as compared to the time scale of the peripheral device 109). In specific examples, the second set of physiological data, over time, can indicate a time drift. The scale 100 is synchronized with a time-standard and is used to adjust the second set of physiological data. In specific embodiments, the second set of physiological data is normalized based on a comparison and to account for the differences in the time interval or metric of the scale and the time interval of metric of the peripheral device 109.

A time standard can include or refer to a specification for measuring time including the rate at which time passes. For instance, the International Bureau of Weights and Measures (BIPM) is responsible for maintaining accurate worldwide time of day. It combines, analyzes, and averages the official atomic time standards of member nations around the world to create a single, official Coordinated Universal Time (UTC). Such a clock is based upon a timescale that is designed around the time of one rotation of the Earth. Other examples of time standards include apparent solar time, sidereal time, mean solar time, and/or Greenwich Mean Time (GMT), among other standards.

The scale 100, in specific embodiments, obtains and aggregates scale-obtained data with data obtained by the peripheral device 109. The scale 100 may select to aggregate data and/or output data. For example, particular data may be of greater interest for particular purposes. As a specific example, for diagnostic purposes, data immediately after exercise is of interest. The scale 100 uses the time stamp of the data to determine which data to aggregate and output for diagnostic purposes. The accuracy of the time of the peripheral device 109 can thereby effect which data is output and/or aggregated by the scale 100. For example, inaccurate time may result in aggregated and output data that is not particularly useful and/or indicative for diagnosis purposes.

In a number of specific embodiments, the peripheral device 109 may have time updates by sources in addition to the scale 100. For example, a user may manually update the time. In other embodiments, GPS is used to update the time of the peripheral device 109 periodically, in response to a change in time zone, and/or based on day lights savings time. GPS updates can use additional power than a time-synchronization performed using the scale. Accordingly, embodiments in accordance with the present disclosure can reduce battery consumption of a peripheral device 109 for adjusting time by using the scale 100 to perform time-synchronization and reducing (or turning off the feature) the amount of GPS time-updates.

When the scale 100 performs the time-synchrony service/feature, identification of a time update from another source can prevent errors. For example, the scale 100 may calculate an additional time drift (after the initial time-synchronization) due to a time update by another source. The scale 100 identifies the time update (or time reset) by request for information on any time update to the peripheral device 109 between the last time-synchronization with the scale 100 in the message output to the peripheral device 109. The peripheral device 109 outputs a return message with the time of the peripheral device 109 and identification of any time update. The identification can include a source of the update (e.g., human input, GPS, cellular service, system update), the time according to the peripheral device 109 of the update and what time the update was to. Although the above and below embodiments describe the scale 100 performing the time-synchrony, in some embodiments, another device (e.g., the peripheral device 109 or external circuitry) performs the time-synchrony feature.

As a specific example, the return message indicates a time of the peripheral device 109 of 5:15:01, and an indication that a time update occurred by GPS at what was then 3:13:45 according to the peripheral device 109 and updated to a time of 2:13:41. The scale 100 uses the information on the last update and corrects for any time drift (using the time-latency) based on the last updated time, in response to the source being a trusted source. If the source is not trusted, the scale 100 calculates the time difference as previously described. The scale 100 can include a predetermined list of trusted sources which can be updated by the user and/or the scale system.

In various embodiments, the time-synchrony feature is used for an Internet-of-Things (IoT) application. For example, a millisecond-scale synch of two or more devices can be useful for IoT applications. The inter-device synchrony can be performed with or without internet connectivity. For example, the devices (scale and peripheral device) can communicate via Near-field-communication (NFC), BlueTooth, Wireless (WiFi), and/or synchronized high frequency data (e.g., pick up radio frequencies in data communications).

In a number of embodiments, the scale 100 is configured to collect data from a plurality of users. In such embodiments, the scale 100 differentiates between the different uses based on scale-based biometrics. The scale-obtained data includes health data that is sensitive to the user, such that unintentional disclosure of scale-obtained data is not desired. Differentiating between the two or more users and automatically communicating (e.g., without further user input) user data responsive to scale-obtained biometrics, in various embodiments, provides a user-friendly and simple way to communicate data from a scale while avoiding and/or mitigating unintentional (and/or without user consent) communication. For example, the scale 100, such as during an initialization mode for each of the two or more users, collects user data to identify the scale-based biometrics and stores an indication of the scale-based biometrics in a user profile corresponding with the respective user. During subsequent measurements, the scale 100 recognizes the particular user by comparing collected signals to the indication of the scale-based biometrics in the user profile. The scale 100, for example, compares the collected signals to each user profile of the two or more users and identifies a match between the collected signals and the indication of the scale-based biometrics. A match, in various embodiments, is within a range of values of the indication stored. Further, in response to verifying the scale-based biometric(s), a particular communication mode is authorized. In accordance with various embodiments, the scale 100 uses a cardiogram of the user and/or other scale-obtained biometrics to differentiate between two or more users.

The scale 100, responsive to the identification, can recognize that the particular user has enabled a time synchrony feature/service. For example, the users may have different peripheral devices and/or only a portion may have a peripheral device. The scale 100 communicates with a particular peripheral device that is correlated with the specific user.

The scale 100 can communicate the aggregated sensitive user data, in various embodiments, by authorizing the communication based on the biometric identified and adding various security measures to the sensitive user data in response to the authorized communication. For example, in various embodiments, the user profiles are associated with a hierarchy of different levels of biometrics that enable different data to be communicated and/or to different sources. For example, in response to verifying a first biometric, the scale 100 outputs the user's weight to the user's smartphone or other standalone CPU. In response to verifying a second biometric, the scale outputs additional data to external circuitry 112 and/or that is more user-sensitive, as discussed further herein. In response to verifying the second biometric, the scale 100 outputs the user data (such as higher-sensitivity user data) to the smartphone or standalone CPU, to the smartphone/standalone CPU for sending to a third party, and/or directly to the third party.

As an example, for sensitive user data, the above described biometrics are used as directed by the user for indicating and defining protocol to permit such data to be exported from the scale to other external circuitry. In more specific embodiments, the scale 100 operates in different modes of data security including, for example: a default mode in which the user's body mass and/or weight is displayed regardless of any biometric which would associate with the specific user standing on the scale 100; another mode in which complicated data (or data reviewed infrequently) is only exported from the scale under specific manual commands provided to the scale 100 under specific protocols; and another mode or modes in which the user-specific data that is collected from the scale is processed and accessed based on the type of data. Such data categories include categories of different levels of importance and/or sensitivities such as the above-discussed high and low level data and other data that might be very specific to a symptom and/or degrees of likelihood for diagnoses. Optionally, the CPU in the scale 100 is also configured to provide encryption of various levels of the user's sensitive data.

The different modes of data security and communication are enabled in response to biometrics identified by the user and using the FUI. In some embodiments, the scale 100 is used by multiple users and/or the scale 100 operates in different modes of data security and communication in response to identifying the user based on biometrics. The different modes of data security and communication include, for example: a first mode (e.g., default mode) in which the user's body mass and/or weight is displayed regardless of any biometric which would associate with the specific user standing on the scale 100 and no data is communicated to external circuitry; a second mode in which complicated/more-sensitive data (or data reviewed infrequently) is only exported from the scale 100 under specific manual commands provided to the scale under specific protocols and in response to a biometric; and a third mode or modes in which the user-specific data that is collected from the scale is processed and accessed based on the type of data and in response to a biometric. Such data categories include categories of different levels of importance and/or sensitivities such as the above-discussed high and low level data and other data that might be very specific to a symptom and/or degrees of likelihood for diagnoses. Optionally, the CPU in the scale is also configured to provide encryption of various levels of the user's sensitive data.

In a specific embodiment, a first user of the scale 100 may not be identified and/or have a user profile set up. In response to the first user standing on the scale 100, the scale 100 operates in a default mode. During the default mode, the scale 100 displays the user's body mass and/or weight on the user display and does not output user data. The scale 100, in various embodiments, displays a prompt (e.g., an icon) on the FUI indicating the first user can establish a user profile. In response to the user selecting the prompt, the scale 100 enters an initialization mode. During the initialization mode, the scale 100 asks the user various questions, such as identification of external circuitry to send data to, identification information of the first user, and/or demographics of the user. The user provides input using the FUI to establish various communication modes associated with the user profile and scale-based biometrics to enable the one or more communication modes. The scale 100 further collects user data to identify the scale-based biometrics and stores an indication of the scale-based biometric in the user profile such that during subsequent measurements, the scale 100 recognizes the user and authorizes a particular communication mode. Alternatively, the user provides inputs for the initialization mode using another device that is external to the scale 100 and in communication with the scale (e.g., a cellphone).

A second user of the scale 100 has a user profile set up that indicates the user would like data communicated to a computing device of the user. When the second user stands on the scale, the scale 100 recognizes the second user based on a biometric and operates in a first communication mode. During the first communication mode, the scale 100 outputs at least a portion of the user data to an identified external circuitry. For example, the first communication mode allows the user to upload data from the scale 100 to a user identified external circuitry (e.g., the computing device of the user). The information may include user data and/or user information that has low-user sensitivity, such as user weight and/or BMI. In the first communication mode, the scale 100 performs the processing of the raw sensor data and/or the external circuitry. For example, the scale sends the raw sensor data and/or additional health information to a user device of the user. The computing device may control access to the raw sensor data to the user. For example, the computing device can ask the user if the user would like generic health information and/or regulated health information as a service. In response to receiving an indication the user would like the generic health information and/or regulated health information, the computing device outputs the raw sensor data and/or non-regulated health information to another external circuitry for processing, providing to a physician for review, and controlling access, as discussed above.

In one or more additional communication modes, the scale 100 communicates with other circuitry, such as with the peripheral device 109 and with an external circuitry for further processing. For example, during a second communication mode and a third communication, the scale 100 sends the sensitive data to external circuitry. Using the above-provided example, a third user of the scale 100 has a user profile set up that indicates the user has activated a time-synchrony feature/service and that the third user would like scale-obtained data to be communicated to external circuitry for further processing, such as to determine generic health information. When the third user stands on the scale 100, the scale 100 recognizes the third user based on one or more biometrics and operates in a second communication mode. During the second communication mode, the scale 100 time-synchronizes with the peripheral device 109 and obtains data from the peripheral device 109. For example, the scale 100 time-synchronizes the peripheral device 109 as previous described. The scale 100 receives data from the peripheral device 109 and outputs data, aggregated from the scale 100 and the peripheral device 109, to the external circuitry. The external circuitry identifies one or more risks, and, optionally, derives generic health information. In some embodiments, the external circuitry outputs the generic health information to the scale 100. The scale 100, in some embodiments, displays a synopsis of the generic health information and/or outputs a full version of the generic health information to another user device for display (such as, using the filter described above) and/or an indication that generic health information can be accessed.

A fourth user of the scale 100 has a user profile set up that indicates the fourth user has enabled a service to access regulated health information. When the fourth user stands on the scale 100, the scale 100 recognizes the user based on one or more biometrics and operates in a fourth communication mode. In the fourth communication mode, the scale outputs data to the external circuitry, including the data aggregated by the scale 100 and the peripheral device 109, in various embodiments, and the external circuitry processes the data and controls access to the data. For example, the external circuitry may not allow access to the regulated health information until a physician reviews the information. In some embodiments, the external circuitry outputs data to the scale, in response to physician review. For example, the output data can include the regulated health information and/or an indication that regulated health information is ready for review. The external circuitry may be accessed by the user, using the scale and/or another user device.

In some embodiments, using the FUI of the scale 100, the scale 100 displays the regulated health information to the user. The scale, in some embodiments, displays a synopsis of the regulated health information (e.g., clinical indication) and outputs the full version of regulated health information to another user device for display (such as, using the filter described above) and/or an indication that the regulated health information can be accessed to the scale 100 to display.

In various embodiments, if the scale 100 is unable to identify a particular (high security) biometric that enables the fourth communication mode, the scale may operate in a different communication mode and may still recognize the user. For example, the scale may operate in a default communication mode in which the user data collected by the scale 100 is stored in a user profile corresponding to the fourth user and on the scale. In some related embodiments, the user data is output to the external circuitry at a different time.

Although the present embodiments illustrate a number of security and communication modes, embodiments in accordance with the present disclosure can include additional or fewer modes. Furthermore, embodiments are not limited to different modes based on different users. For example, a single user may enable different communication modes in response to particular biometrics of the user identified and/or based on user settings in a user profile.

Using the scale 100 as a hub to collect various sensitive user data and to communicate the user data to external circuitry, automatically and without user input, can reduce the time for a user to output various user data for correlation and processing. Further, as the scale 100 is not accessible by other circuitry and/or may not include additional applications, the scale 100 is less likely to be accessed by others, as compared to the user devices. For example, the scale 100 accesses user data only in response to verifying the user using a scale-based biometric, in some embodiments.

In various embodiments, the aggregated data from the scale 100 and the peripheral device 109 is further processed and/or analyzed. For example, using the aggregated data, external circuitry, such as a standalone CPU and/or server CPU, medically assesses the user, provides clinical indications, provides generic health information that correlates to the correlated data, and controls access to the various data, among other analyses. For example, using the aggregated data, the external circuitry determines cardio-related data. The cardio-related data includes physiological parameters, such as a cardiac output, a PWV, a revised BCG or ECG, pre-ejection period, stroke volume, arterial stiffness, respiration, and/or other parameters. Further, using the cardio-related data, the external circuitry derives clinical indication data. The clinical indication data, as used herein, is indicative of a physiological status of the user and can be used for assessment of a condition or treatment of the user. Example clinical indication data includes physiological parameters, risk factors, and/or other indicators that the user has a condition or could benefit from treatment. For example, the user is correlated with the condition or treatment by comparing the cardio-related data to reference information. The reference information, in various embodiments, includes a range of values of the cardio-related data for other users having the corresponding condition or treatment indicators. The other users are of a similar demographic background of the user, such that the reference information includes statistical data of a sample census.

For example, in specific embodiments, in response to the user standing on the scale, the scale 100 transitions from the reduced-power mode of operation to the higher-power mode of operation and collects signals indicative of user's identity. In response to the transition, the scale 100 collects signals indicative of cardio-physiological measurements (e.g., force signals). The processing circuitry 104 identifies a scale-based biometric using the collected signals and processes the signals to generate physiological data manifested as user data. Further, the processing circuitry 104 validates user data, which includes data indicative of the user's identity and the physiological data, as concerning the user associated with the scale-based biometric. Optionally, the validation includes correlating the user data with a user ID in response to the validation. During, after, and/or before the identification of the scale-based biometric, the peripheral device 109 collects signals indicative of the user's identity and, therefrom, identifies authorization data corresponding to the user and sensitive user data. The peripheral device 109 communicates the sensitive user data, and, optionally the authorization data to the scale 100. In response to verifying the sensitive user data from the peripheral device 109 is correlated with the same user, the scale 100 aggregates the sensitive user data from the peripheral device 109 with the scale-obtained data, encrypts the aggregated sensitive user data, and outputs the aggregated sensitive user data to external circuitry.

In accordance with a number of embodiments, the external circuitry provides additional health information to the user using the user data from the scale 100 and sensitive user data from the peripheral device 109. The peripheral device 109 (and/or the scale 100), for example, receives user input data that indicates the user is interested in additional (non-Rx) health information and various categories of interest. The categories of interest, in a number of embodiments, include demographics of interest, symptoms of interest, disorders of interest, diseases of interest, drugs of interest, treatments of interest, etc. The peripheral device 109 and/or the scale 100 further communicates the additional health information to another circuitry such that the user can print the additional health information.

Figure 1B:
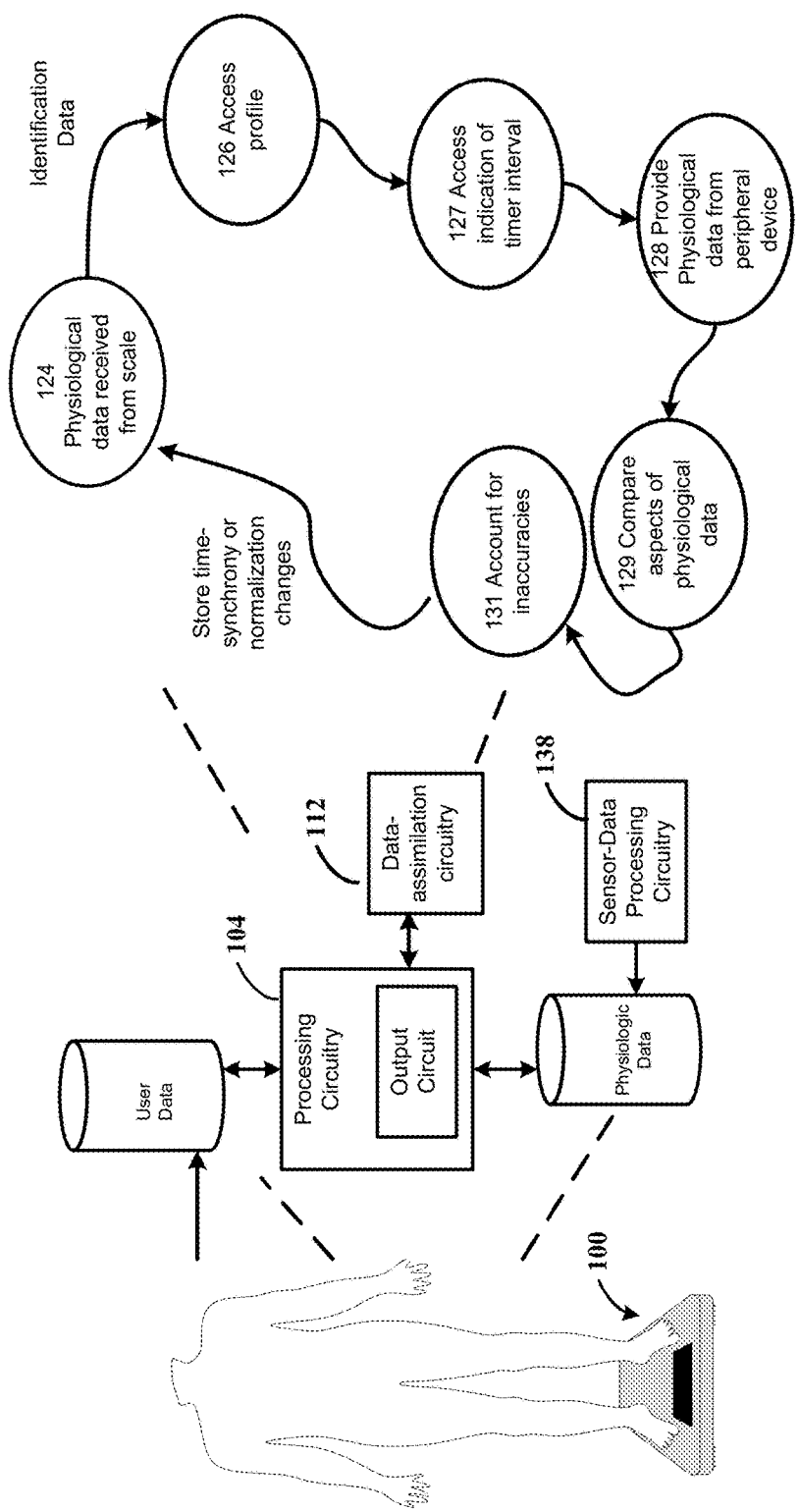
FIGS. 1b-1c show examples of a scale time-synchronizing with a peripheral device consistent with aspects of the present disclosure.
Figure 1C:
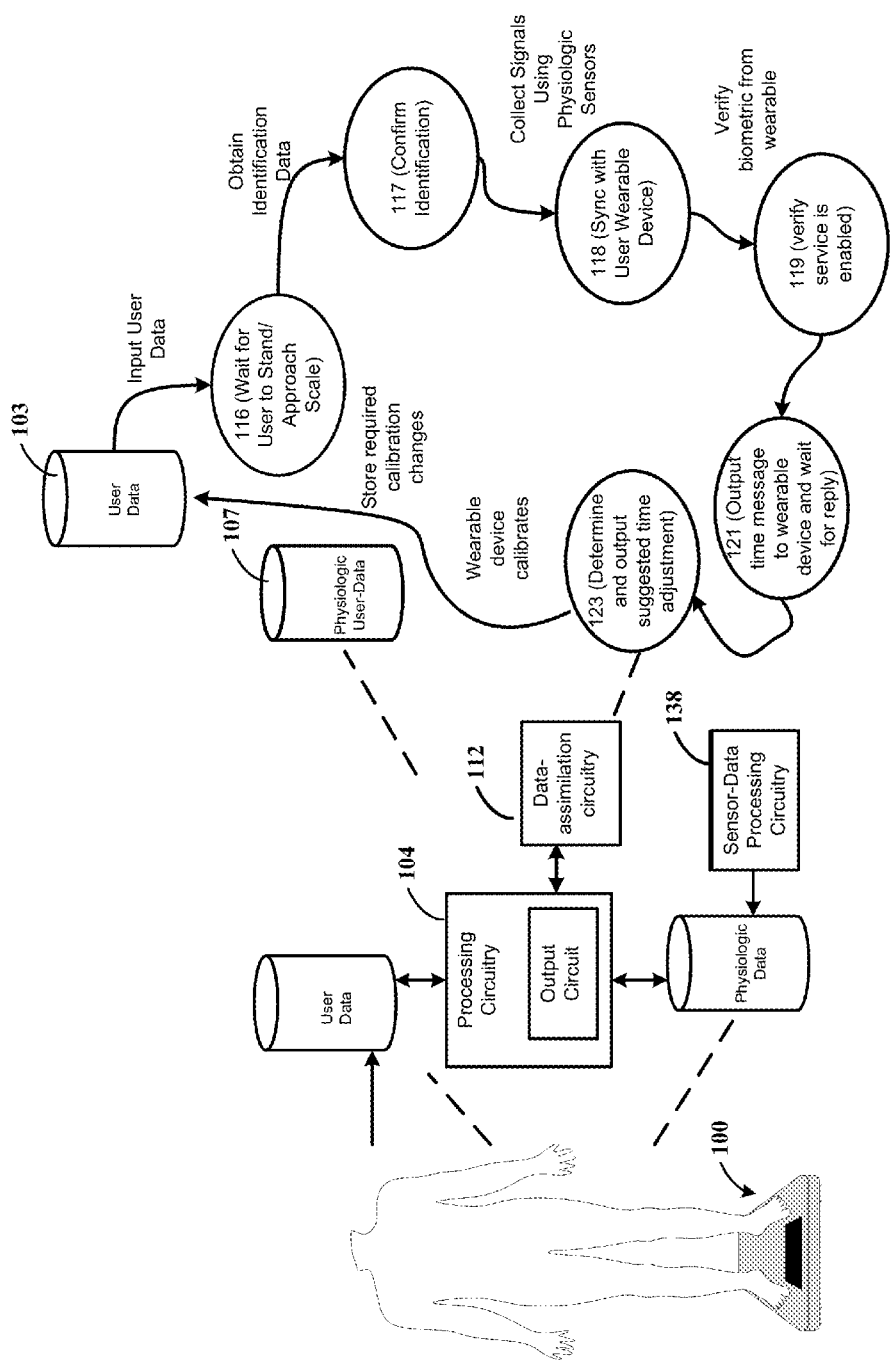

FIGS. 1b-1c show examples of time-synchronizing a scale with a peripheral device consistent with aspects of the present disclosure. As illustrated by FIG. 1b, the time-synchrony can include accounting for time-based inaccuracies of physiological data collected using a peripheral device, in various embodiments, using data-assimilation circuitry 112. For example, the data-assimilation circuitry 112 can be a part of the scale 100, a part of external circuitry, and/or a part of the peripheral device. The data-assimilation circuitry 112 provides synchronization of the second set of physiological data obtained by the peripheral device to the first set of physiological data obtained by the scale 100.

At 124, the data-assimilation circuitry 112 can receive a first set of physiological data from the scale 100. The data-assimilation circuitry 112 can be in communication with the scale via communication circuitry (e.g., output circuit) of the scale and/or can be a component of the scale 100. The first set of physiological data is output, in various embodiments, responsive to the user standing on the platform. The first set of physiological data can include identification data, such as a scale-obtained biometric and/or a user ID. At 126, the data-assimilation circuitry 112 accesses a user profile. The user profile has information for identifying the user. For example, the data-assimilation circuitry 112 can compare the identification data in the first set of physiological data to the user profile (e.g., to the information for identifying the user in the user profile) to identify the user.

The data-assimilation circuitry 112, at 127, accesses an indication of the time interval or metric from the first set of physiological data (which is specific to the user). The access can include deriving the time-based interval or metric based on identification of time-standard that the scale uses and the first set of physiological data and/or based on a stored time-based interval or metric associated with the scale that the user is standing on. In various embodiments, the time-based interval or metric is output by the scale as a portion of the first set of physiological data.

At 128, the data-assimilation circuitry 112 provides a second set of physiological data. The second set of physiological data is from and specific to the user and can be subject to time-based inaccuracies. For example, a peripheral device can obtain the second set of physiological data via physiological-measuring circuitry of the peripheral device. Providing the second set of physiological data can include identifying the peripheral device and communicating with the peripheral device to obtain the data. In other embodiments, providing the second set of physiological data can include obtaining the data using physiological-measuring circuitry and/or identifying a location of stored data (in memory of the peripheral device or via a Cloud system).

At 129 and 131, the data-assimilation circuitry 112 compares aspects of the first and second set of physiological data while accounting for the time-based inaccuracies of the second set of physiological data. The time-based inaccuracies can be accounted for concurrently with and/or derived from comparing aspects of the first and second sets of physiological data. The time-based inaccuracy can be determined and/or otherwise accounted for based on the time-based interval or time-based metric of the scale. Accounting for the time-based inaccuracies, in various embodiments, includes adjusting the second set of physiological data and/or adjusting a time-based interval or time-based metric of the peripheral device (e.g., normalizing the second set of physiological data to reflect the time-based interval or metric of the scale and/or adjusting the time-based interval of metric of the peripheral device). The comparison of the sets of data, in specific embodiments, can include combining the data sets, obtaining additional meaning or correlations, outputting portions based on the comparison, among other actions as described throughout. In specific embodiments, the second set of physiological data is normalized based on a comparison and to account for the differences in the time interval or metric of the scale and the time interval of metric of the peripheral device. Alternatively and/or in addition, the time measure of the peripheral device is adjusted. Further, the adjustment (e.g., time-synchrony and/or normalization changes) can be stored for future use.

FIG. 1c shows an example of a scale time-synchronizing with a peripheral device consistent with aspects of the present disclosure. As illustrated, the scale 100 can adjust a time of a peripheral device. The adjustment can increase accuracy of the peripheral device, such as increasing accuracy of a measured cardiac-parameter (e.g., ECG, heart rate, etc.).

As previously discussed, the scale 100 collects highly sensitive user data, such as cardiogram data and data indicative of disorders and disease, and other user data, such as demographic information and weight. The scale 100 displays data, such as user weight, prompts or notifications, and other information using a user interface, such as a FUI. A FUI includes or refers to a user interface that receives inputs from the user's foot (e.g., via the platform) to allow the user to interact with the scale. A user interface includes or refers to interactive components of a device (e.g., the scale) and circuitry configured to allow interaction of a user with the scale (e.g., hardware input/output components, such as a screen, speaker components, keyboard, touchscreen, etc., and circuitry to process the inputs). The user interaction includes the user moving their foot relative to the FUI, the user contacting a specific portion of the user display, the user shifting their weight, etc.

The peripheral device also collects various sensitive user data, such as data pertaining to exercise, food or liquid intake, sleep, and cardiogram signals, among other information. The peripheral device outputs at least a portion of the sensitive user data to the scale for further processing and/or analytics.

In various embodiments, the scale 100 and peripheral device synchronize to achieve time synchrony. By using the scale 100 to time-synchronize, the peripheral device, which may be battery powered, reduces power consumption for increasing time accuracy as compared to a GPS or system time update. Synchronizing the scale 100 and the peripheral device, as used herein, includes a wireless communication between the two devices. In various specific embodiments, synchronizing includes copying data from the scale 100 to the peripheral device and/or from the peripheral device to the scale 100, such that both devices have a copy of the data.

For example, the user can activate the time-synchronization by an input to the scale 100 and/or peripheral device. The input can include an indication to perform the time-synchronization and information for how to communicate between the scale 100 and the peripheral device. As previously described, the input can include identification of the scale 100 or peripheral device and a communication used to synchronize (e.g., Bluetooth code or a password). In various embodiments, the inputs are to a FUI of the scale 100, although embodiments are not so limited.

As an example process, at 116, the scale waits for the user to stand on the scale 100 and/or approach the scale 100. In response, the scale 100 transitions from a reduced power-consumption mode of operation 116 to at least one higher power-consumption mode of operation 117. At 117, the scale 100 collects signals indicative of an identity of the user and physiological data (e.g., force signals) by engaging the user with electrical signals and, therefrom, collecting the signals. The scale 100 confirms identification of the user using the collected signals. As previously discussed, the processing circuitry 104 of the scale, processes the signals obtained by the sensor-data processing circuitry 138 while the user is standing on the platform and generates, therefrom, physiological data corresponding to the collected signals. In various embodiments, the scale 100 identifies, using a user profile, that the user has enabled a time-synchrony feature/service or the user provides an input to enable the feature/service at 118.

In response to the time-synchrony being enabled, the scale 100 synchronizes with the peripheral device, at 119. In various embodiments, to synchronize, the scale 100 verifies a biometric from the peripheral device. This can mitigate and/or prevent synchronizing with a device that is worn by a user different than the user profile is associated with and can be based on a peripheral device-based biometric and/or password entered into the peripheral device.

At 121, the scale outputs a message to the peripheral device. The message includes a request for the time according to the peripheral device, and optionally, an indication of any time update from the last time-synchrony with the scale 100. The peripheral device provides a return message with an indication of the time accordingly to the peripheral device and, optionally, an indication of a time update, including identification of the source, when the update occurred, and what the time was updated to. At 123, the scale 100 determines a time difference between the time-based interval or metric (e.g., the time measure) of the scale 100 and the peripheral device based on the return message (via data-assimilation circuitry 112), optionally adjusts the time difference based on a time-latency, and outputs a suggested time adjustment to synchronize time at the scale 100 and the peripheral device.

In some embodiments, the adjustment to the time according to the peripheral device is stored. For example, trends in the adjustment to the time can be identified over time and used to pro-actively prevent time drift from occurring at the peripheral device. As a specific example, the time-synchronization may occur each time the user stands on the scale 100 (after activation of the service/feature). Over time, a general trend may be identified. As particular examples, the peripheral device may be one second late every ten days, or three seconds early every day, although examples are not so limited. The scale 100 can provide a suggestion to the peripheral device to adjust time based on the trend throughout the time period (e.g., every day adjust 1/10 a second faster). Further, the scale 100 verifies accuracy of the adjustment by continuing to monitor the time and adjusting in response to errors.

Figure 1D:
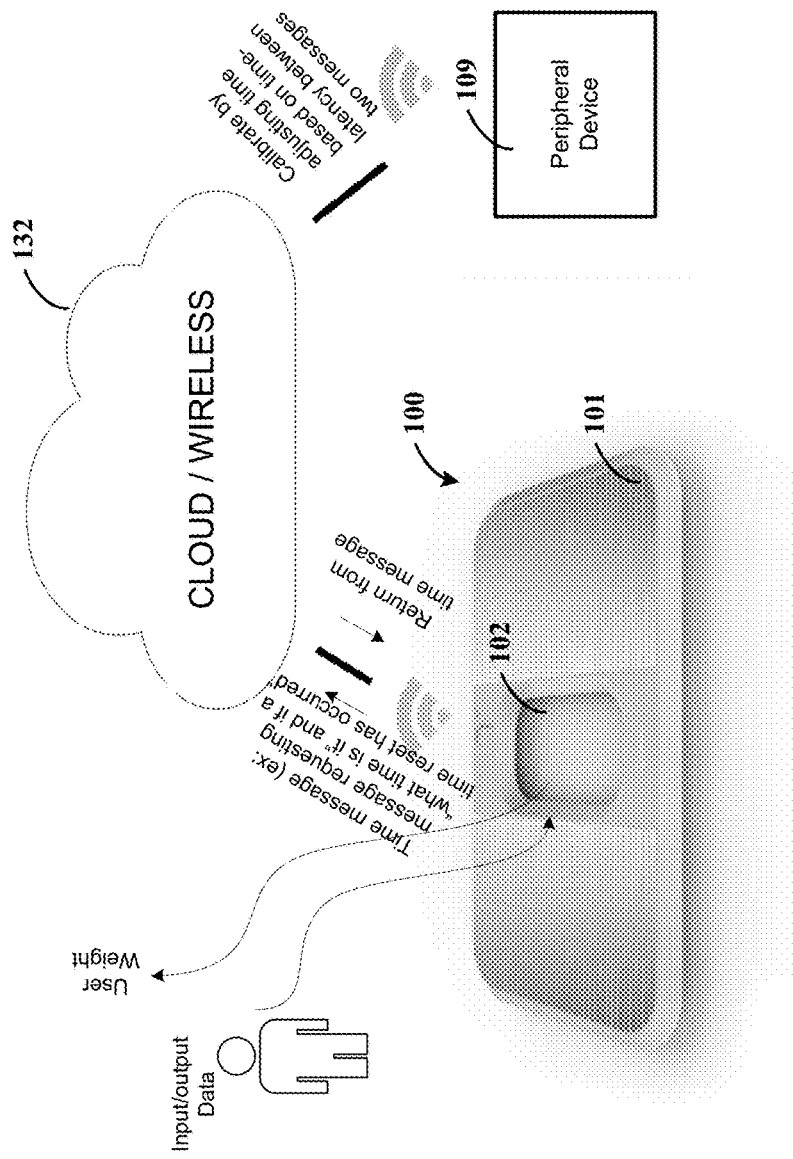
FIG. 1d shows an example of a scale time-synchronizing with a peripheral device using a cloud system, consistent with aspects of the present disclosure.

FIG. 1d shows an example of a scale time-synchronizing with a peripheral device 109 using a cloud system, consistent with aspects of the present disclosure. As illustrated, a scale 100 is in communication with the peripheral device 109 via the cloud/wireless network 132. The scale 100, illustrated by FIG. 1d includes the scale 100 and the various circuitry illustrated and previously described in connection with FIG. 1a. The scale 100 collects various user data that is sensitive. The peripheral device 109 further automatically collect various sensitive user data, such as sleep data, cardiogram data, exercise data, heart rate data, and food/liquid intake data. In some embodiments, various user data is manually entered by the user to the scale 100, the peripheral device 109, and/or another standalone CPU that is in communication with the scale 100 and/or peripheral device 109. Such data includes user demographic data, food/liquid intake data, and/or sleep data, in some embodiments.

The peripheral device 109 communicates various sensitive user data to the scale 100. The scale 100 aggregates the user data and secures the aggregated user data prior to sending the data to external circuitry, such as the standalone CPU and/or server CPU. To ensure accuracy of the aggregated data, the scale 100 is used to perform a time-synchrony process. For example, the scale 100 outputs a time message that includes a request for a time. The peripheral device 109 receives the message and responds with a return message with the time according to the peripheral device 109. The scale 100 uses the return message to determine a time difference between the scale 100 and the peripheral device 109 and outputs another message to adjust the time according to the peripheral device 109. The peripheral device 109 receives the other message which includes an indication of how to adjust the time and adjusts the time according to the peripheral device 109. To prevent and/or mitigate additional time drift, the scale 100 periodically and/or in response to the user standing on the scale 100, re-time synchronizes with the peripheral device 109. In various embodiments, the scale 100 tracks the time drifts over time and suggests pro-active time drift adjustments.

Figure 1E:
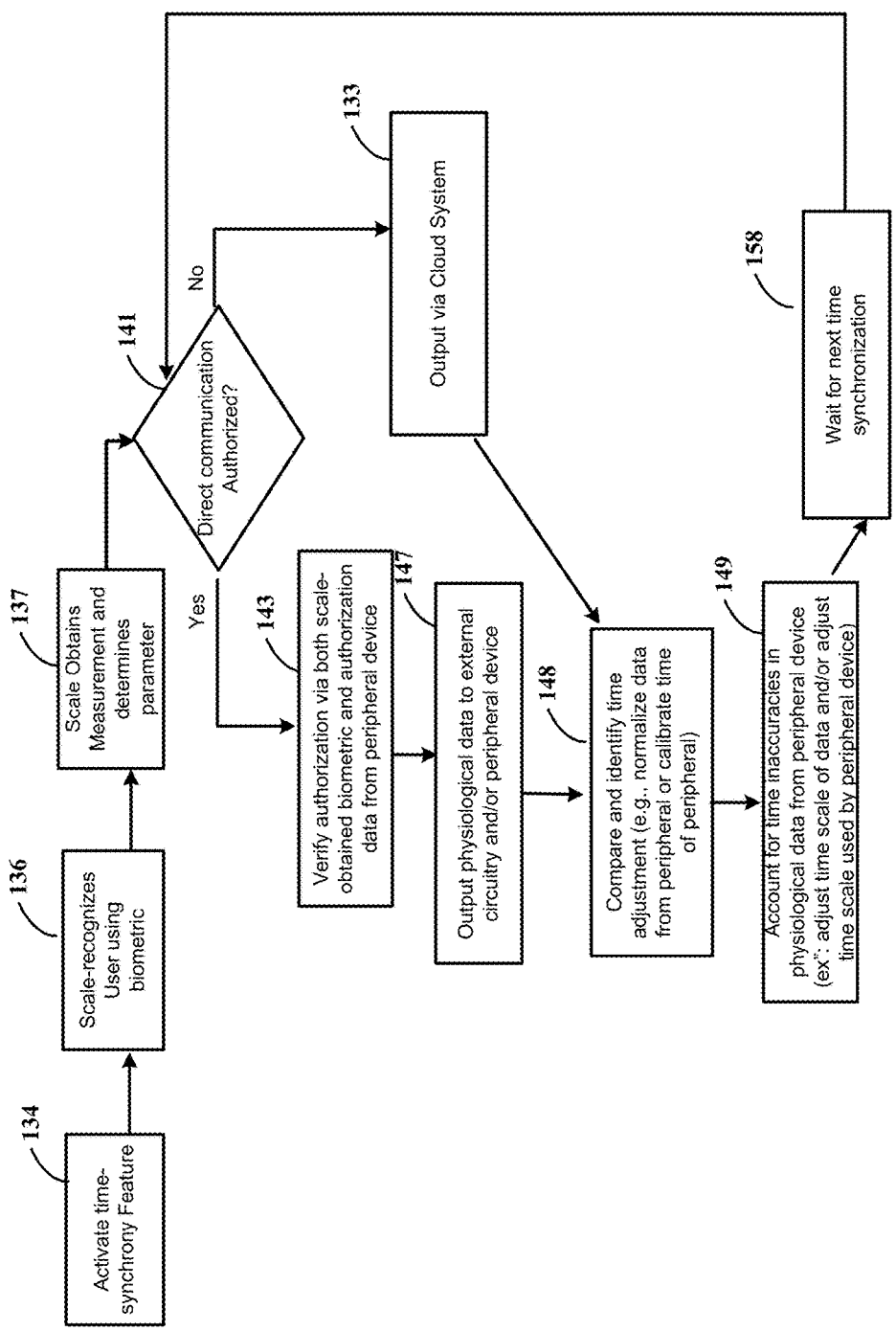
FIGS. 1e-f show examples of time-synchronizing a peripheral device with a scale based on a time-latency between the scale and peripheral device, consistent with aspects of the present disclosure.
Figure 1F:
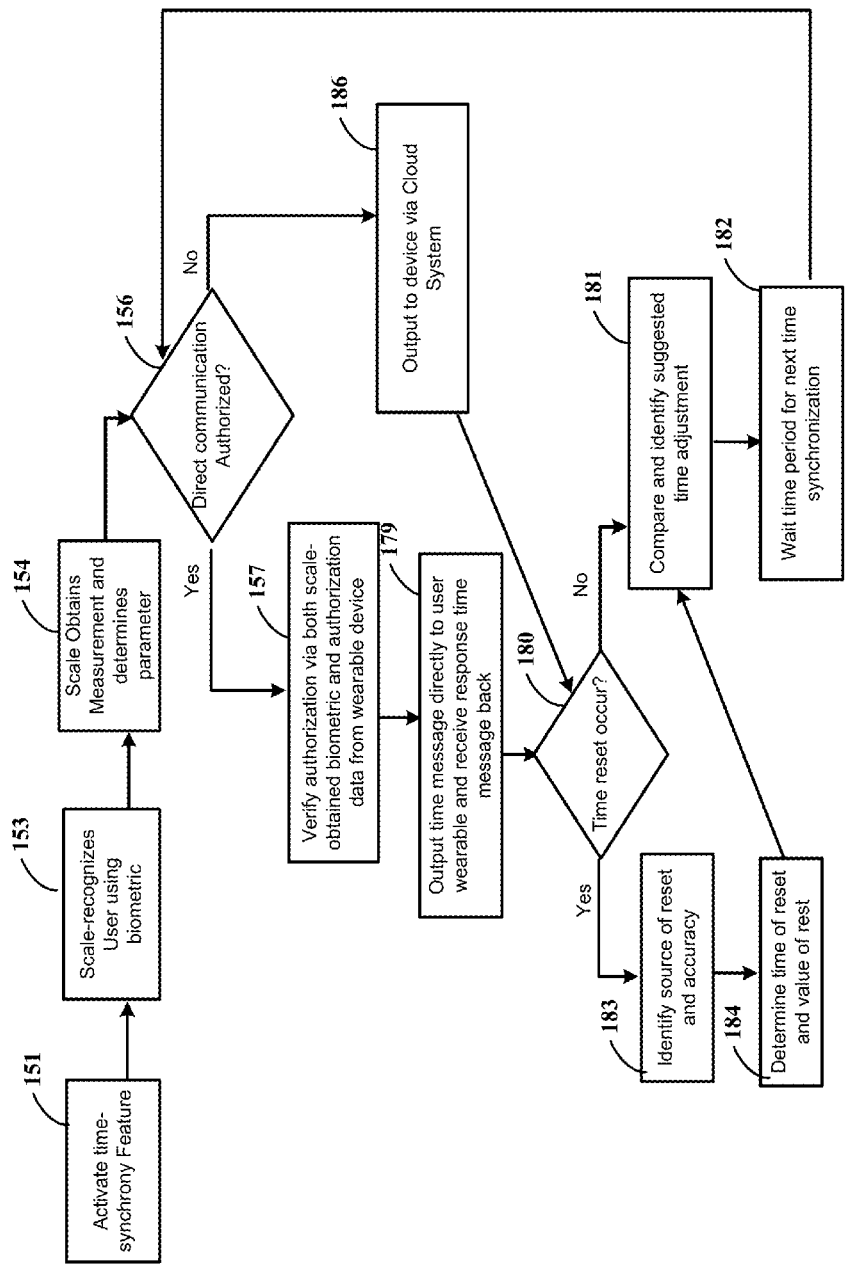

FIGS. 1e-f shows examples of time-synchronizing a peripheral device with a scale based on a time-latency between the scale and peripheral device, consistent with aspects of the present disclosure. As illustrated by FIG. 1e, at 134, the time-synchrony feature (e.g., the time-calibration feature) is activated, such as by user inputs to the FUI of the scale by the user. The user, for example, stands on the scale, and at 136 and 137, the processing circuitry of the scale identifies a scale-based biometric of the user using the collected signals and validates the user data, which includes the data indicative of the user's identity and the physiological data, as concerning the user associated with the scale-based biometric.

Optionally, at 141, the scale determines if direct communication with the peripheral device and/or the external circuitry is authorized. The direct communication can be authorized according to a scale-based biometric and/or a dual-authorization (as further described herein). If direct communication is not authorized, the scale outputs a set of physiological data to the data-assimilation circuitry (e.g., external circuitry and/or peripheral device) via a cloud system at 133. If direct communication is authorized, the scale, peripheral device, and/or external can optionally verify that the physiological data from both devices is obtained from and specific to the same user at 143 by comparing scale-obtained biometric and authorization data from the peripheral device (similar to dual-authorization). Further, at 147, the scale can output the first set of physiological data to the data-assimilation circuitry (e.g., the scale, external circuitry and/or peripheral device). The peripheral device, in some embodiments, outputs a second set of physiological data to the data-assimilation circuitry that is from and specific to the same user as the first set of physiological data to the data-assimilation circuitry.

At 148, the data-assimilation circuitry compares the first and second sets of physiological data while accounting for time-based inaccuracies in the second set of physiological data, at 149. For example, the data-assimilation circuitry can compare and identify a time adjustment to the second set of physiological data and/or to a time-based interval or metric used by the peripheral device. Accounting for the time-based inaccuracies can include normalizing the second set of physiological data based on a difference between the time-based interval or metric used by the scale as compared to the time-based interval or metric used by the peripheral device and/or can include adjusting the time-based interval or metric used by the peripheral device. And, at 158, the data-assimilation circuitry waits for the next time synchronization (e.g., assimilation of data sets). Further, comparing aspects of the physiological data sets can include combining, correlating or otherwise processing the data sets.

In another example, and as illustrated by FIG. 1*f*, at 151, the time-synchrony feature (e.g., the time-calibration feature) is activated, such as by user inputs to the FUI of the scale by the user. The user, for example, stands on the scale, and at 153 and 154, the processing circuitry of the scale identifies a scale-based biometric of the user using the collected signals and validates the user data, which includes the data indicative of the user's identity and the generated physiological data, as concerning the user associated with the scale-based biometric. In various embodiments, the scale receives sensitive user data from the peripheral device.

At 156, the scale determines if direct communication is authorized as described above. In some embodiments, the scale authorizes the communication in response to a dual-authorization. For example, optionally, at 156, the scale waits for dual-authorization. For example, the scale determines if the scale is authorized to communicate directly with the peripheral device in response to a previous or current dual-authorization. The dual-authorization includes the communication activation circuit of the scale receiving a scale-based biometric corresponding to a specific user and authorization data from the user device corresponding to the same specific user. If not, the scale outputs a message to the peripheral device and receives a return message from the peripheral device that is indicative of a time according to the peripheral device via a cloud system at 186.

The peripheral device as previously discussed, includes processing circuitry and physiological-measuring circuitry, configured to collect various signals from the user. The peripheral device collects signals, such as signals indicative of the physiological data, exercise data, sleep data, and generates therefrom the sensitive user data. In various embodiments, the peripheral device is configured to operate in multiple modes. For example, the peripheral device can wait for user authorization data from the user. The user authorization data, as previously discussed, includes the user entering a password or finger print to the user device to transition the user device from a reduced-power mode of operation to a higher-power mode of operation. Alternatively or in addition, the user authorization data includes a password, pass code, and/or biometric data obtained in response to the user accessing the specific functionality (e.g., an application) of the user device capable of generating physiological data and/or other sensitive user data.

For example, the peripheral device activates the dual-communication by outputting the authorization data to the scale. The authorization data is output concurrently, during, and/or after the collection of signals. Alternatively, the authorization data is output as a portion of the sensitive user data and the scale authorizes the data based on the authorization data.

At 157, in response to direct communication being authorized, the scale can verify authorization by the scale-obtained biometric and the authorization data from the peripheral device. Such authorization can occur at each communication and/or when establishing communication (e.g., the initial communication) between the scale and the peripheral device.

At 179, the scale outputs a message (e.g., a message requesting a time stamp from the peripheral device) directly to the peripheral device and receives a return message from the peripheral device. At 180, the scale identifies if a time reset or update of the peripheral device occurred. A time reset (or update) can include or refer to an adjustment of time according to the peripheral device that is from another source (other than the scale). For example, the message can include a request for identification of any time reset that has occurred since the last time-synchrony process with the scale. The return message includes an indication of the occurrence of a time reset, the source of the reset, the time according to the peripheral device of the reset, and the time value that the peripheral device is rest to. At 183, using the return message, the scale identifies the source of the reset and the accuracy of the source. Further, at 184, the scale determines the time of the reset and the value. This time is used to recalculate a time drift from the time reset, in response to the source being accurate (e.g., a trusted source on a predefined list).

At 181, the scale uses the return message to determine a time difference between the peripheral device and the scale. In response to no time reset (or a time reset by a non-trusted source), the time update is based on the difference in time at the scale from the message output to the reception of the return message and taking into account the time-latency. In response to a time reset by a trusted/accurate source, the time drift can be calculated from the time reset and the time value at the reset, taking into account the time-latency. Further, based on the time difference, which can account for a time-latency and/or any time update to the peripheral device by another source, the scale identifies a suggested time adjustment for the peripheral device. Further, 182, the scale waits for the next time-synchrony which can be the next time the user stands on the scale, periodically, and/or in response to other events.

After repeated time-synchronizations, the scale in various embodiments identifies a pattern in the time drift of the peripheral device. For example, the scale may identify that the peripheral device has a linear time drift as a function of time passing. In other embodiments, the time drift may not be linear and/or may have other variables which effects the time drift. The scale identifies that pattern and suggests that the peripheral device automatically adjust its time based on the pattern. In some embodiments, the pattern can include or be identified from multiple sets of physiological data from the peripheral device (e.g., changes in the waveform that indicate time drift over time). As a specific example, the scale identifies that the peripheral device has a time drift of one second over three days. The peripheral device can adjust the time by one second/three (or 0.3333 seconds) at the end of each day and/or can adjust throughout the day (e.g., 0.3333 seconds/24 each hour or 0.3333/12 every other hour).

In other embodiments, the scale may identify the time drift of the peripheral device as nonlinear and/or has other variables. The scale can provide the non-linear function for the peripheral device to use and/or can act as artificial intelligence to learn and revise the variables. For example, the variables may be unknown and/or not visible. The scale can identify sets of potential variables and adjust the sets over time using additional values from the peripheral device to revise the calculated time drift function. Over time, the time drift function of the peripheral device can become more accurate and can be provided to the peripheral device in response to an error that is below a threshold value.

In a number of embodiments, the system can be used to provide (or determine) clinical indication data by processing the aggregated sensitive user data from the scale and from the peripheral device. For example, the scale can output the aggregated data to external circuitry (e.g., server CPU). The clinical indication data, in various embodiments, includes physiologic parameters (such as PWV, BCG, respiration, arterial stiffness, cardiac output, pre-ejection period, stroke volume), diagnosis, conditions, and risk factors, among other health information.

In various related embodiments, the external circuitry determines additional health information and provides the additional health information for display to the user. The additional health information is indicative of the clinical indication data and correlates to the categories of interest provided by the user. The categories of interest are provided at a different time, the same time and/or from the scale. In various embodiments, the additional health information is based on historical user data. For example, the additional health information (e.g., a table) provided may include a correlation to the category of interest and the user data over time.

In various embodiments, the system includes additional user devices and/or other body accessories. For example, the scale receives data from a plurality of user devices and/or other body accessories. In this way, the scale is used as a hub for collecting and correlating data corresponding to a user. For example, the data can include fitness data, cardio-related data, user input data (e.g., calorie counts/food intake, drug dosage, treatment, sleep schedule), a sleep schedule (e.g., directly input from a smartbed and/or other body accessory), among other data. The scale collects the various data and correlates the data with a user profile corresponding with the user. In various embodiments, the data from one of the user devices may conflict with data obtained by the scale. In such instances, the data obtained by the scale is used and the data from the user device is discarded. That is, the data from the scale is the default data as the scale may include greater processing resources and/or obtain higher quality signals than the user device.

Although the embodiments described by FIGS. 1a-1f illustrate the scale determining the suggested time adjustment, embodiments are not so limited. For example, the suggested adjustment can be determined by external circuitry or the peripheral device (e.g., data-assimilation circuitry), such as via a Cloud system. The scale and peripheral device can provide a time stamp to the external circuitry which can determine the time adjustment, as described above. In other embodiments, the peripheral device determines the time adjustment. For example, the scale outputs a message with a time stamp to the peripheral device which determines the time adjustment based on the time stamp and a time-latency associated with the time to receive the message. In some instances, the peripheral device determines the time-latency by sending a message to the scale requesting a return message (with a time stamp of when the message is received at the scale and when the return message is output from the scale) and the peripheral device determines the time-latency from the data in the return message from the scale. In other related embodiments, the time-latency is a known value. The peripheral device determines the time adjustment using functions similar to the Eq. 1, Eq. 2 and Eq. 3 as illustrated above but with the relative time stamps being adjusted as a time that the message is sent from the peripheral device and the time the return message is received. Such embodiments may result in greater power consumption by the peripheral device as compared to the scale determining the time adjustment.

Figure 1G:
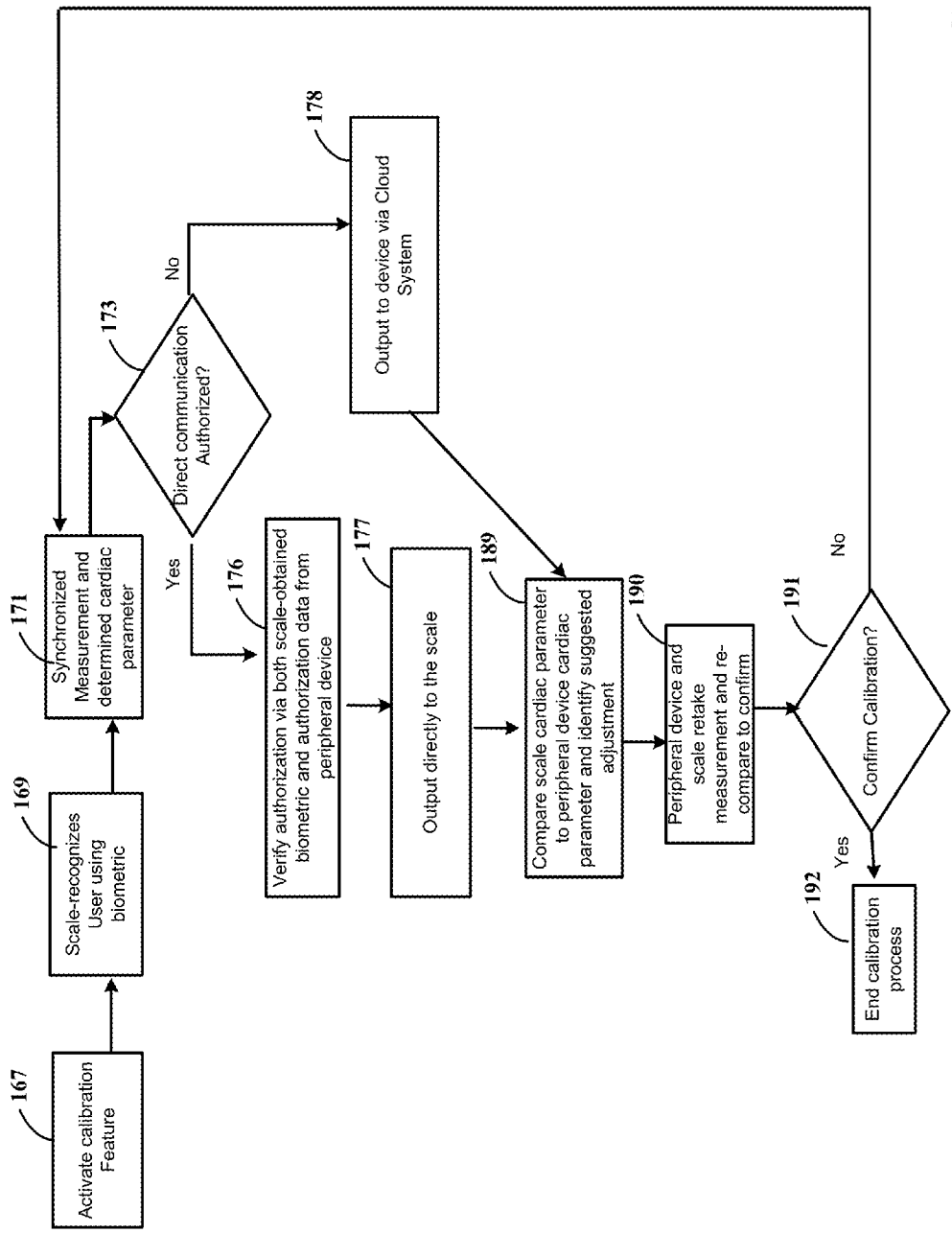
FIG. 1g shows an example of calibrating a cardiac parameter of a peripheral device using a scale-based cardiac parameter, consistent with aspects of the present disclosure.

FIG. 1g shows an example of calibrating a cardiac parameter of a peripheral device using a scale-obtained cardiac parameter, consistent with aspects of the present disclosure. As previously described, the time drift of the peripheral device can cause inaccuracy in measurements, including cardiac parameters. The time-synchrony process as previously described in connection with FIGS. 1a-1f can be used to increase the accuracy of the peripheral device. However, in various embodiments, the peripheral device may be inaccurate due to other reasons, which may be in combination with the time drift. The time synchrony process, as previously described, can be performed in combination with the calibrations of the cardiac parameters. For example, the time synchrony process can occur prior to the calibration of the cardiac parameter, as part of the calibration of the cardiac parameter, and/or after the calibration. In some embodiments, for instance, the cardiac parameter is calibrated and the calibration (over time) cannot be confirmed. In such embodiments, time drift may be causing the inaccuracy.

The scale is configured to monitor signals and/or data indicative of cardiac parameters of the user while the user is standing on the platform (e.g., to collect scale-obtained data). The peripheral device further monitors signals and/or data indicative of cardiac parameters of the user. Both the scale and the peripheral device collect user data of varying user sensitivities. For example, the scale collects sensitive user data, such as cardiogram data and data indicative of disorders and disease, and other user data, such as demographic information and weight. The peripheral device collects sensitive user data such as exercise data, food intake or liquid intake data, sleep data, cardiogram data, among other information.

At 167, the calibration of a cardiac parameter of a peripheral device feature/service is activated, such as by inputs to the FUI of the scale by the user. The user, for example, stands on the scale, and at 169, the processing circuitry of the scale identifies a scale-based biometric of the user using the collected signals and validates the user data, which includes the data indicative of the user's identity and the generated physiological data, as concerning the user associated with the scale-based biometric.

At 171, the scale and the peripheral device obtain synchronized measurements. For example, both the scale and the peripheral device, separately and at synchronized times, collect signals indicative of physiological data. Further, both the scale and the peripheral device use the respective signals to determine a cardiac parameter, such as an ECG, BCG, PWV, or a heartrate.

In various embodiments, the scale receives sensitive user data from the peripheral device. For example, the scale, at 173 determines if a direct communication is authorized. In some embodiments, the scale authorizes the communication in response to a dual-authorization. For example, optionally, at 173, the scale waits for dual-authorization. For example, the scale determines if the scale is authorized to communicate directly with the peripheral device in response to a previous or current dual-authorization. The dual-authorization includes the communication activation circuit of the scale receiving a scale-based biometric corresponding to a specific user and authorization data from the peripheral device corresponding to the same specific user. If not, the peripheral device outputs a message to the scale that is indicative of the cardiac parameter according to the peripheral device via a cloud system at 178.

At 176, in response to direct communication being authorized, the scale can verify authorization by the scale-obtained biometric and the authorization data from the peripheral device. Such authorization can occur at each communication and/or when establishing communication (e.g., the initial communication) between the scale and the peripheral device.

At 177, the peripheral device outputs the message that is indicative of the cardiac parameter to the scale. The scale, at 189, compares the cardiac parameter according to the peripheral device to the cardiac parameter according to the scale. Based on the comparison, the scale identifies suggested adjustments for calibrating the peripheral device for determining the cardiac parameter. The suggested adjustments may include, for example, adjustments to the algorithm which the peripheral device uses to calculate the cardiac parameter and/or adjustments to measurements made. The peripheral device may, for example, output additional data in the message to the scale that is indicative of the algorithm and/or the collected signals indicative of cardio-related physiological data according to the peripheral device. The scale may compare such data to its respective collected signals and cardiac parameter, and use the same to suggest adjustments to the peripheral device. The scale outputs the suggested adjustment (such as responsive to a weighted value), and the peripheral device adjusts its calculation and/or measurements using the suggestions.

In various embodiments, the calibration can be verified at 190. For example, the scale and peripheral device repeat the synchronized measurements and re-determine the cardiac parameter. The peripheral device determines the cardiac parameter and/or obtains measurements based on the adjustment and outputs the cardiac parameter to the scale (directly or via the Cloud). The scale re-compares and determines if the calibration is confirmed at 191. In response to the calibration being confirmed at 192, the calibration process is complete. In response to the calibration not being confirmed, the scale and peripheral device repeat the synchronized measurements at 171. The calibration can be confirmed, in various embodiments, in response to the cardiac parameter from the scale and the peripheral device being the same and/or different by less than a threshold error.

The calibration of the cardiac parameter of a peripheral device using a scale-obtained cardiac parameter can be provided as a service by the scale. The calibration feature and/or time synchrony feature may not be activated until the user provides an input and/or weighted value to enable the same. The FUI of the scale can be used to provide portions of the user data, diagnosis data (e.g., scale-obtained physiological data), generic health information, and/or other feedback to the user. In specific embodiments, the FUI of the scale can be used to display or otherwise provide an indication that the respective features are available and potentially an indication of how the features may be of value to the user. For example, the scale may perform the various actions (e.g., synchronize and compare) to determine that the peripheral device is not properly calibrated for the cardiac parameter. As a specific example, the scale can determine that the peripheral device should be calibrated for time and/or the cardiac parameter but does not initially output the suggested adjustment(s) to the peripheral device. The scale may provide an indication to the user that the peripheral device is not calibrated using the FUI of the scale (and/or another GUI, such as the GUI of the peripheral device) and ask if the user is interested in such a feature. In response to the user-provided input to the FUI verifying interest, and potentially providing a weighted value associated with the feature, the scale outputs the suggested adjustment(s) to the peripheral device. As a more specific example, the FUI of the scale provides a display that indicates "Did you know your watch has inaccurate time and this is impacting other measurements? Would you like to resolve this?" In response to the user providing a user input to the FUI indicating an interest in resolving the issue and possibly authorizing a weighted value corresponding with the service, the scale outputs the calibration parameter to the peripheral device and/or perform other actions to calibrate the peripheral device.

The calibration of the peripheral device (via time-synchrony and/or calibration of a cardiac parameter) can occur responsive to a user dropping the peripheral device on the scale. The peripheral device may include a built-in accelerometer and the user dropping the peripheral device on the platform of the scale (with or without standing on the scale) can activate the calibration and/or time-synchrony. In various embodiments, the calibration and/or time-synchrony is activated in response to the peripheral device being within a threshold distance from the scale. Further, via NFC, Bluetooth, and/or wireless communication, the calibration and/or time-synchrony can occur through direct communication between the scale and the peripheral device. In some specific embodiments, the calibration and/or time-synchrony occurs in response to verification that the peripheral device (and/or the scale) has recognized the user within a threshold period of time. The verification can be used to mitigate or prevent accidental calibration and can be used in combination with a user dropping the peripheral device on the scale and/or the peripheral device being within a threshold distance from the scale.

In other specific embodiments, the scale calibrates the peripheral device by docking the peripheral device with the scale and/or via acoustic sounds. For example, the peripheral device may include a photoplethy configured to obtain a photoplethysmogram. The photoplethy can be calibrated by docking (e.g., placing on the platform and/or connecting) the peripheral device with the scale and using a light source of the scale to flash a pattern to calibrate the photoplethy (e.g., flashing LED lights via one or more LEDs embedded in the platform of the scale). Further, the peripheral device can be acoustically calibrated by outputting sounds from the platform (e.g., "pips" and "chirps").

The scale can include a mechanical mass that can be triggered by the peripheral device to calibrate the system. In response to a command from the peripheral device, for example, a mechanical input is input to circuitry of the scale using the mechanical mass. The scale can pick apart the mechanical input separately from a cardiac parameter (e.g., BCG) and use the mechanical input to measure a phase latency of the system.

The scale can be used by multiple different users. A subset or each of the different users can have peripheral devices. The multiple users may synchronize their respective peripheral devices to the common scale (or to multiple scales). The time-synchrony can be performed with the scale and each of or a subset of the peripheral devices. The scale can selectively perform the time-synchrony by verifying the identity of the user and/or verifying that the peripheral device has verified (or is used by) the same identified user. In specific embodiments, the scale can verify that the peripheral device has identified the user within a threshold period of time. This may be applicable in a consumer application and/or a consumer mode. A consumer mode includes a scale as used and/or operated in a consumer setting, such as a dwelling. As a specific example, a scale is located in a dwelling with five different people. Each of the five different people use the scale, and three of the five people have peripheral devices. Prior to synchronizing one or more of the peripheral devices with the scale, the identity of the respective user is verified via the respective peripheral device. The peripheral device communicates the verified identity to the scale and the scale verifies the same user is standing on the scale and/or identifies previous authorization of a time-synchrony as stored in a user profile. Responsive to the verification of the user's identity, the scale is synchronized with the peripheral device and/or a time-synchrony (as consistent with the various embodiments) is performed. As users in a consumer mode may be familiar with one another (e.g., live together), the identification of the user by the scale and/or the peripheral device can be based on weight, body-mass-index, and/or other data. Although embodiments are not so limited and the identification can be based on other biometrics and/or passcodes.

In other instances the scale is used in a professional setting, such as a medical office, and/or in a professional mode. In a medical professional use (or other use), the scale may be used to synchronize with multiple different peripheral devices that are each associated with different users. A professional mode includes an operation of the scale as used in a professional setting, such as a doctor's office, exercise facility, nursing home, etc. In a professional mode, the scale is used by different users that may not be familiar with one another. The different users may have peripheral devices and/or services with the professional to track and/or aggregate data from the peripheral device. Similar to the consumer mode, the scale can selectively perform the time-synchrony by verifying the identity of the user and/or verifying that the peripheral device has verified (or is used by) the same identified user. The identification can include higher-level biometrics and/or identifications than the consumer mode. As a specific professional mode example, a scale is located at a doctor's office and is used to obtain data from multiple patients (e.g., 10 in a day, 500 in a year). When a patient checks-in, they stand on the scale and the scale-obtained data is output to external circuitry for document retention and/or other purposes. A subset (or all) of the patients have activated a service with doctor that corresponds with and/or includes acquisition and/or aggregation of data from a peripheral device. For example, a user with AFIB can wear a smartwatch to track various cardio-related data during exercise and/or other periods of time and which is output to the scale at the doctor's office and/or other external circuitry. The scale can be used to (periodically and/or when the patient is at the doctor's office) time-synchronize the peripheral device for accuracy purposes. The scale, in the professional mode, may be used to obtain data from more users than a scale used in a consumer setting.

The scale can also be in a combination consumer/professional mode. A combination consumer/professional mode includes a scale as used and/or operated in a consumer setting for purposes and/or uses by a professional, and/or in a professional setting for purposes and/or uses by the consumer (e.g., use by the consumer outside of the professional setting and/or in addition to). As a specific example, a scale is located at a user's dwelling and used by multiple family members. A first user of the family is diagnosed with a heart-related condition and the doctor may offer a service to review data from the scale and a peripheral device of the first user. When the other family members stand on the scale, the scale operates in the consumer mode. The other family members may or may not have peripheral devices and the scale operates to time-synchronize via the consumer mode.

When the first user that is diagnosed with heart-related condition stands on the scale, the scale recognizes the user and operates in a professional mode or a combination mode. The scale can synchronize with the peripheral device and performs time-synchrony. The scale outputs aggregated data from the scale and the peripheral device to external circuitry that is accessible by the doctor of the first user.

The different modes of operations can be used to synchronize with more than two devices at a time. For example, the time-synchrony can be to multiple peripheral devices and the scale, and/or multiple scales and the peripheral device. As a specific example, in a combination consumer/professional mode, a first scale is located at a user's dwelling and a second scale is located at the doctor's (or exercise facility) office. Data is aggregated from both the first scale, the second scale, and the peripheral device that corresponds to a user. To ensure and/or increase accuracy, the first scale, the second scale, and the peripheral device are time-synchronized. In other specific examples, in a consumer (or professional) mode, the user has multiple peripheral devices. For example, in an IoT application, multiple devices may be synchronized. The time-synchronization can be performed between the scale and the multiple peripherals at the same time and/or to the same time-standard.

As previously discussed, in any mode, the time-synchrony can be based on a time-standard and/or the time of scale, and can include communication using WiFi, BlueTooth, NFC, and other communications. The scale (and/or the peripheral device or other external circuitry) that the peripheral device has identified the user within a threshold period of time and in response, time-synchronizes the peripheral device responsive to identifying the user (via the scale) and verifying a service is activated.

The time-synchrony can be overridden by a user, in some instances. The peripheral device and/or scale can provide a display of the availability of synchronization and an option to override or not perform the time-synchrony. For example, the peripheral device may have had a time update from another source and the user may override the time-synchrony (via a GUI of the peripheral or FUI of the scale). In related embodiments, the scale may identify the time update of the peripheral device (from another source) and provide the override option (or output to the peripheral device) in response via the GUI of the peripheral and/or the FUI of the scale.

Although the embodiments described above, describe the scale and/or peripheral device performing the identification verification and/or time-synchrony, embodiments are not so limited. For example, the scale and peripheral device can communication with external circuitry and the identification of user/verification and/or time-synchrony can be determined by external circuitry, such as via a Cloud system, server CPU, and/or a standalone CPU. As a specific example, in a professional mode, a standalone CPU that is owned and/or accessible by the professional, outputs a request for physiological data to both a scale and a peripheral device that correspond to a user. In response, the scale and peripheral device output the physiological data (and identification data) to the standalone CPU. The standalone CPU, in response, performs time-synchrony via one or more of the embodiments described herein.

Data provided to the user and/or the professional can default to be displayed on the FUI of the scale, the GUI of the peripheral device, and/or a GUI of other external circuitry depending on the use of the scale. In a consumer mode and/or combination consumer/professional mode, data can default to display on the FUI of the scale. The defaulted display of data can be revised by the user providing inputs to display the data on the GUI of the peripheral device or a GUI of another external circuitry (e.g., a standalone CPU) and/or automatically by the scale based on past scale-based actions of the user. As a specific example, a first user provided a user input to the scale to display data on the GUI of the peripheral device multiple times (e.g., more than a threshold number of times, such as five times). In response, the scale adjusts the defaulted display and output data to the GUI of the peripheral device. The display on the FUI of the scale and/or GUI of the peripheral device (or other external circuitry) can include an indication that the peripheral device is inaccurate, an available time-synchrony service, and/or an option to override the time-synchrony, among other displays. In a professional mode, the scale is not owned by the user. The user may be uninterested in synchronizing their peripheral device with the professional's scale. The display may default to the GUI of the peripheral device to display an option to synchronize, and/or to override the time-synchrony. Alternatively, the display may default to the FUI of the scale to display an option to synchronize and, responsive to user verification or authority to synchronize, defaults to display on the GUI of the peripheral device. During the combination consumer/professional mode, portions of scale-obtained data for a particular user may default to display on external circuitry, such as a standalone or server CPU that is accessible by the professional.

In some embodiments, the scale includes a display configuration filter (e.g., circuitry and/or computer readable medium) configured to discern a portion of the data to display to the user and displays the portion. The display configuration filter discerns which portion of the data to display to the user on the foot-controlled user interface based on various user demographic information (e.g., age, gender, height, diagnosis) and the amount of data. For example, the generic health information identified from the filter may include an amount of data that if all the data is displayed on the foot-controlled user interface, the data is difficult for a person to read and/or uses multiple display screens.

The display configuration filter discerns portions of the data to display using the scale's FUI, such as synopsis of the generic health information (or user data or feedback) and an indication that additional data is displayed on another user device, and other portions to display on the other user device. The other user device is selected by the scale (e.g., the filter) based on various communications settings. The communication settings include settings such as user settings (e.g., the user identifying user devices to output data to), scale-based biometrics (e.g., user configures scale, or default settings, to output data to user devices in response to identifying scale-based biometrics), and/or proximity of the user device (e.g., the scale outputs data to the closest user device among a plurality of user devices and/or in response to the user device being within a threshold distance from the scale), among other settings.

For example, the scale determines which portion of the user data, clinical indication, generic health information and/or other feedback to output and outputs the portion to a particular user device based on user settings/communication authorization (e.g., user devices authorized by the user to receive particular user data from the scale), and proximity of the user device to the scale. The determination of which portions to output is based on what type of data is being displayed, how much data is available, and the various user demographic information (e.g., an eighteen-year-old is typically able to see better than a fifty year old).

In accordance with a number of embodiments, a system comprising the scale, the peripheral device, and other devices, such as external circuitry, provides additional health information to the user. The FUI of the scale, or a graphical user interface (GUI) of another device, for example, receives user input data that provides an indication that the user is interested in additional (non-Rx) health information and various categories of interest. The categories of interest include demographics of interest, symptoms of interest, disorders of interest, diseases of interest, drugs of interest, treatments of interest, etc. The additional health information is derived and provided to the user.

For example, in a number of embodiments, the GUI and/or FUI provides a number of questions to the user. In various embodiments, the questions include asking the user if the user is interested in additional health information and if the user has particular categories of interest. In various embodiments, the categories of interest include a set of demographics, disorders, diseases, and/or symptom that the user is interested in, and/or other topics. The additional health information includes a table that corresponds to the categories of interest and/or corresponds to the physiological parameters and/or clinical indications determined without providing any specific values and/or indication related to the physiological parameters, among other data. The user is provided the additional health information by the GUI and/or FUI.

The additional health information is generated, in various embodiments, by comparing the categories of interest to the aggregated sensitive user data. In various embodiments, the correlation/comparison include comparing statistical data of a sample census pertinent to the categories of interest and at least one physiological parameter determined using the aggregated sensitive user data. The statistical data of a sample census includes data of other users that are correlated to the categories of interest. In such instances, the additional health information includes a comparison of data measured while the user is standing on the scale and data measured by the peripheral device to sample census data (e.g., may contain Rx information). In other related embodiments, the correlation/comparison includes comparing statistical data of a sample census pertinent to the categories of interest and values of the least one physiological parameter of the sample census. In such instances, the additional health information includes average physiological parameter values of the sample census that is set by the user, via the categories of interest, and may not include actual values corresponding to the user (e.g., may not contain Rx information).

Various categories of interest, in accordance with the present disclosure, include demographics of the user, disorders, disease, symptoms, prescription or non-prescription drugs, treatments, past medical history, family medical history, genetics, life style (e.g., exercise habits, eating habits, work environment), among other categories and combinations thereof. In a number of embodiments, various physiological factors are an indicator for a disease and/or disorder. For example, an increase in weight, along with other factors, can indicate an increased risk of atrial fibrillation. Further, atrial fibrillation is more common in men. In some instances, symptoms of a particular disorder are different for different categories of interest (e.g., symptoms of atrial fibrillation can be different between men and women). For example, in women, high systolic blood pressure is associated with atrial fibrillation. In other instances, sleep apnea may be assessed via an ECG and is correlated to weight of the user.

Furthermore, various cardiac conditions are assessed using an ECG. For example, atrial fibrillation can be characterized and/or identified in response to a user having no p-waves, no QRS complex, and no baseline/inconsistent beat fluctuations. Atrial flutter, by contrast, can be characterized by having no p-wave, variable heart rate, having QRS complexes, and a generally regular rhythm. Ventricular tachycardia (VT) can be characterized by a rate of greater than 120 beats per minute, and short or broad QRS complexes (depending on the type of VT). Atrio-Ventricular (AV) block can be characterized by PR intervals that are greater than normal (e.g., a normal range for an adult is generally 0.12 to 0.20 seconds), normal-waves, QRS complexes can be normal or prolonged shaped, and the pulse can be regular (but slow at 20-40 beats per minute). For more specific and general information regarding atrial fibrillation and sleep apnea, reference is made herein to https://www-.clevelandclinicmeded.com/medicalpubs/diseasemanagement/cardiology/atri al-fibrillation/and http://circ.ahajournals.org/content/118/10/1080.full, which are fully incorporated herein for its specific and general teachings. Further, other data and demographics that are known and/or are developed can be added and used to derive additional health information.

For example, the categories of interest for a particular user can include a change in weight, age 45-55, and female. The scale obtains raw data, including user weight, using the sensor-data processing circuitry 138 and the peripheral device 109 obtains raw data and the categories of interest from the user. The scale outputs the raw data to the peripheral device 109 or the peripheral device 109 outputs signals indicative of physiological data (responsive to activation of the communication). The scale and/or system correlates the categories of interest to the various raw data and derives non-Rx health information therefrom. Further, the scale and/or system, over time, historically collects and correlates the categories of interest of the user and data from the data-procurement circuitry. The system, in various embodiments, sends the data to a physician and/or non-Rx health information to the user (to print and/or otherwise view).

The remaining figures illustrate various ways to collect the physiological data from the user, electrode configurations, and alternative modes of the processing circuitry 104. For general and specific information regarding the collection of physiological data, electrode configurations, and alternative modes, reference is made to U.S. patent application Ser. No. 14/338,266 filed on Oct. 7, 2015, which is hereby fully incorporated by references for its teachings.

Figure 1H:
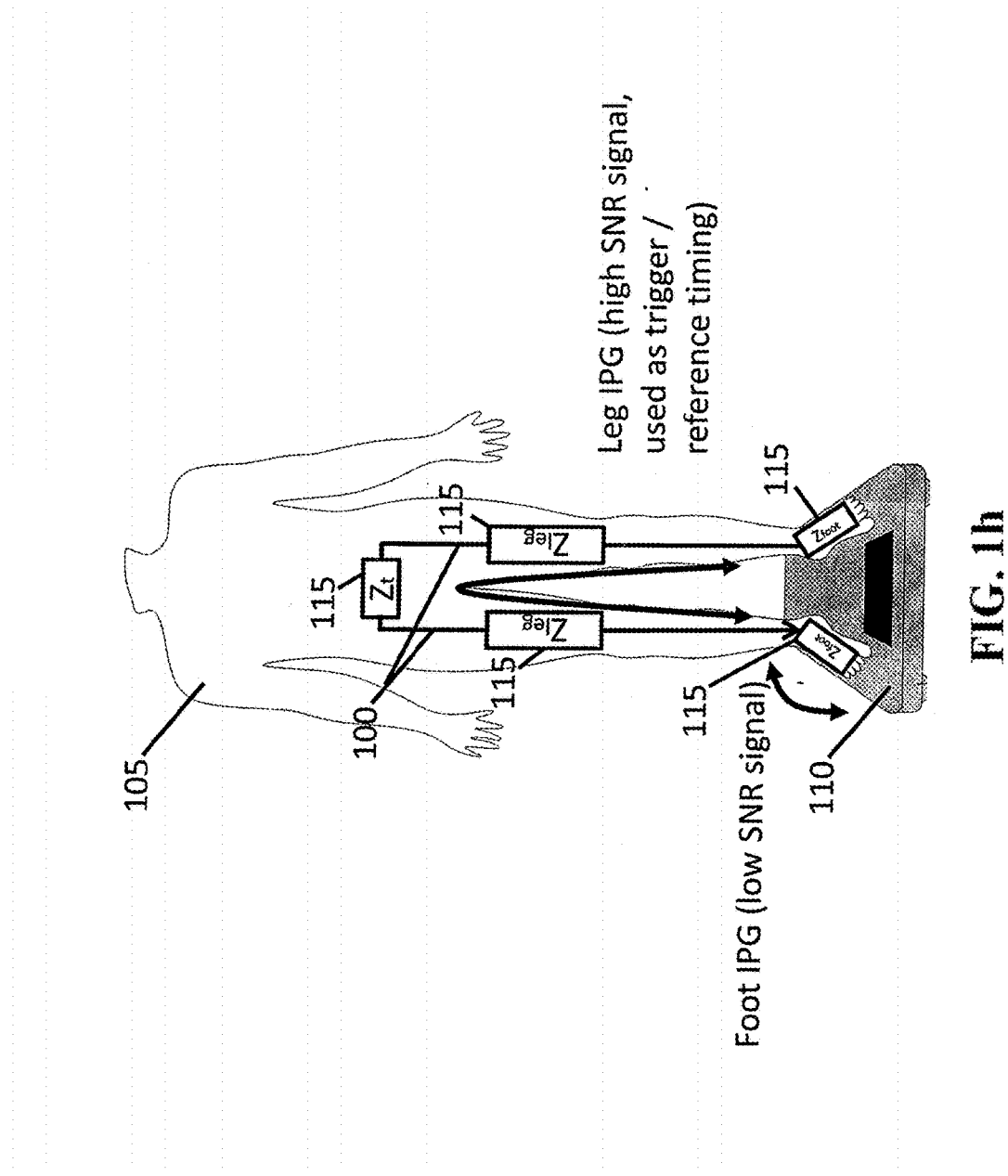
FIG. 1h shows current paths through the body for the IPG trigger pulse and Foot IPG, consistent with various aspects of the present disclosure.

FIG. 1h shows current paths 100 through the body of a user 105 standing on a scale 110 for the IPG trigger pulse and Foot IPG, consistent with various aspects of the present disclosure. Impedance measurements 115 are measured when the user 105 is standing and wearing clothing articles over the feet (e.g., socks or shoes), within the practical limitations of capacitive-based impedance sensing, with energy limits considered safe for human use. The measurements 115 can be made with non-clothing material placed between the user's bare feet and contact electrodes, such as thin films or sheets of plastic, glass, paper or wax paper, whereby the electrodes operate within energy limits considered safe for human use. The IPG measurements can be sensed in the presence of callouses on the user's feet that normally diminish the quality of the signal.

As shown in FIG. 1h, the user 105 is standing on a scale 110, where the tissues of the user's body will be modeled as a series of impedance elements, and where the time-varying impedance elements change in response to cardiovascular and non-cardiovascular movements of the user. ECG and IPG measurements sensed through the feet can be challenging to take due to small impedance signals with (1) low SNR, and because they are (2) frequently masked or distorted by other electrical activity in the body such as the muscle firings in the legs to maintain balance. The human body is unsteady while standing still, and constant changes in weight distribution occur to maintain balance. As such, cardiovascular signals that are measured with weighing scale-based sensors typically yield signals with poor SNR, such as the Foot IPG and standing BCG. Thus, such scale-based signals require a stable and high quality synchronous timing reference, to segment individual heartbeat-related signals for signal averaging to yield an averaged signal with higher SNR versus respective individual measurements.

The ECG can be used as the reference (or trigger) signal to segment a series of heartbeat-related signals measured by secondary sensors (optical, electrical, magnetic, pressure, microwave, piezo, etc.) for averaging a series of heartbeat-related signals together, to improve the SNR of the secondary measurement. The ECG has an intrinsically high SNR when measured with body-worn gel electrodes, or via dry electrodes on handgrip sensors. In contrast, the ECG has a low SNR when measured using foot electrodes while standing on said scale platforms; unless the user is standing perfectly still to eliminate electrical noises from the leg muscles firing due to body motion. As such, ECG measurements at the feet while standing are considered to be an unreliable trigger signal (low SNR). Therefore, it is often difficult to obtain a reliable cardiovascular trigger reference timing when using ECG sensors incorporated in base scale platform devices. Both Inan, et al. (IEEE Transactions on Information Technology in Biomedicine, 14:5, 1188-1196, 2010) and Shin, et al. (Physiological Measurement, 30, 679-693, 2009) have shown that the ECG component of the electrical signal measured between the two feet while standing was rapidly overpowered by the electromyogram (EMG) signal resulting from the leg muscle activity involved in maintaining balance.

The accuracy of cardiovascular information obtained from weighing scales is also influenced by measurement time. The number of beats obtained from heartbeats for signal averaging is a function of measurement time and heart rate. Typically, a resting heart rates range from 60 to 100 beats per minute. Therefore, short signal acquisition periods may yield a low number of beats to average, which may cause measurement uncertainty, also known as the standard error in the mean (SEM). SEM is the standard deviation of the sample mean estimate of a population mean. Where, SE is the standard error in the samples N, which is related to the standard error or the population S.

$$SE = \frac{S}{\sqrt{N}}$$

For example, a five second signal acquisition period may yield a maximum of five to eight beats for ensemble averaging, while a 10 second signal acquisition could yield 10-16 beats. However, the number of beats available for averaging and SNR determination is usually reduced for the following factors; (1) truncation of the first and last ensemble beat in the recording by the algorithm, (2) triggering beats falsely missed by triggering algorithm, (3) cardiorespiratory variability, (4) excessive body motion corrupting the trigger and Foot IPG signal, and (5) loss of foot contact with the measurement electrodes.

Sources of noise can require multiple solutions for SNR improvements for the signal being averaged. Longer measurement times increase the number of beats lost to truncation, false missed triggering, and excessive motion. Longer measurement times also reduce variability from cardiorespiratory effects. If shorter measurement times (e.g., less than 30 seconds) are desired for scale-based sensor platforms, sensing improvements need to tolerate body motion and loss of foot contact with the measurement electrodes.

The human cardiovascular system includes a heart with four chambers, separated by valves that return blood to the heart from the venous system into the right side of the heart, through the pulmonary circulation to oxygenate the blood, which then returns to the left side of the heart, where the oxygenated blood is pressurized by the left ventricles and is pumped into the arterial circulation, where blood is distributed to the organs and tissues to supply oxygen. The cardiovascular or circulatory system is designed to ensure oxygen availability and is often the limiting factor for cell survival. The heart normally pumps five to six liters of blood every minute during rest and maximum cardiac output during exercise increases up to seven-fold, by modulating heart rate and stroke volume. The factors that affect heart rate include autonomic innervation, fitness level, age and hormones. Factors affecting stroke volume include heart size, fitness level, contractility or pre-ejection period, ejection duration, preload or end-diastolic volume, afterload or systemic resistance. The cardiovascular system is constantly adapting to maintain a homeostasis (set point) that minimizes the work done by the heart to maintain cardiac output. As such, blood pressure is continually adjusting to minimize work demands during rest. Cardiovascular disease encompasses a variety of abnormalities in (or that affect) the cardiovascular system that degrade the efficiency of the system, which include but are not limited to chronically elevated blood pressure, elevated cholesterol levels, edema, endothelial dysfunction, arrhythmias, arterial stiffening, atherosclerosis, vascular wall thickening, stenosis, coronary artery disease, heart attack, stroke, renal dysfunction, enlarged heart, heart failure, diabetes, obesity and pulmonary disorders.

Each cardiac cycle results in a pulse of blood being delivered into the arterial tree. The heart completes cycles of atrial systole, delivering blood to the ventricles, followed by ventricular systole delivering blood into the lungs and the systemic arterial circulation, where the diastole cycle begins. In early diastole the ventricles relax and fill with blood, then in mid-diastole the atria and ventricles are relaxed and the ventricles continue to fill with blood. In late diastole, the sinoatrial node (the heart's pacemaker) depolarizes then contracting the atria, the ventricles are filled with more blood and the depolarization then reaches the atrioventricular node and enters the ventricular side beginning the systole phase. The ventricles contract and the blood is pumped from the ventricles to arteries.

The ECG is the measurement of the heart's electrical activity and is described in five phases. The P-wave represents atrial depolarization, the PR interval is the time between the P-wave and the start of the QRS complex. The QRS wave complex represents ventricular depolarization. The QRS complex is the strongest wave in the ECG and is frequently used as a timing reference for the cardiovascular cycle. Atrial repolarization is masked by the QRS complex. The ST interval represents the period of zero potential between ventricular depolarization and repolarization. The cycle concludes with the T-wave representing ventricular repolarization.

The blood ejected into the arteries creates vascular movements due to the blood's momentum. The blood mass ejected by the heart first travels headward in the ascending aorta and travels around the aortic arch then travels down the descending aorta. The diameter of the aorta increases during the systole phase due to the high compliance (low stiffness) of the aortic wall. Blood traveling in the descending aorta bifurcates in the iliac branch which transitions into a stiffer arterial region due to the muscular artery composition of the leg arteries. The blood pulsation continues down the leg and foot. Along the way, the arteries branch into arteries of smaller diameter until reaching the capillary beds where the pulsatile blood flow turns into steady blood flow, delivering oxygen to the tissues. The blood returns to the venous system terminating in the vena cava, where blood returns to the right atrium of the heart for the subsequent cardiac cycle.

Surprisingly, high quality simultaneous recordings of the Leg IPG and Foot IPG are attainable in a practical manner (e.g., a user operating the device correctly simply by standing on the impedance body scale foot electrodes), and can be used to obtain reliable trigger fiducial timings from the Leg IPG signal. This acquisition can be far less sensitive to motion-induced noise from the Leg EMG that often compromises Leg ECG measurements. Furthermore, it has been discovered that interleaving the two Kelvin electrode pairs for a single foot, result in a design that is insensitive to foot placement within the boundaries of the overall electrode area. As such, the user is not constrained to comply with accurate foot placement on conventional single foot Kelvin arrangements, which are highly prone to introducing motion artifacts into the IPG signal, or result in a loss of contact if the foot is slightly misaligned. Interleaved designs begin when one or more electrode surfaces cross over a single imaginary boundary line separating an excitation and sensing electrode pair. The interleaving is configured to maintain uniform foot surface contact area on the excitation and sensing electrode pair, regardless of the positioning of the foot over the combined area of the electrode pair.

Various aspects of the present disclosure include a weighing scale platform (e.g., scale 110) of an area sufficient for an adult of average size to stand comfortably still and minimize postural swaying. The nominal scale length (same orientation as foot length) is 12 inches and the width is 12 inches. The width can be increased to be consistent with the feet at shoulder width or slightly broader (e.g., 14 to 18 inches, respectively).

Figure 1I:
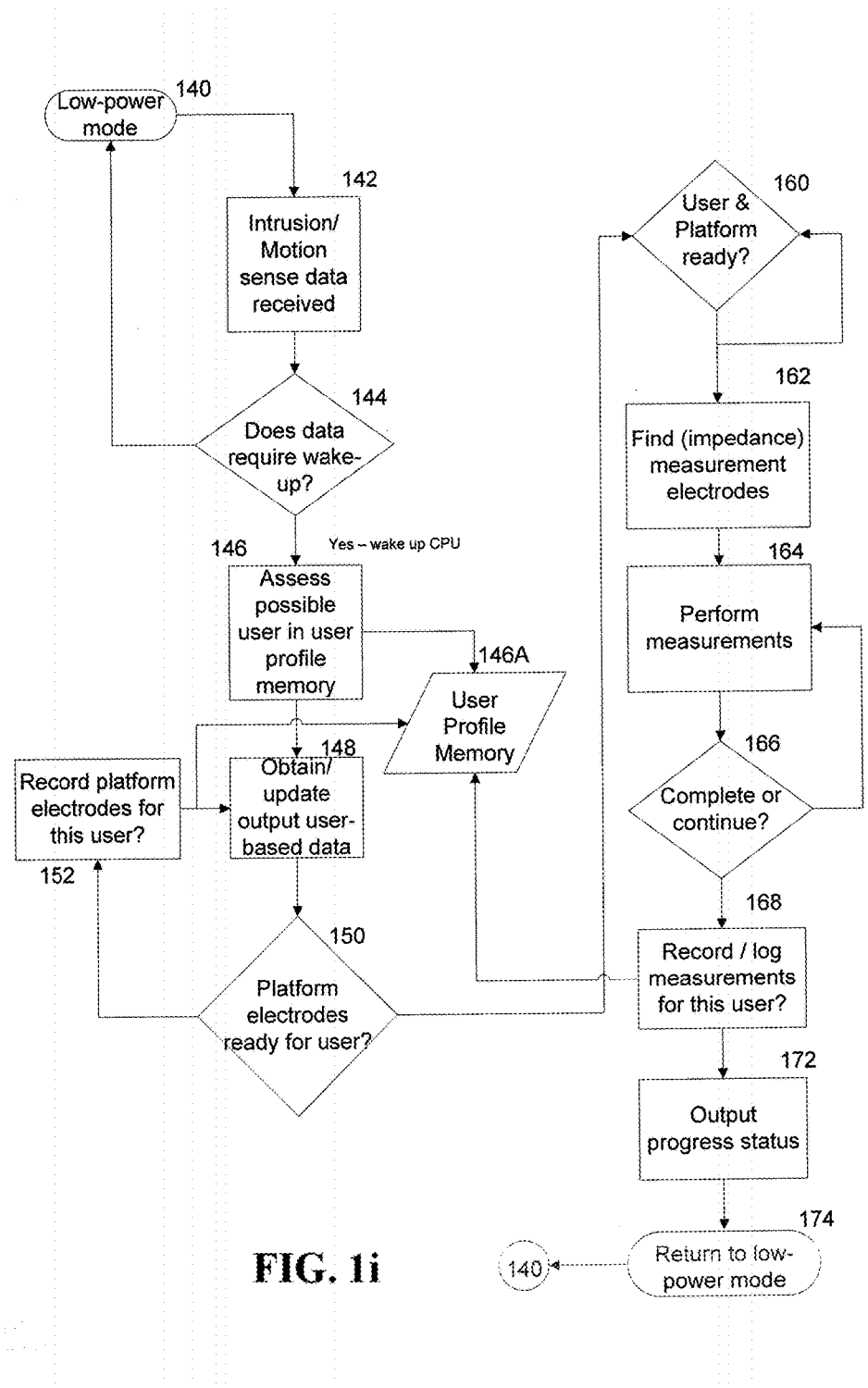
FIG. 1i is a flow chart illustrating an example manner in which a user-specific physiologic meter/scale may be programmed to provide features consistent with aspects of the present disclosure.

FIG. 1i is a flow chart depicting an example manner in which a user-specific physiologic meter or scale may be programmed in accordance with the present disclosure. This flow chart uses a computer processor circuit (or CPU) along with a memory circuit shown herein as user profile memory 146a. The CPU operates in a low-power consumption mode, which may be in off mode or a low-power sleep mode, and at least one other higher power consumption mode of operation. The CPU can be integrated with presence and/or motion sense circuits, such as a PIR circuit and/or pyro PIR circuit. In a typical application, the PIR circuit provides a constant flow of data indicative of amounts of radiation sensed in a field of view directed by the PIR circuit. For instance, the PIR circuit can be installed behind a transparent upper surface of the platform and installed at an angle so that the motion of the user approaching the platform apparatus is sensed. Radiation from the user, upon reaching a certain detectable level, wakes up the CPU which then transitions from the low-power mode, as depicted in block 140, to a regular mode of operation. Alternatively, the low-power mode of operation is transitioned from a response to another remote/wireless input used as a presence to awaken the CPU. In other embodiments, motion is sensed with a single integrated microphone or microphone array, to detect the sounds of a user approaching, or user motion can be detected by an accelerometer integrated in the scale.

Accordingly, from block 140, flow proceeds to block 142 where the user or other intrusion is sensed as data received at the platform apparatus. At block 144, the circuitry assesses whether the received data qualifies as requiring a wake up. If not, flow turns to block 140. If however, wake up is required, flow proceeds from block 144 to block 146 where the CPU assesses whether a possible previous user has approached the platform apparatus. This assessment is performed by the CPU accessing the user profile memory 146A and comparing data stored therein for one or more such previous users with criteria corresponding to the received data that caused the wake up. Such criteria includes, for example, the time of the day, the pace at which the user approached the platform apparatus as sensed by the motion detection circuitry, the height of the user as indicated by the motion sensing circuitry and/or a camera installed and integrated with the CPU, and/or more sophisticated biometric data provided by the user and/or automatically by the circuitry in the platform apparatus.

As discussed herein, such sophisticated circuitry can include one or more of the following user-specific attributes: foot length, type of foot arch, weight of user, and/or manner and speed at which the user steps onto the platform apparatus, or sounds made by the user's motion or by speech. As is also conventional, facial or body-feature recognition may also be used in connection with the camera and comparisons of images therefrom to images in the user profile memory.

From block 146, flow proceeds to block 148 where the CPU obtains and/or updates user corresponding data in the user profile memory. As a learning program is developed in the user profile memory, each access and use of the platform apparatus is used to expand on the data and profile for each such user. From block 148, flow proceeds to block 150 where a decision is made regarding whether the set of electrodes at the upper surface of the platform are ready for the user, such as may be based on the data obtained from the user profile memory. For example, delays may ensue from the user moving his or her feet about the upper surface of the platform apparatus, as may occur while certain data is being retrieved by the CPU (whether internally or from an external source such as a program or configuration data updates from the Internet cloud) or when the user has stepped over the user-display. If the electrodes are not ready for the user, flow proceeds from block 150 to block 152 to accommodate this delay.

Once the CPU determines that the electrodes are ready for use while the user is standing on the platform surface, flow proceeds to block 160. Stabilization of the user on the platform surface may be ascertained by injecting current through the electrodes via the interleaved arrangement thereof. Where such current is returned via other electrodes for a particular foot and/or foot size, and is consistent for a relatively brief period of time, for example, a few seconds, the CPU can assume that the user is standing still and ready to use the electrodes and related circuitry. At block 160, a decision is made that both the user and the platform apparatus are ready for measuring impedance and certain segments of the user's body, including at least one foot.

The remaining flow of FIG. 1i includes the application and sensing of current through the electrodes for finding the optimal electrodes (162) and for performing impedance measurements (block 164). These measurements are continued until completed at block 166 and all such useful measurements are recorded and are logged in the user profile memory for this specific user, at block 168. At block 172, the CPU generates output data to provide feedback as to the completion of the measurements and, as can be indicated as a request via the user profile for this user, as an overall report on the progress for the user and relative to previous measurements made for this user has stored in the user profile memory. Such feedback may be shown on the user-display, through a speaker with co-located apertures in the platform for audible reception by the user, and/or by vibration circuitry which, upon vibration under control of the CPU, the user can sense through one or both feet while standing on the scale. From this output at block 172, flow returns to the low power mode as indicated at block 174 with the return to the beginning of the flow at the block 140.

FIG. 2 shows an example of the insensitivity to foot placement 200 on scale electrode pairs 205/210 with multiple excitation paths 220 and sensing current paths 215, consistent with various aspects of the present disclosure. An aspect of the platform is that it has a thickness and strength to support a human adult of at least 200 pounds without fracturing, and another aspect of the device platform is comprised of at least six electrodes, where the first electrode pair 205 is solid and the second electrode pair 210 are interleaved. Another aspect is the first and second interleaved electrode pairs 205/210 are separated by a distance of at least 40+/−5 millimeters, where the nominal separation of less than 40 millimeters has been shown to degrade the single Foot IPG signal. Another key aspect is the electrode patterns are made from materials with low resistivity such as stainless steel, aluminum, hardened gold, ITO, index matched ITO (IMITO), carbon printed electrodes, conductive tapes, silver-impregnated carbon printed electrodes, conductive adhesives, and similar materials with resistivity lower than 300 ohms/sq. The resistivity can be below 150 ohms/sq. The electrodes are connected to the electronic circuitry in the scale by routing the electrodes around the edges of the scale to the surface below, or through at least one hole in the scale (e.g., a via hole).

Suitable electrode arrangements for dual Foot IPG measurements can be realized in other embodiments. In certain embodiments, the interleaved electrodes are patterned on the reverse side of a thin piece (e.g., less than 2 mm) of high-ion-exchange (HIE) glass, which is attached to a scale substrate and used in capacitive sensing mode. In certain embodiments, the interleaved electrodes are patterned onto a thin piece of paper or plastic which can be rolled up or folded for easy storage. In certain embodiments, the interleaved electrodes are integrated onto the surface of a tablet computer for portable IPG measurements. In certain embodiments, the interleaved electrodes are patterned onto a kapton substrate that is used as a flex circuit.

In certain embodiments, the scale area has a length of 10 inches with a width of eight inches for a miniature scale platform. Alternatively, the scale may be larger (up to 36 inches wide) for use in bariatric class scales.

Figure 3A:
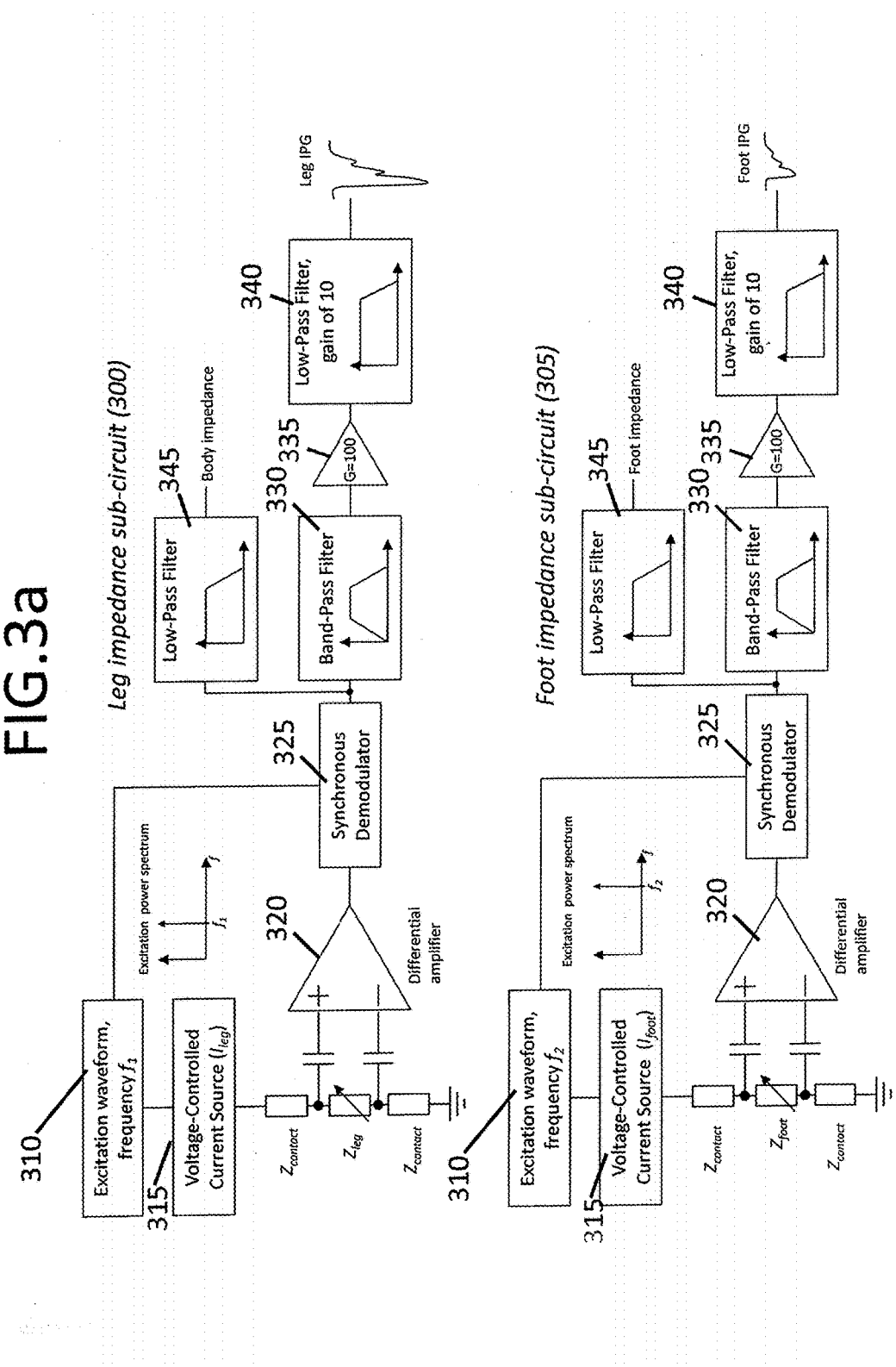
FIGS. 3a-b show example block diagrams depicting circuitry for sensing and measuring the cardiovascular time-varying IPG raw signals and steps to obtain a filtered IPG waveform, consistent with various aspects of the present disclosure.

In the present disclosure, the leg and foot impedance measurements can be simultaneously carried out using a multi-frequency approach, in which the leg and foot impedances are excited by currents modulated at two different frequencies, and the resulting voltages are selectively measured using a synchronous demodulator as shown in FIG. 3a. This homodyning approach can be used to separate signals (in this case, the voltage drop due to the imposed current) with very high accuracy and selectivity.

This measurement configuration is based on a four-point configuration in order to minimize the impact of the contact resistance between the electrode and the foot, a practice well-known in the art of impedance measurement. In this configuration the current is injected from a set of two electrodes (the "injection" and "return" electrodes), and the voltage drop resulting from the passage of this current through the resistance is sensed by two separate electrodes (the "sense" electrodes), usually located in the path of the current. Since the sense electrodes are not carrying any current (by virtue of their connection to a high-impedance differential amplifier), the contact impedance does not significantly alter the sensed voltage.

In order to sense two distinct segments of the body (the legs and the foot), two separate current paths are defined by electrode positioning. Therefore two injection electrodes are used, each connected to a current source modulated at a different frequency. The injection electrode for leg impedance is located under the plantar region of the left foot, while the injection electrode for the Foot IPG is located under the heel of the right foot. Both current sources share the same return electrode located under the plantar region of the right foot. This is an illustrative example. Other configurations may be used.

The sensing electrodes can be localized so as to sense the corresponding segments. Leg IPG sensing electrodes are located under the heels of each foot, while the two foot sensing electrodes are located under the heel and plantar areas of the right foot. The inter-digitated nature of the right foot electrodes ensures a four-point contact for proper impedance measurement, irrespectively of the foot position, as already explained.

Figure 3B:
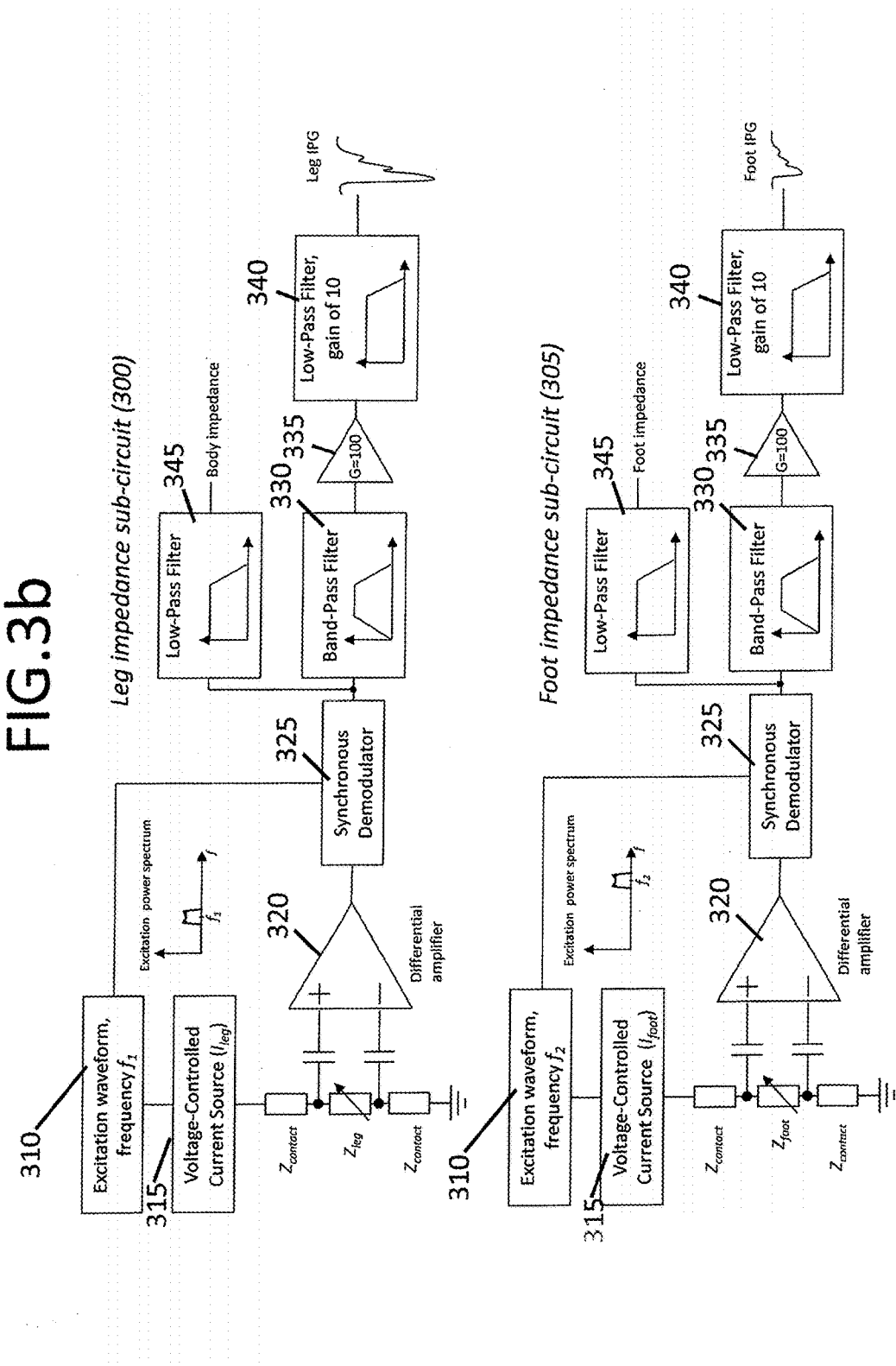

FIGS. 3a-3b show example block diagrams depicting the circuitry for sensing and measuring the cardiovascular time-varying IPG raw signals and steps to obtain a filtered IPG waveform, consistent with various aspects of the present disclosure. The example block diagrams shown in FIGS. 3a-3b are separated in to a leg impedance sub-circuit 300 and a foot impedance sub-circuit 305.

Excitation is provided by way of an excitation waveform circuit 310. The excitation waveform circuit 310 provides an excitation signal by way of a various types of frequency signals (as is shown in FIG. 3a) or, more specifically, a square wave signal (as shown in FIG. 3b). As is shown in FIG. 3b, the square wave signal is a 5 V at a frequency between 15,625 Hz and 1 MHz is generated from a quartz oscillator (such as an ECS-100AC from ECS International, Inc.) divided down by a chain of toggle flip-flops (e.g. a CD4024 from Texas Instruments, Inc.), each dividing stage providing a frequency half of its input (i.e., 1 Mhz, 500 kHz, 250 kHz, 125 kHz, 62.5 kHz, 31.250 kHz and 15.625 kHz). This (square) wave is then AC-coupled, scaled down to the desired amplitude and fed to a voltage-controlled current source circuit 315. The generated current is passed through a decoupling capacitor (for safety) to the excitation electrode, and returned to ground through the return electrode (grounded-load configuration). Amplitudes of 1 and 4 mA peak-to-peak are typically used for Leg and Foot IPGs, respectively.

The voltage drop across the segment of interest (legs or foot) is sensed using an instrumentation differential amplifier (e.g., Analog Devices AD8421) 320. The sense electrodes on the scale are AC-coupled to the input of the differential amplifier 320 (configured for unity gain), and any residual DC offset is removed with a DC restoration circuit (as exemplified in Burr-Brown App Note Application Bulletin, SBOA003, 1991, or Burr-Brown/Texas Instruments INA118 datasheet).

The signal is then demodulated with a synchronous demodulator circuit 325. The demodulation is achieved in this example by multiplying the signal by 1 or −1 synchronously with the current excitation. Such alternating gain is provided by an operational amplifier and an analog switch (SPST), such as an ADG442 from Analog Devices). More specifically, the signal is connected to both positive and negative inputs through 10 kOhm resistors. The output is connected to the negative input with a 10 kOhm resistor as well, and the switch is connected between the ground and the positive input. When open, the gain of the stage is unity. When closed (positive input grounded), the stage acts as an inverting amplifier of the gain −1. Alternatively, other demodulators such as analog multipliers or mixers can be used.

Once demodulated, the signal is band-pass filtered (0.4-80 Hz) with a first-order band-pass filter circuit 330 before being amplified with a gain of 100 with a non-inverting amplifier circuit 335 (e.g., using an LT1058 operational amplifier from Linear Technologies). The amplified signal is further amplified by 10 and low-pass filtered (cut-off at 30 Hz) using a low-pass filter circuit 340 such as 2-pole Sallen-Key filter stage with gain. The signal is then ready for digitization and further processing. In certain embodiments, the amplified signal can be passed through an additional low-pass filter circuit 345 to determine body or foot impedance.

In certain embodiments, the generation of the excitation voltage signal, of appropriate frequency and amplitude, is carried out by a microcontroller, such as MSP430 (Texas Instruments, Inc.). The voltage waveform can be generated using the on-chip timers and digital input/outputs or pulse width modulation (PWM) peripherals, and scaled down to the appropriate voltage through fixed resistive dividers, active attenuators/amplifiers using on-chip or off-chip operational amplifiers, as well as programmable gain amplifiers or programmable resistors. Alternatively, the waveforms can be directly generated by on- or off-chip digital-to-analog converters (DACs).

In certain embodiments, the shape of the excitation is not square, but sinusoidal. Such configuration would reduce the requirements on bandwidth and slew rate for the current source and instrumentation amplifier. Harmonics, potentially leading to higher electromagnetic interference (EMI), would also be reduced. Such excitation may also reduce electronics noise on the circuit itself. Lastly, the lack of harmonics from sine wave excitation may provide a more flexible selection of frequencies in a multi-frequency impedance system, as excitation waveforms have fewer opportunities to interfere between each other. Due to the concentration of energy in the fundamental frequency, sine wave excitation could also be more power-efficient. In certain embodiments, the shape of the excitation is not square, but trapezoidal.

To further reduce potential EMI, other strategies may be used, such as by dithering the square wave signal (i.e., introducing jitter in the edges following a fixed or random pattern) which leads to so-called spread spectrum signals, in which the energy is not localized at one specific frequency (or a set of harmonics), but rather distributed around a frequency (or a set of harmonics). An example of a spread-spectrum circuit suitable for Dual-IPG measurement is shown in FIG. 3b. Because of the synchronous demodulation scheme, phase-to-phase variability introduced by spread-spectrum techniques will not affect the impedance measurement. Such a spread-spectrum signal can be generated by, but not limited to, specialized circuits (e.g., Maxim MAX31C80, SiTime SiT9001), or generic microcontrollers (see Application Report SLAA291, Texas Instruments, Inc.). These spread-spectrum techniques can be combined with clock dividers to generate lower frequencies as well.

As may be clear to one skilled in the art, these methods of simultaneous measurement of impedance in the leg and foot can be used for standard Body Impedance Analysis (BIA), aiming at extracting relative content of total water, free-water, fat mass and others. Impedance measurements for BIA are typically done at frequencies ranging from kilohertz up to several megahertz. The multi-frequency measurement methods described above can readily be used for such BIA, provided the circuit can be modified so that the DC component of the impedance is not canceled by the instrumentation amplifier (no DC restoration circuit used). The high-pass filter can be implemented after the instrumentation amplifier, enabling the measurement of the DC component used for BIA. This multi-frequency technique can be combined with traditional sequential measurements used for BIA, in which the impedance is measured at several frequencies sequentially. These measurements are repeated in several body segments for segmental BIAs, using a switch matrix to drive the current into the desired body segments.

Figure 14A:
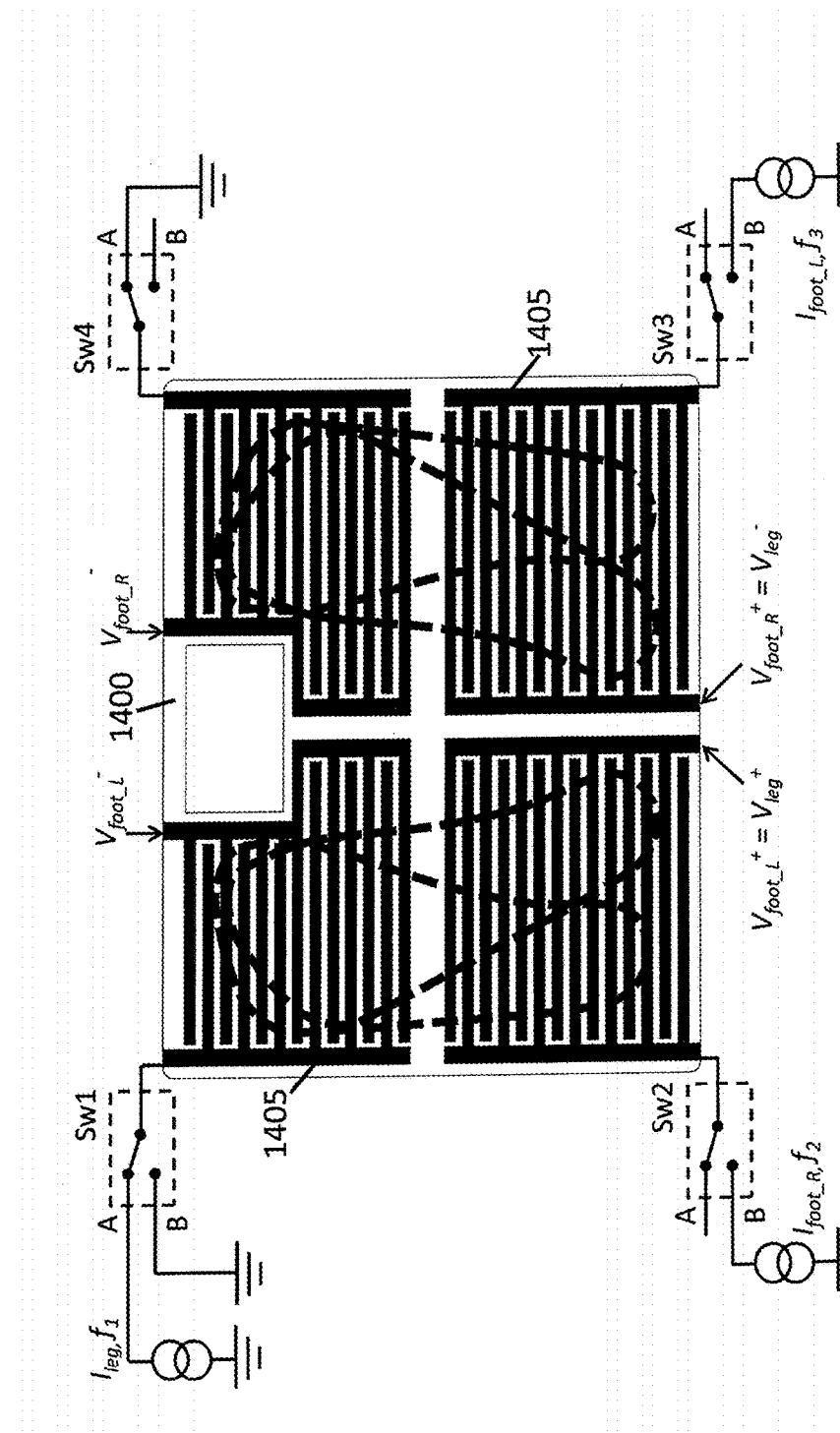
FIG. 14a shows another example of a scale with interleaved foot electrodes to inject and sense current from one foot to another foot, and measure Foot IPG signals in both feet, consistent with various aspects of the present disclosure.

While FIG. 2 shows a circuit and electrode configuration suitable to measure two different segments (legs and one foot), this approach is not readily extendable to more segments due to the shared current return electrode (ground). To overcome this limitation, and provide simultaneous measurements in both feet, the system can be augmented with analog switches to provide time-multiplexing of the impedance measurements in the different segments. This multiplexing can be a one-time sequencing (each segment is measured once), or interleaved at a high-enough frequency that the signal can be simultaneously measured on each segment. The minimum multiplexing rate for proper reconstruction is twice the bandwidth of the measured signal, based on signal processing theory, which equals to about 100 Hz for the impedance signal considered here. The rate must also allow for the signal path to settle in between switching, usually limiting the maximum multiplexing rate. Referring to FIG. 14a, one cycle might start the measurement of the leg impedance and left foot impedances (similarly to previously described, sharing a common return electrode), but then follow with a measurement of the right foot after reconfiguring the switches. For specific information regarding typical switch configurations, reference to U.S. patent application Ser. No. 14/338,266 filed on Oct. 7, 2015, which is fully incorporated for its specific and general teaching of switch configurations.

Since right and left feet are measured sequentially, one should note that a unique current source (at the same frequency) may be used to measure both, providing that the current source is not connected to the two feet simultaneously through the switches, in which case the current would be divided between two paths. One should also note that a fully-sequential measurement, using a single current source (at a single frequency) successively connected to the three different injection electrodes, could be used as well, with the proper switch configuration sequence (no split current path).

In certain embodiments, the measurement of various body segments, and in particular the legs, right foot and left foot, is achieved simultaneously due to as many floating current sources as segments to be measured, running at separate frequency so they can individually be demodulated. Such configuration is exemplified in FIG. 14b for three segments (legs, right and left feet). Such configuration has the advantage to provide true simultaneous measurements without the added complexity of time-multiplexing/demultiplexing, and associated switching circuitry. An example of such floating current source is found in Plickett, et al., Physiological Measurement, 32 (2011). Another approach to floating current sources is the use of transformer-coupled current sources (as depicted in FIG. 14c). Using transformers to inject current into the electrodes enables the use of simpler, grounded-load current sources on the primary, while the electrodes are connected to the secondary. Turn ratio would typically be 1:1, and since frequencies of interest for impedance measurement are typically in the 10-1000 kHz (occasionally 1 kHz for BIA), relatively small transformers can be used. In order to limit the common mode voltage of the body, one of the electrodes in contact with the foot can be grounded.

While certain embodiments presented in the above specification have used current sources for excitation, the excitation can also be performed by a voltage source, where the resulting injection current is monitored by a current sense circuit so that impedance can still be derived by the ratio of the sensed voltage (on the sense electrodes) over the sensed current (injected in the excitation electrodes). It should be noted that broadband spectroscopy methods could also be used for measuring impedances at several frequencies. Combined with time-multiplexing and current switching described above, multi-segment broadband spectroscopy can be achieved.

Various aspects of the present disclosure are directed toward robust timing extraction of the blood pressure pulse in the foot which is achieved by means of a two-step processing. In a first step, the usually high-SNR Leg IPG is used to derive a reference (trigger) timing for each heart pulse. In a second step, a specific timing in the lower-SNR Foot IPG is extracted by detecting its associated feature within a restricted window of time around the timing of the Leg IPG.

Consistent with yet further embodiments of the present disclosure, FIG. 3c depicts an example block diagram of circuitry for operating core circuits and modules, including, for example, the operation of the CPU as in FIG. 1a with the related more specific circuit blocks/modules in FIGS. 3A-3B. As shown in the center of FIG. 3c, the computer circuit 370 is shown with other previously-mentioned circuitry in a generalized manner without showing some of the detailed circuitry (e.g., amplification and current injection/sensing (372)). The computer circuit 370 can be used as a control circuit with an internal memory circuit (or as integrated with the memory circuit for the user profile memory 146A of FIG. 1a) for causing, processing and/or receiving sensed input signals as at block 372. As discussed, these sensed signals can be responsive to injection current and/or these signals can be sensed by less complex grid-based sense circuitry surrounding the platform as is convention in capacitive touch-screen surfaces which, in certain embodiments, the platform includes.

As noted, the memory circuit can be used not only for the user profile memory, but also as to provide configuration and/or program code and/or other data such as user-specific data from another authorized source such as from a user monitoring his/her logged data and/or profile from a remote desk-top. The remote device or desk-top can communicate with and access such data via a wireless communication circuit 376. For example, the wireless communication circuit 376 provides an interface between an app on the user's cellular telephone/tablet and the apparatus, wherefrom the IPhone is the output/input interface for the platform (scale) apparatus including, for example, an output display, speaker and/or microphone, and vibration circuitry; each of these I/O aspects and components being discussed herein in connection with other example embodiments.

A camera 378 and image encoder circuit 380 (with compression and related features) can also be incorporated as an option. As discussed above, the weighing scale components, as in block 382, are also optionally included in the housing which encloses and/or surrounds the platform.

For long-lasting battery life in the platform apparatus (batteries not shown), at least the CPU 370, the wireless communication circuit 376, and other current draining circuits are inactive unless and until activated in response to the intrusion/sense circuitry 388. As shown, one specific implementation employs a Conexant chip (e.g., CX93510) to assist in the low-power operation. This type of circuitry is designed for motion sensors configured with a camera for visual verification and image and video monitoring applications (such as by supporting JPEG and MJPEG image compression and processing for both color and black and white images). When combined with an external CMOS sensor, the chip retrieves and stores compressed JPEG and audio data in an on-chip memory circuit (e.g., 256 KB/128 KB frame buffer) to alleviate the necessity of external memory. The chip uses a simple register set via the microprocessor interface and allows for wide flexibility in terms of compatible operation with another microprocessor.

In one specific embodiment, a method of using the platform with the plurality of electrodes are concurrently contacting a limb of the user, includes operating such to automatically obtain measurement signals from the plurality of electrodes. As noted above, these measurement signals might initially be through less complex (e.g., capacitive grid-type) sense circuitry. Before or while obtaining a plurality of measurement signals by operating the circuitry, the signal-sense circuitry 388 is used to sense wireless-signals indicative of the user approaching the platform and, in response, causing the CPU circuitry 370 to transition from a reduced power-consumption mode of operation and at least one higher power-consumption mode of operation. After the circuitry is operating in the higher power-consumption mode of operation, the CPU accesses the user-corresponding data stored in the memory circuit and causes a plurality of impedance-measurement signals to be obtained by using the plurality of electrodes while they are contacting the user via the platform; therefrom, the CPU generates signals corresponding to cardiovascular timings of the user.

The signal-sense circuit can be employed as a passive infrared detector and with the CPU programmed (as a separate module) to evaluate whether radiation from the passive infrared detector is indicative of a human. For example, sensed levels of radiation that would correspond to a live being that has a size which is less than a person of a three-foot height, and/or not being sensed as moving for more than a couple seconds, can be assessed as being a non-human.

Accordingly, as the user is recognized as being human, the CPU is activated and begins to attempt the discernment process of which user might be approaching. This is performed by the CPU accessing the user-corresponding data stored in the memory circuit (the user profile memory). If the user is recognized based on parameters such as discussed above (e.g., time of morning, speed of approach, etc.), the CPU can also select one of a plurality of different types of user-discernible visual/audible/tactile information and for presenting the discerned user with visual/audible/tactile information that was retrieved from the memory as being specific to the user. For example, user-selected visual/audible data can be outputted for the user. Also, responsive to the motion detection indication, the camera can be activated to capture at least one image of the user while the user is approaching the platform (and/or while the user is on the platform to log confirmation of the same user with the measured impedance information). As shown in block 374 of FIG. 3c, where a speaker is also integrated with the CPU, the user can simply command the platform apparatus to start the process and activation proceeds.

In another method, the circuitry of FIG. 3c is used with the electrodes being interleaved and engaging the user, as a combination weighing scale (via block 382) and a physiologic user-specific impedance-measurement device. By using the impedance-measurement signals and obtaining at least two impedance-measurement signals between one foot of the user and another location of the user, the interleaved electrodes assist the CPU in providing measurement results that indicate one or more of the following user-specific attributes as being indicative or common to the user: foot impedance, foot length, and type of arch, and wherein one or more of the user-specific attributes are accessed in the memory circuit and identified as being specific to the user. This information can be later retrieved by the user, medical and/or security personnel, according to a data-access authorization protocol as might be established upon initial configuration for the user.

Figure 3D:
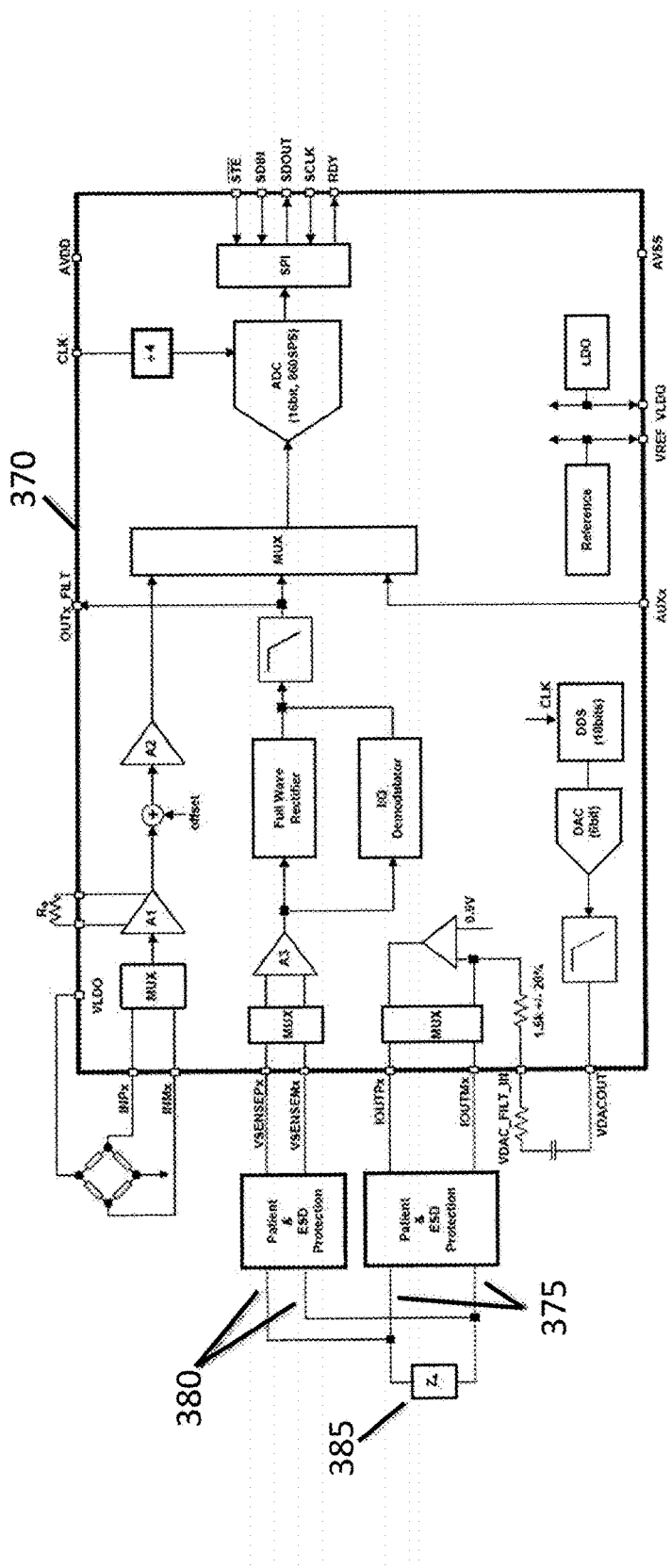
FIG. 3d shows an exemplary block diagram depicting the circuitry for interpreting signals received from electrodes.

FIG. 3d shows an exemplary block diagram depicting the circuitry for interpreting signals received from electrodes (e.g., 372 of FIG. 3c), and/or CPU 370 of FIG. 3c. The input electrodes 375 transmit electrical signals through the patient's body (depending on the desired biometric and physiological test to be conducted) and output electrodes 380 receive the modified signal as affected by a user's electrical impedance 385. Once received by the output electrodes 380, the modified signal is processed by processor circuitry 370 based on the selected test. Signal processing conducted by the processor circuitry 370 is discussed in more detail above (with regard to FIGS. 3a-b). In certain embodiments of the present disclosure, the circuitry within 370 is provided by Texas Instruments part # AFE4300.

FIG. 4 shows an example block diagram depicting signal processing steps to obtain fiducial references from the individual Leg IPG "beats," which are subsequently used to obtain fiducials in the Foot IPG, consistent with various aspects of the present disclosure. In the first step, as shown in block 400, the Leg IP and the Foot IPG are simultaneously measured. As shown at 405, the Leg IPG is low-pass filtered at 20 Hz with an 8-pole Butterworth filter, and inverted so that pulses have an upward peak. The location of the pulses is then determined by taking the derivative of this signal, integrating over a 100 ms moving window, zeroing the negative values, removing the large artifacts by zeroing values beyond 15× the median of the signal, zeroing the values below a threshold defined by the mean of the signal, and then searching for local maxima. Local maxima closer than a defined refractory period of 300 ms to the preceding ones are dismissed. The result is a time series of pulse reference timings.

As is shown in 410, the foot IPG is low-pass filtered at 25 Hz with an 8-pole Butterworth filter and inverted (so that pulses have an upward peak). Segments starting from the timings extracted (415) from the Leg IPG (reference timings) and extending to 80% of the previous pulse interval, but no longer than one second, are defined in the Foot IPG.

This defines the time windows where the Foot IPG is expected to occur, avoiding misdetection outside of these windows. In each segment, the derivative of the signal is computed, and the point of maximum positive derivative (maximum acceleration) is extracted. The foot of the IPG signal is then computed using an intersecting tangent method, where the fiducial (420) is defined by the intersection between a first tangent to the IPG at the point of maximum positive derivative and a second tangent to the minimum of the IPG on the left of the maximum positive derivative within the segment.

The time series resulting from this two-step extraction is used with another signal to facilitate further processing. These timings are used as reference timings to improve the SNR of BCG signals to extract intervals between a timing of the BCG (typically the I-wave) and the Foot IPG for the purpose of computing the PWV, as previously disclosed in U.S. 2013/0310700 (Wiard). In certain embodiments, the timings of the Leg IPG are used as reference timings to improve the SNR of BCG signals, and the foot IPG timings are used to extract intervals between timing fiducials of the improved BCG (typically the I-wave) and the Foot IPG for the purpose of computing the PTT and the (PWV).

In certain embodiments, the processing steps include an individual pulse SNR computation after individual timings are extracted, either in Leg IPG or Foot IPG. Following the computation of the SNRs, pulses with a SNR below a threshold value are eliminated from the time series, to prevent propagating noise. The individual SNRs may be computed in a variety of methods known to one skilled in the art. For instance, an estimated pulse can be computed by ensemble averaging segments of signal around the pulse reference timing. The noise associated with each pulse is defined as the difference between the pulse and the estimated pulse. The SNR is the ratio of the root-mean-square (RMS) value of the estimated pulse over the RMS value of the noise for that pulse.

In certain embodiments, the time interval between the Leg IPG pulses, and the Foot IPG pulses, also detected by the above-mentioned methods, is extracted. The Leg IPG measuring a pulse occurring earlier in the legs compared to the pulse from the Foot IPG, the interval between these two is related to the propagation speed in the lower body, i.e., the peripheral vasculature. This provides complementary information to the interval extracted between the BCG and the Foot IPG for instance, and is used to decouple central versus peripheral vascular properties. It is also complementary to information derived from timings between the BCG and the Leg ICG.

FIG. 5 shows an example flowchart depicting signal processing to segment individual Foot IPG "beats" to produce an averaged IPG waveform of improved SNR, which is subsequently used to determine the fiducial of the averaged Foot IPG, consistent with various aspects of the present disclosure. Similar to the method shown in FIG. 4, the Leg IP and the Foot IPG are simultaneously measured (500), the Leg IPG is low-pass filtered (505), the foot IPG is low-pass filtered (510), and segments starting from the timings extracted (515) from the Leg IPG (reference timings). The segments of the Foot IPG extracted based on the Leg IPG timings are ensemble-averaged (520) to produce a higher SNR Foot IPG pulse. From this ensemble-averaged signal, the start of the pulse is extracted using the same intersecting tangent approach as described earlier. This approach enables the extraction of accurate timings in the Foot IPG even if the impedance signal is dominated by noise, as shown in FIG. 7b. These timings are used together with timings extracted from the BCG for the purpose of computing the PTT and (PWV). Timings derived from ensemble-averaged waveforms and individual waveforms can also be both extracted, for the purpose of comparison, averaging and error-detection.

Specific timings extracted from the IPG pulses (from either leg or foot) are related (but not limited) to the peak of the pulse, the minimum preceding the peak, or the maximum second derivative (maximum rate of acceleration) preceding the point of maximum derivative. An IPG pulse and the extraction of a fiducial (525) in the IPG can be performed by other signal processing methods, including (but not limited to) template matching, cross-correlation, wavelet-decomposition, or short window Fourier transform.

FIG. 6a shows examples of the Leg IPG signal with fiducials (plot 600); the segmented Leg IPG into beats (plot 605); and the ensemble-averaged Leg IPG beat with fiducials and calculated SNR (plot 610), for an exemplary high-quality recording, consistent with various aspects of the present disclosure. FIG. 6b shows examples of the Foot IPG signal with fiducials derived from the Leg IPG fiducials (plot 600); the segmented Foot IPG into beats (plot 605); and the ensemble-averaged Foot IPG beat with fiducials and calculated SNR (plot 610), for an exemplary high-quality recording, consistent with various aspects of the present disclosure.

FIG. 7a shows examples of the Leg IPG signal with fiducials (plot 700); the segmented Leg IPG into beats (plot 705); and the ensemble averaged Leg IPG beat with fiducials and calculated SNR (plot 710), for an exemplary low-quality recording, consistent with various aspects of the present disclosure.

FIG. 7b shows examples of the Foot IPG signal with fiducials derived from the Leg IPG fiducials (plot 700); the segmented Foot IPG into beats (plot 705); and the ensemble-averaged Foot IPG beat with fiducials and calculated SNR (plot 710), for an exemplary low-quality recording, consistent with aspects of the present disclosure.

Figure 8:
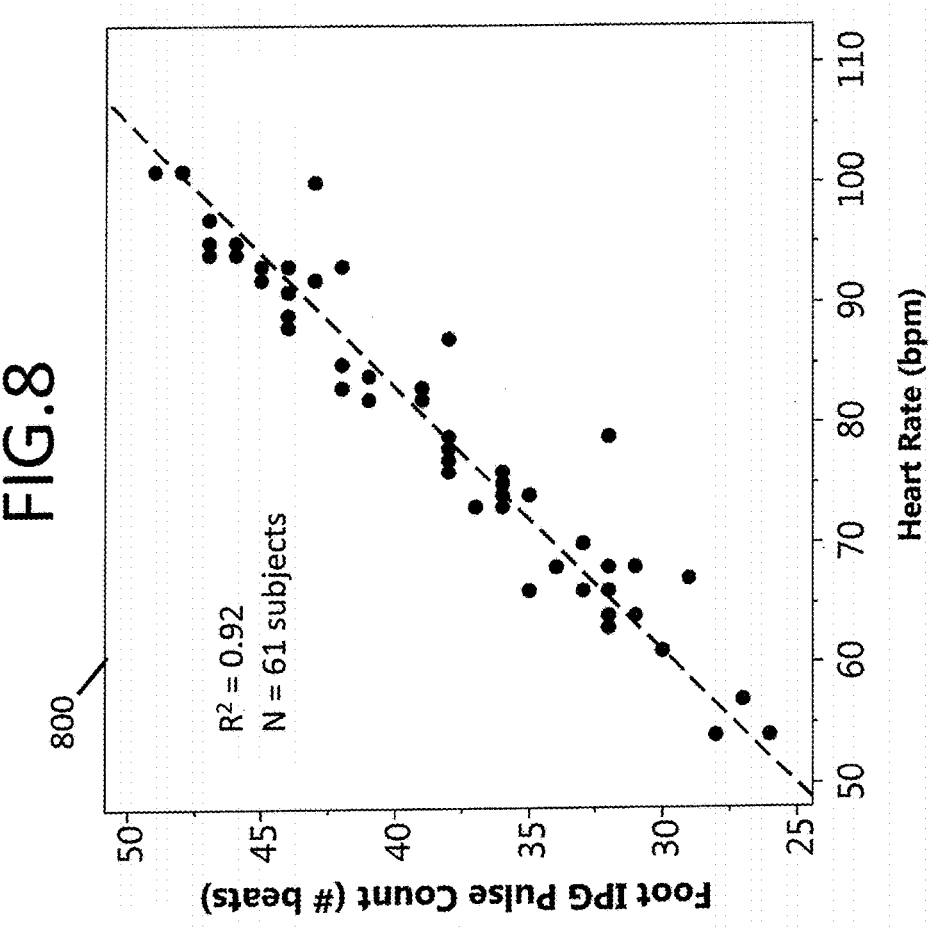
FIG. 8 shows an example correlation plot for the reliability in obtaining the low SNR Foot IPG pulse for a 30-second recording, using the first impedance signal as the trigger pulse, from a study including 61 test subjects with various heart rates, consistent with various aspects of the present disclosure.

FIG. 8 shows an example correlation plot 800 for the reliability in obtaining the low SNR Foot IPG pulse for a 30-second recording, using the first impedance signal as the trigger pulse, from a study including 61 test subjects with various heart rates, consistent with various aspects of the present disclosure.

In certain embodiments, a dual-Foot IPG is measured, allowing the detection of blood pressure pulses in both feet. Such information can be used for diagnostic of peripheral arterial diseases (PAD) by comparing the relative PATs in both feet to look for asymmetries. It can also increase the robustness of the measurement by allowing one foot to have poor contact with electrodes (or no contact at all). SNR measurements can be used to assess the quality of the signal in each foot, and to select the best one for downstream analysis. Timings extracted from each foot can be compared and set to flag potentially inaccurate PWV measurements due to arterial peripheral disease, in the event these timings are different by more than a threshold. Alternatively, timings from both feet are pooled to increase the overall SNR if their difference is below the threshold.

In certain embodiments, the disclosure is used to measure a PWV, where the IPG is augmented by the addition of BCG sensing into the weighing scale to determine characteristic fiducials between the BCG and Leg IPG trigger, or the BCG and Foot IPG. The BCG sensors are comprised typically of the same strain gage set used to determine the bodyweight of the user. The load cells are typically wired into a bridge configuration to create a sensitive resistance change with small displacements due to the ejection of the blood into the aorta, where the circulatory or cardiovascular force produce movements within the body on the nominal order of 1-3 Newtons. BCG forces can be greater than or less than the nominal range in cases such as high or low cardiac output.

FIGS. 9a-b show example configurations to obtain the PTT, using the first IPG as the triggering pulse for the Foot IPG and BCG, consistent with various aspects of the present disclosure. The I-wave of the BCG 900 normally depicts the headward force due to cardiac ejection of blood into the ascending aorta which is used as a timing fiducial indicative of the pressure pulse initiation of the user's proximal aorta relative to the user's heart. The J-wave is indicative of timings in the systole phase and also incorporates information related to the strength of cardiac ejection and the ejection duration. The K-Wave provides systolic and vascular information of the user's aorta. The characteristic timings of these and other BCG waves are used as fiducials that can be related to fiducials of the IPG signals of the present disclosure.

Figure 10:
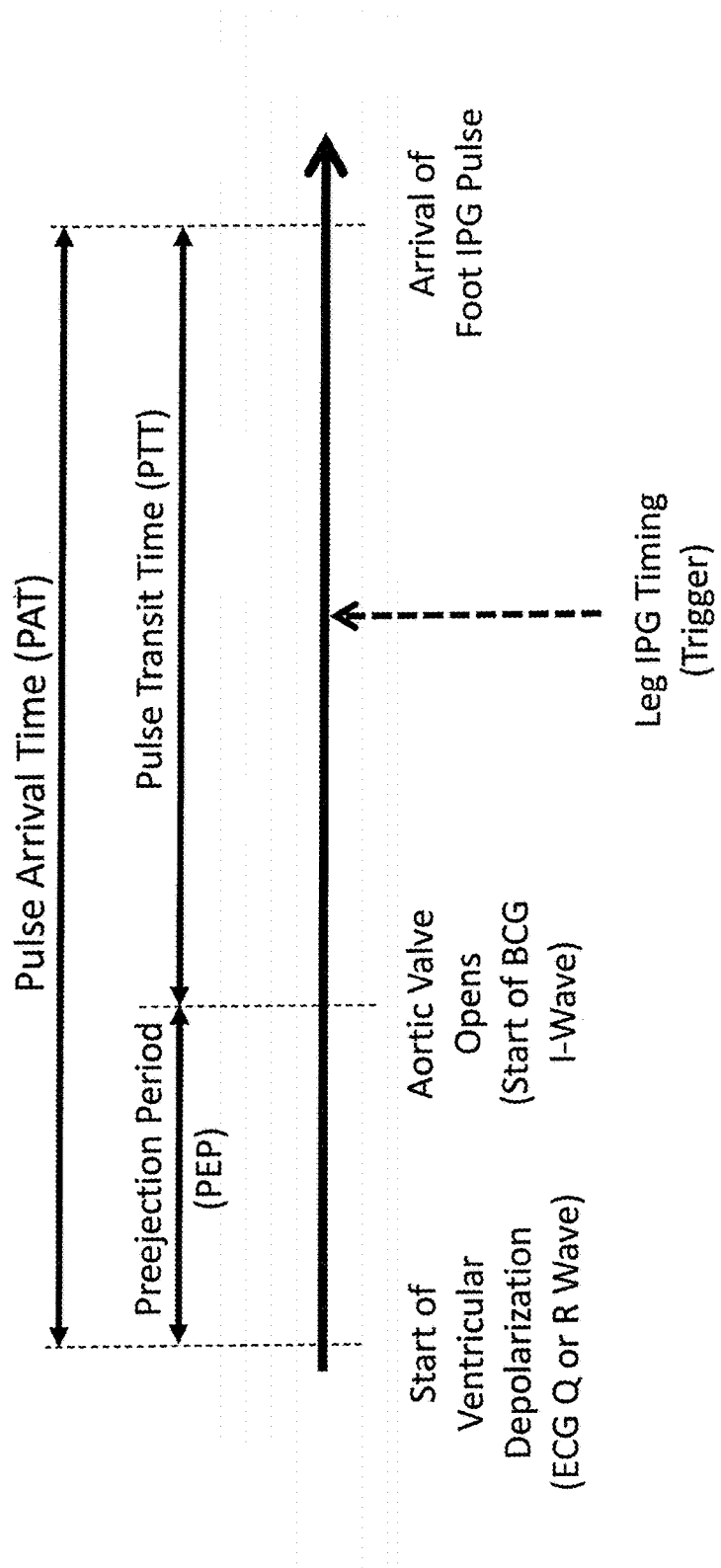
FIG. 10 shows nomenclature and relationships of various cardiovascular timings, consistent with various aspects of the present disclosure.

FIG. 10 shows nomenclature and relationships of various cardiovascular timings, consistent with various aspects of the present disclosure.

Figure 11:
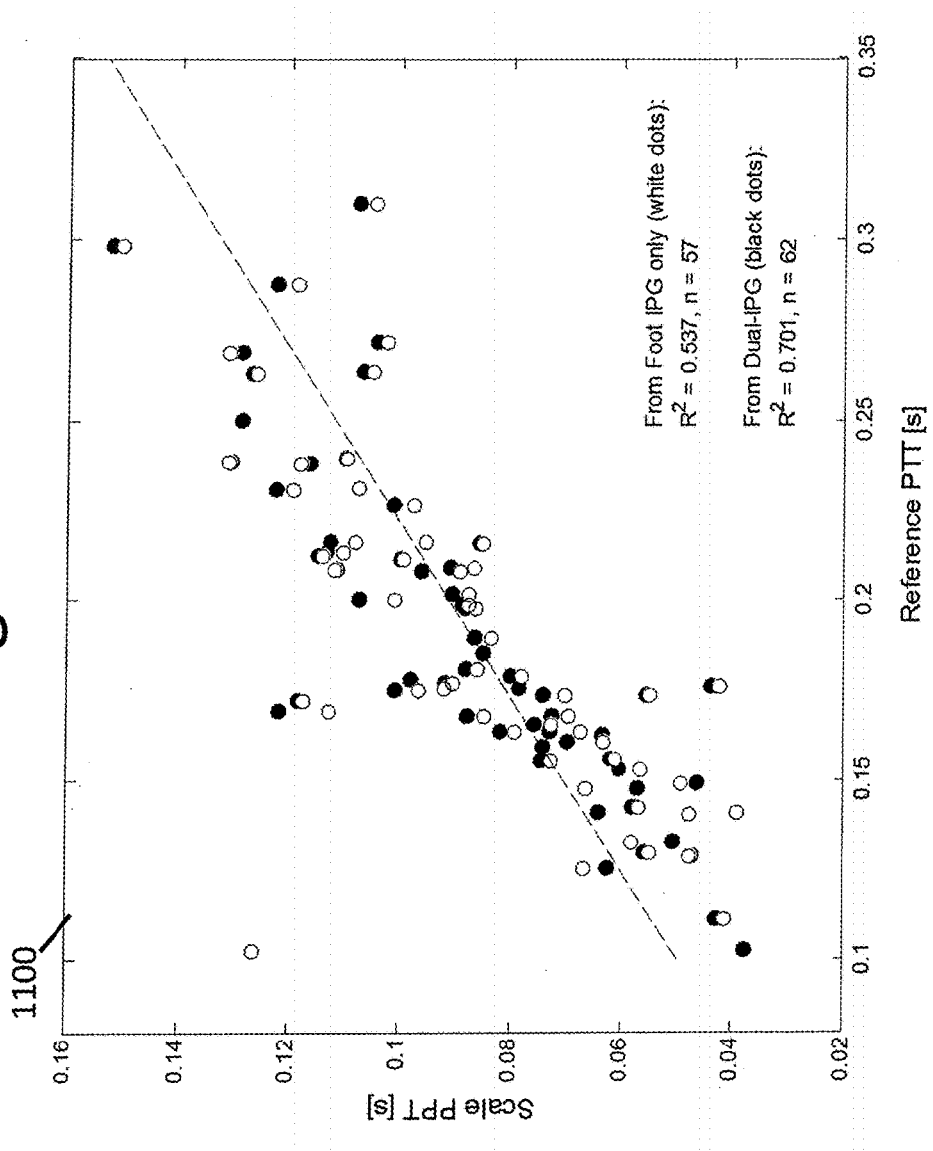
FIG. 11 shows an example graph of PTT correlations for two detection methods (white dots) Foot IPG only, and (black dots) Dual-IPG method, consistent with various aspects of the present disclosure.
Figure 12:
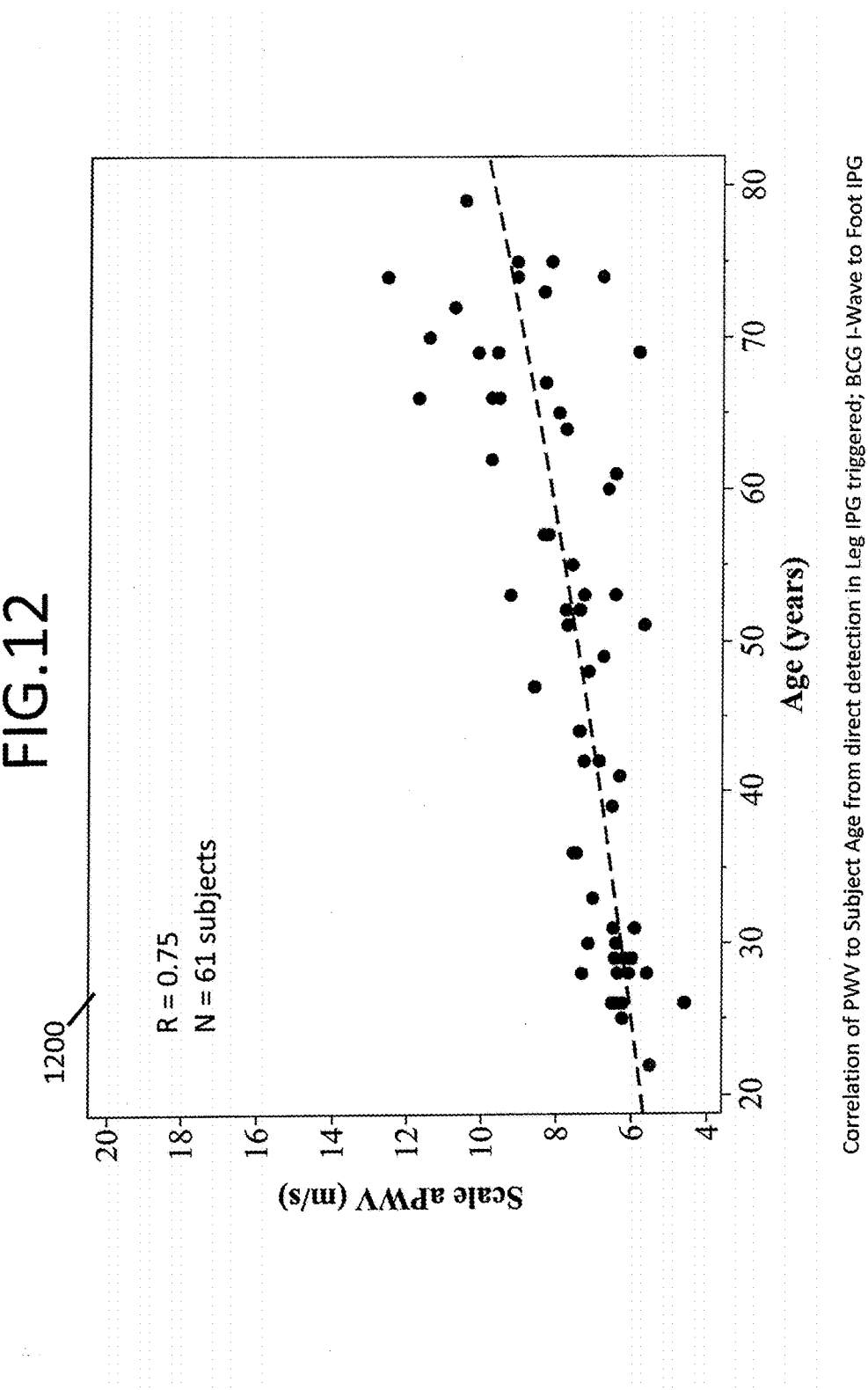
FIG. 12 shows an example graph of pulse wave velocity (PWV) obtained from the present disclosure compared to the ages of 61 human test subjects, consistent with various aspects of the present disclosure.

FIG. 11 shows an example graph 1100 of PTT correlations for two detection methods (white dots) Foot IPG only, and (black dots) Dual-IPG method; and FIG. 12 shows an example graph 1200 of PWV obtained from the present disclosure compared to the ages of 61 human test subjects, consistent with various aspects of the present disclosure.

Figure 13:
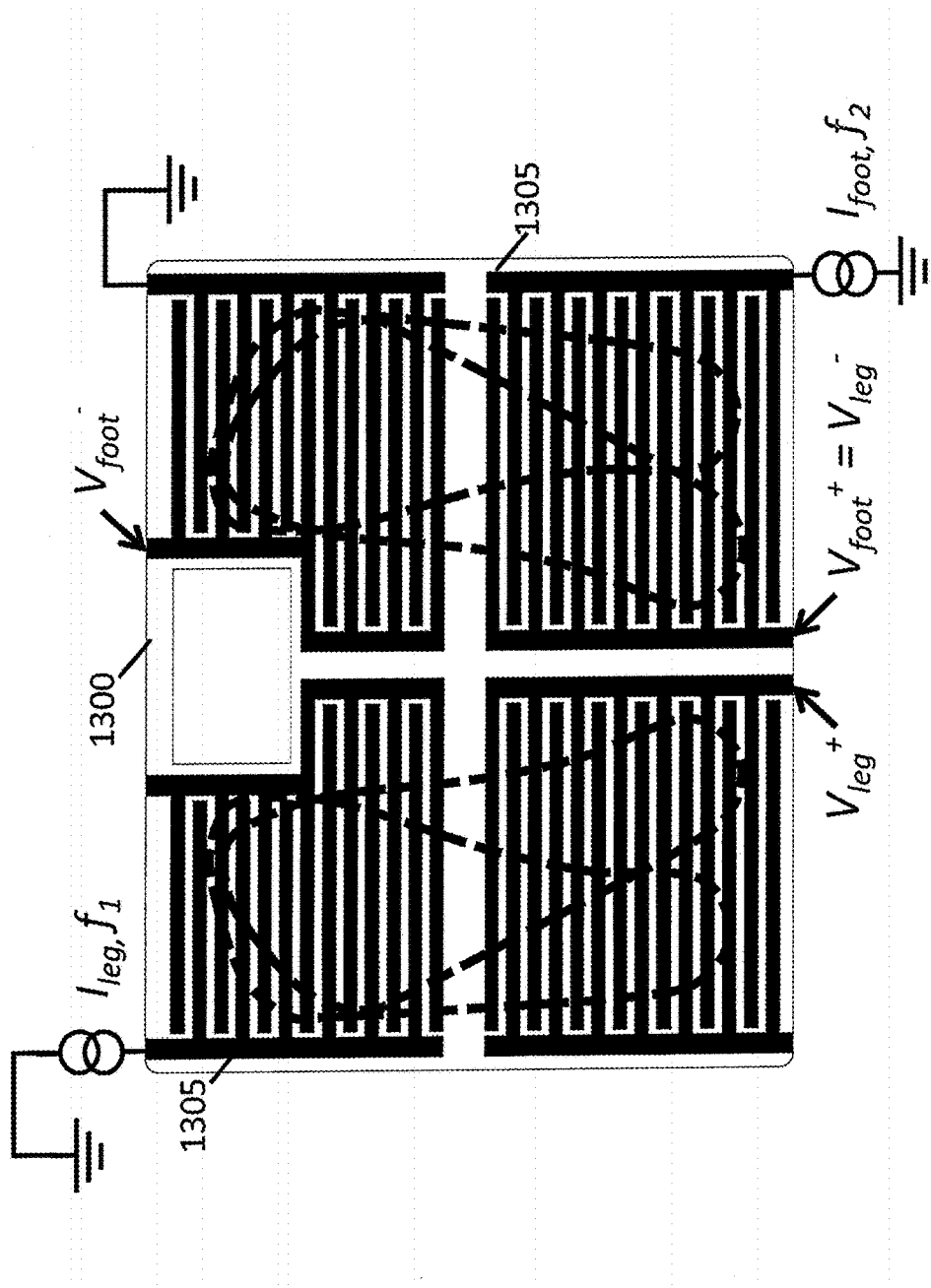
FIG. 13 shows another example of a scale with interleaved foot electrodes to inject and sense current from one foot to another foot, and within one foot, consistent with various aspects of the present disclosure.

FIG. 13 shows an example of a scale 1300 with integrated foot electrodes 1305 to inject and sense current from one foot to another foot, and within one foot.

Figure 14B:
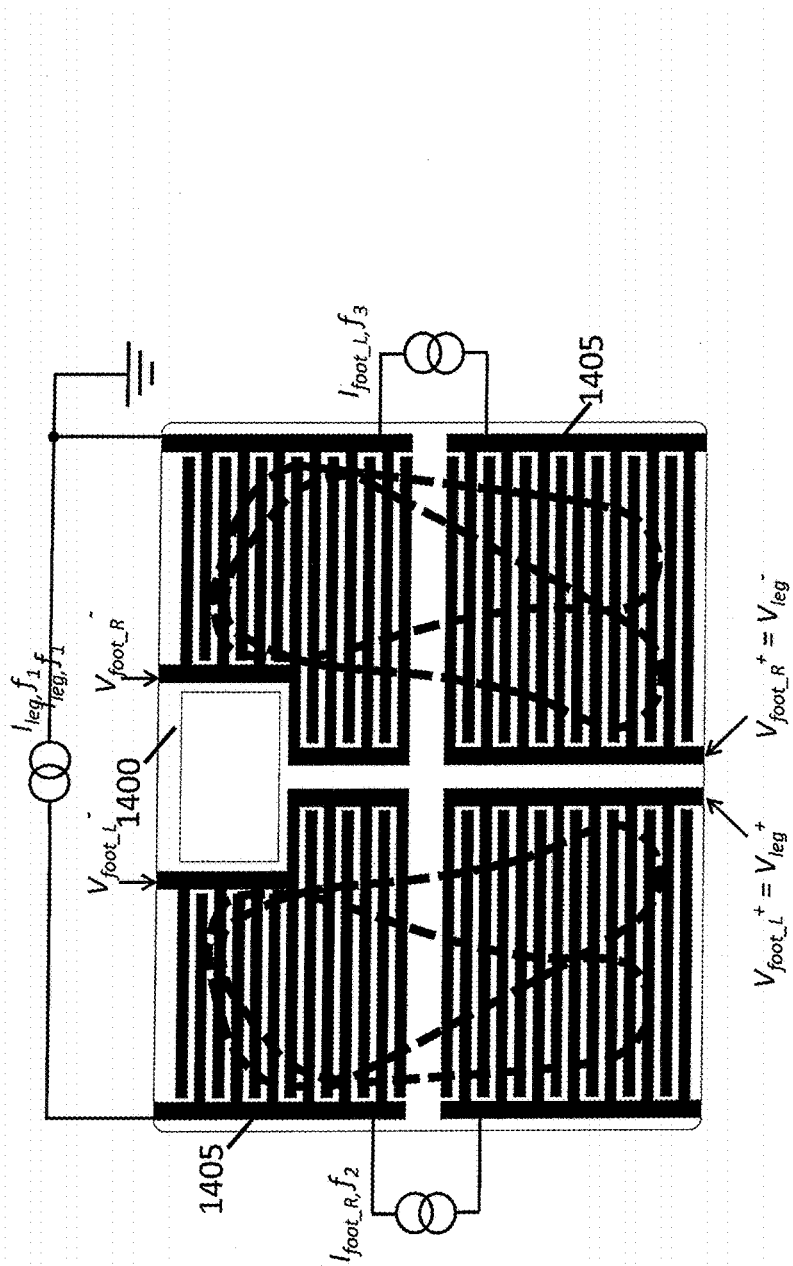
FIG. 14b shows another example of a scale with interleaved foot electrodes to inject and sense current from one foot to another foot, and measure Foot IPG signals in both feet, consistent with various aspects of the present disclosure.

FIG. 14a-c shows various examples of a scale 1400 with interleaved foot electrodes 1405 to inject/sense current from one foot to another foot, and measure Foot IPG signals in both feet.

FIGS. 15a-d shows an example breakdown of a scale 1500 with interleaved foot electrodes 1505 to inject and sense current from one foot to another foot, and within one foot.

Figure 16:
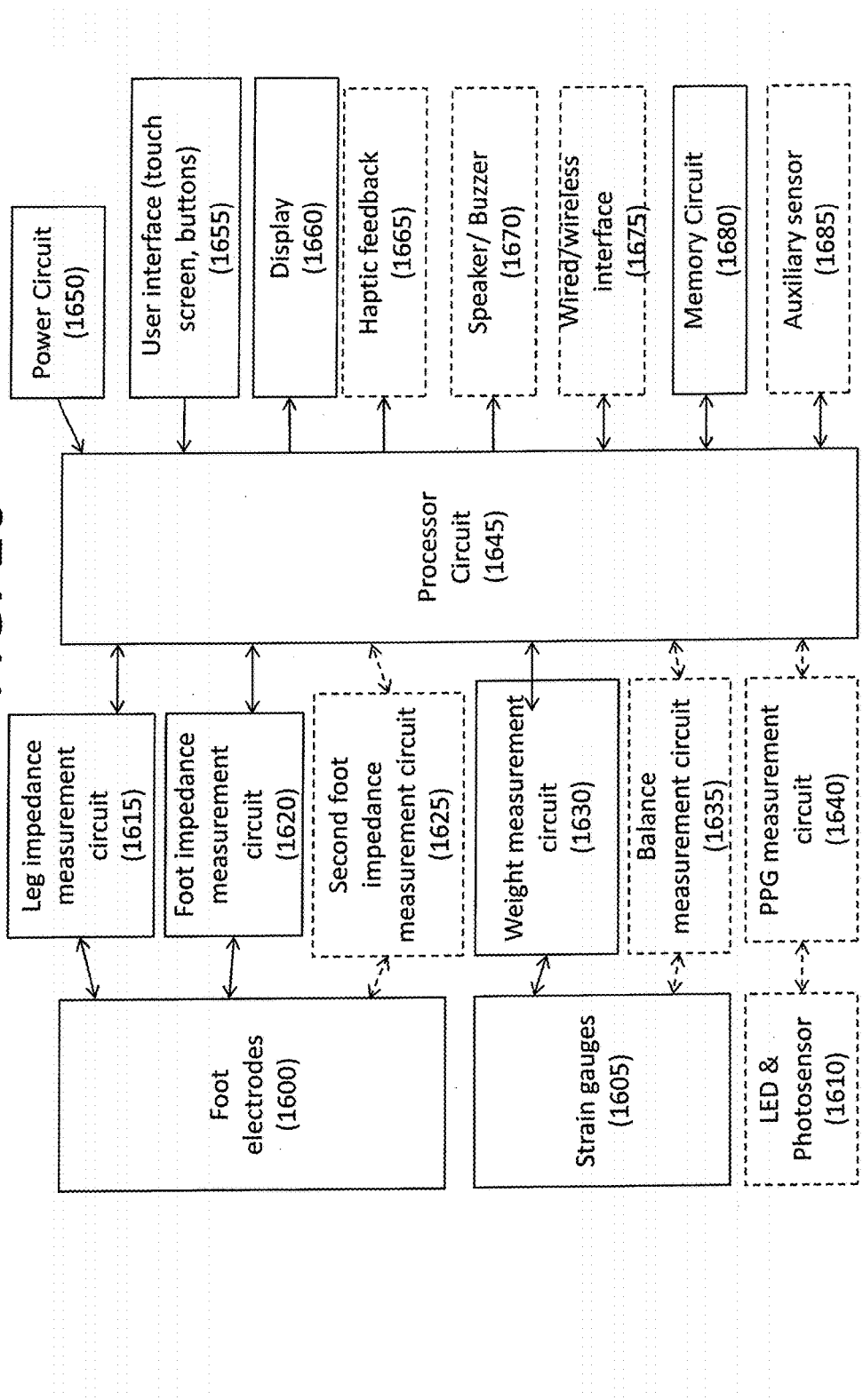
FIG. 16 shows an example block diagram of circuit-based building blocks, consistent with various aspects of the present disclosure.

FIG. 16 shows an example block diagram of circuit-based building blocks, consistent with various aspects of the present disclosure. The various circuit-based building blocks shown in FIG. 16 can be implemented in connection with the various aspects discussed herein. In the example shown, the block diagram includes foot electrodes 1600 that can collect the IPG signals. Further, the block diagram includes strain gauges 1605, and an LED/photosensor 1610. The foot electrodes 1600 is configured with a leg impedance measurement circuit 1615, a foot impedance measurement circuit 1620, and an optional second foot impedance measurement circuit 1625. The leg impedance measurement circuit 1615, the foot impedance measurement circuit 1620, and the optional second foot impedance measurement circuit 1625 report the measurements collected to a processor circuitry 1645.

The processor circuitry 1645 collects data from a weight measurement circuit 1630 and an optional balance measurement circuit 1635 that are configured with the strain gauges 1605. Further, an optional photoplethysmogram (PPG) measurement circuit 1640, which collects data from the LED/photosensor 1610, provides data to the processor circuitry 1645.

The processor circuitry 1645 is powered via a power circuit 1650. Further, the processor circuitry 1645 collects user input data from a user interface 1655 (e.g., iPad®, smart phone and/or other remote user handy/CPU with a touch screen and/or buttons). The data collected/measured by the processor circuitry 1645 is shown to the user via a display 1660. Additionally, the data collected/measured by the processor circuitry 1645 can be stored in a memory circuit 1680. Further, the processor circuitry 1645 can optionally control a haptic feedback circuit 1665, a speaker or buzzer 1670, a wired/wireless interface 1675, and an auxiliary sensor 1685 for one-way or two-way communication between the scale and the user.

Figure 17:
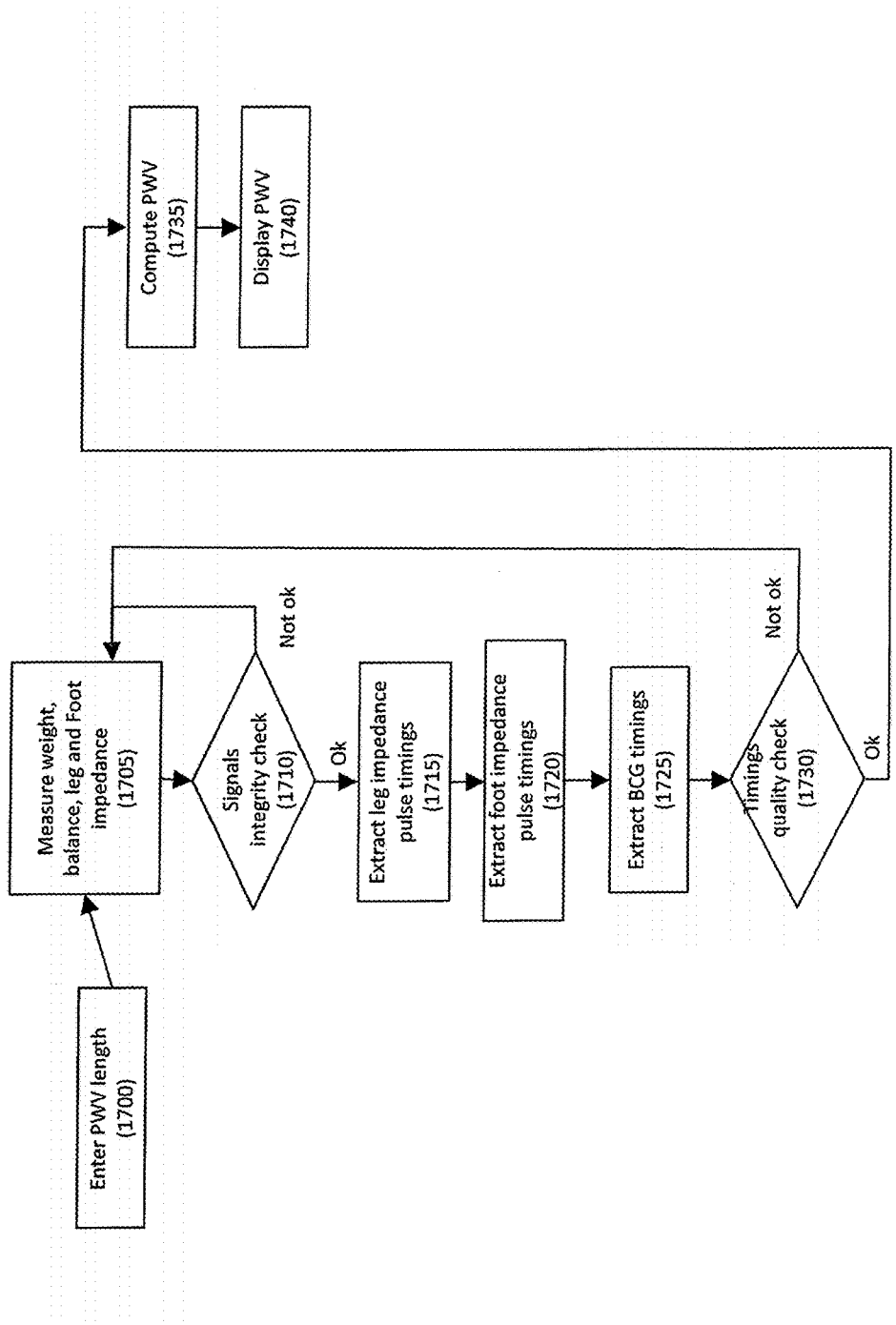
FIG. 17 shows an example flow diagram, consistent with various aspects of the present disclosure.

FIG. 17 shows an example flow diagram, consistent with various aspects of the present disclosure. At block 1700, a PWV length is entered. At block 1705, a user's weight, balance, leg, and foot impedance are measured. At 1710, the integrity of signals is checked (e.g., SNR). If the signal integrity check is not met, the user's weight, balance, leg, and foot impedance are measured again (block 1705), if the signals integrity check is met, the leg impedance pulse timings are extracted (as is shown at block 1715). At block 1720, foot impedance and pulse timings are extracted, and at block 1725, BCG timings are extracted. At block 1730, a timings quality check is performed. If the timings quality check is not validated, the user's weight, balance, leg and foot impedance are again measured (block 1705). If the timings quality check is validated, the PWV is calculated (as is shown at block 1735). At block 1740, the PWV is displayed to the user.

Figure 18:
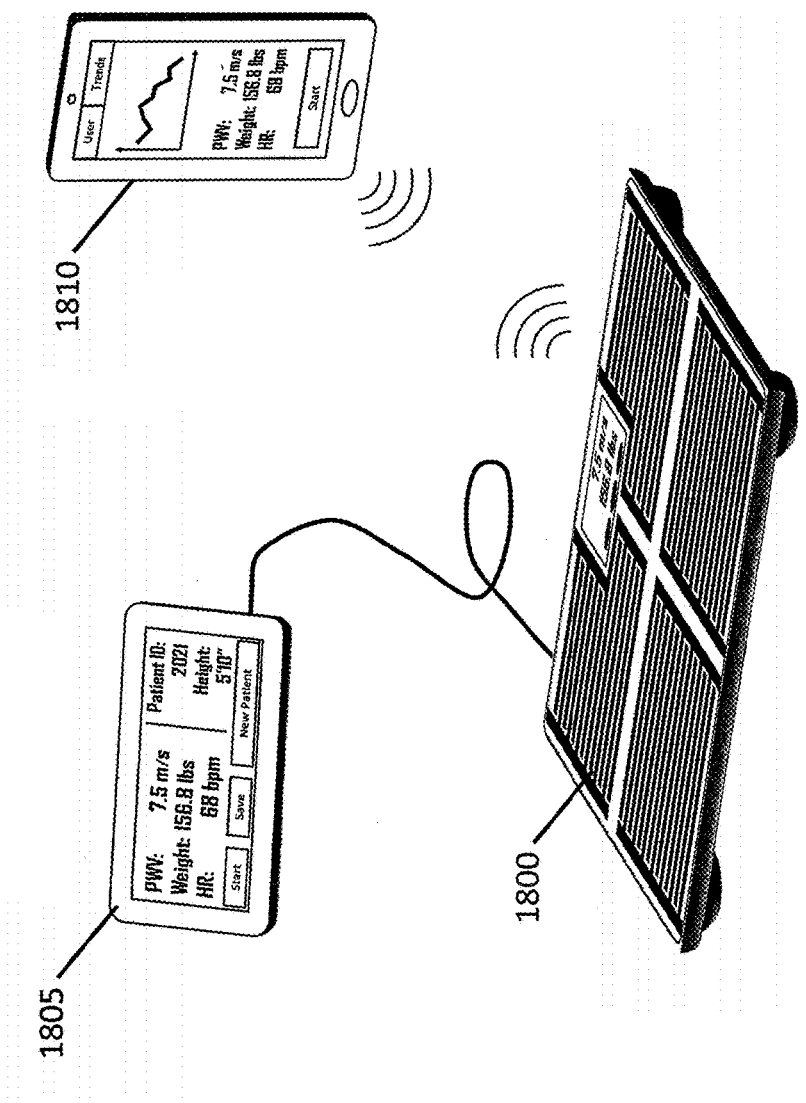
FIG. 18 shows an example scale communicatively coupled to a wireless device, consistent with various aspects of the present disclosure.

FIG. 18 shows an example scale 1800 communicatively coupled to a wireless device, consistent with various aspects of the present disclosure. As described herein, a display 1805 displays the various aspects measured by the scale 1800. The scale, in some embodiments, also wirelessly broadcast the measurements to a wireless device 1810. The wireless device 1810, in various embodiments, is implemented as an iPad®, smart phone or other CPU to provide input data for configuring and operating the scale.

As an alternative or complementary user interface, the scale includes a FUI which can be enabled/implementable by one or more foot-based biometrics (for example, with the user being correlated to previously-entered user weight, and/or foot size/shape). The user foot-based biometric, in some embodiments, is implemented by the user manually entering data (e.g., a password) on the upper surface or display area of the scale. In implementations in which the scale is configured with a haptic, capacitive or flexible pressure-sensing upper surface, the (upper surface/tapping) touching from or by the user is sensed in the region of the surface and processed according to conventional X-Y grid Signal processing in the logic circuitry/CPU that is within the scale. By using one or more of the accelerometers located within the scale at its corners, such user data entry is sensed by each such accelerometer so long as the user's toe, heel or foot pressure associated with each tap provides sufficient force.

In various embodiments, the above discussed user-interface is used with other features described herein for the purpose of storing and securing sensitive user data such as: the configuration data input by the user, the biometric and/or passwords entered by the user, and the user-specific health related data which might include less sensitive data (e.g., the user's weight) and more sensitive data (e.g., the user's scale obtains cardiograms and other data generated by or provided to the scale and associated with the user's symptoms and/or diagnoses). For such sensitive user data, the above described biometrics are used as directed by the user for indicating and defining protocol to permit such data to be exported from the scale to other remote devices indoor locations. In more specific embodiments, the scale operates in different modes of data security including, for example: a default mode in which the user's body mass and/or weight is displayed regardless of any biometric which would associate with the specific user standing on the scale; another mode in which complicated data (or data reviewed infrequently) is only exported from the scale under specific manual commands provided to the scale under specific protocols; and another mode or modes in which the user-specific data that is collected from the scale is processed and accessed based on the type of data. Such data categories include categories of different level of importance and/or sensitivities such as the above-discussed high and low level data and other data that might be very specific to a symptom and/or degrees of likelihood for diagnoses. Optionally, the CPU in the scale is also configured to provide encryption of various levels of the user's sensitive data.

For example, in accordance with various embodiments, the above-described FUI is used to provide portions of the clinical indications (e.g., scale-obtained physiological data) and/or additional health information to the user. In some embodiments, the scale includes a display configuration filter (e.g., circuitry and/or computer readable medium) configured to discern the data to display to the user and display portion. The display configuration filter discerns which portions of the clinical indications and/or additional health information to display to the user on the FUI based on various user demographic information (e.g., age, gender, height, diagnosis) and the amount of data. For example, the clinical indication may include an amount of data that if all the data is displayed on the FUI, the data is difficult for a person to read and/or uses multiple display screens.

The display configuration filter discerns portions of the data to display using the scale user interface, such as synopsis of the clinical indication (or additional health information) and an indication that additional data is displayed on another user device, and other portions to display on the other user device. The other user device is selected by the scale (e.g., the filter) based on various communications settings. The communication settings include settings such as user settings (e.g., the user identifying user devices to output data to), scale-based biometrics (e.g., user configures scale, or default settings, to output data to user devices in response to identifying scale-based biometrics), and/or proximity of the user device (e.g., the scale outputs data to the closest user device among a plurality of user devices and/or in response to the user device being within a threshold distance from the scale), among other settings. For example, the scale determines which portions of the clinical indication or additional health information to output and outputs the remaining portion of the clinical indication or additional health information to a particular user device based on user settings/communication authorization (e.g., what user devices are authorized by the user to receive particular user data from the scale), and proximity of the user device to the scale.

For example, in some specific embodiments, the scale operates in different modes of data security and communication. The different modes of data security and communication are enabled in response to biometrics identified by the user and using the FUI. In some embodiments, the scale is used by multiple users and/or the scale operates in different modes of data security and communication in response to identifying the user and based on biometrics. The different modes of data security and communication include, for example: a first mode (e.g., default mode) in which the user's body mass and/or weight is displayed regardless of any biometric which would associate with the specific user standing on the scale and no data is communicated to external circuitry; a second mode in which complicated/more-sensitive data (or data reviewed infrequently) is only exported from the scale under specific manual commands provided to the scale under specific protocols and in response to a biometric; and third mode or modes in which the user-specific data that is collected from the scale is processed and accessed based on the type of data and in response to a biometric. Such data categories include categories of different levels of importance and/or sensitivities such as the above-discussed high and low level data and other data that might be very specific to a symptom and/or degrees of likelihood for diagnoses. Optionally, the CPU in the scale is also configured to provide encryption of various levels of the user's sensitive data.

In some embodiments, the different modes of data security and communication are enabled in response to recognizing the user standing on the scale using a biometric and operating in a particular mode of data security and communication based on user preferences and/or services activated. For example, the different modes of operation include the default mode (as discussed above) in which certain data (e.g., categories of interest, categories of sensitive user data, or historical user data) is not communicated from the scale to external circuitry, a first communication mode in which data is communicated to external circuitry as identified in a user profile, a second or more communication modes in which data is communicated to a different external circuitry for further processing. The different communication modes are enabled based on biometrics identified from the user and user settings in a user profile corresponding with each user.

In a specific embodiment, a first user of the scale may not be identified and/or have a user profile set up. In response to the first user standing on the scale, the scale operates in a default mode. During the default mode, the scale displays the user's body mass and/or weight on the user display and does not output user data. A second user of the scale has a user profile set up that indicates the user would like data communicated to a computing device of the user. When the second user stands on the scale, the scale recognizes the second user based on a biometric and operates in a first communication mode. During the first communication mode, the scale outputs at least a portion of the user data to an identified external circuitry. For example, the first communication mode allows the user to upload data from the scale to a user identified external circuitry (e.g., the computing device of the user). The information may include additional health information and/or user information that has low-user sensitivity. In the first communication mode, the scale performs the processing of the raw sensor data and/or the external circuitry can. For example, the scale sends the raw sensor data and/or additional health information to a user device of the user. The computing device may not provide access to the raw sensor data to the user and/or can send the raw sensor data to another external circuitry for further processing in response to a user input. For example, the computing device can ask the user if the user would like additional health information and/or regulated health information as a service. In response to receiving an indication the user would like the additional health information and/or regulated health information, the computing device outputs the raw sensor data and/or non-regulated health information to another external circuitry for processing, providing to a physician for review, and controlling access, as discussed above.

In one or more additional communication modes, the scale outputs raw sensor data to an external circuitry for further processing. For example, during a second communication mode and a third communication, the scale sends the raw sensor data and other data to external circuitry for processing, such as to a remote user-physiological device for correlation and processing. Using the above-provided example, a third user of the scale has a user profile set up that indicates the third user would like scale-obtained data to be communicated to a remote user-physiological device for further processing, such as to correlate the cardio-data sets and/or further process the correlated data sets. When the third user stands on the scale, the scale recognizes the third user based on one or more biometrics and operates in a second communication mode. During the second communication mode, the scale outputs the raw sensor data to the remote user-physiological device. The remote user-physiological device correlates the raw sensor data from the scale with cardio-physiological data from the remote user-physiological device, determines at least one physiological parameter of the user, and, optionally, derives additional health information. In some embodiments, the remote user-physiological device outputs data, such as the physiological parameter or additional health information to the scale. The scale, in some embodiments, displays a synopsis of the additional health information and outputs a full version of the additional health information to another user device for display (such as, using the filter described above) and/or an indication that additional health information can be accessed.

A fourth user of the scale has a user profile set up that indicates the fourth user has enabled a service to access regulated health information. When the fourth user stands on the scale, the scale recognizes the user based on one or more biometrics and operates in a fourth communication mode. In the fourth communication mode, the scale outputs raw sensor data to the external circuitry, and the external circuitry processes the raw sensor data and controls access to the data. For example, the external circuitry may not allow access to the regulated health information until a physician reviews the information. In some embodiments, the external circuitry outputs data to the scale, in response to physician review. For example, the output data can include the regulated health information and/or an indication that regulated health information is ready for review. The external circuitry may be accessed by the user, using the scale and/or another user device. In some embodiments, using the FUI of the scale, the scale displays the regulated health information to the user. The scale, in some embodiments, displays a synopsis of the regulated health information (e.g., clinical indication) and outputs the full version of regulated health information to another user device for display (such as, using the filter described above) and/or an indication that the regulated health information can be accessed to the scale to display. In various embodiments, if the scale is unable to identify a particular (high security) biometric that enables the fourth communication mode, the scale may operate in a different communication mode and may still recognize the user. For example, the scale may operate in a default communication mode in which the user data collected by the scale is stored in a user profile corresponding to the fourth user and on the scale. In some related embodiments, the user data is output to the external circuitry at a different time.

Although the present embodiments illustrates a number of security and communication modes, embodiments in accordance with the present disclosure can include additional or fewer modes. Furthermore, embodiments are not limited to different modes based on different users. For example, a single user may enable different communication modes in response to particular biometrics of the user identified and/or based on user settings in a user profile.

In various embodiments, the scale defines a user data table that defines types of user data and sensitivity values of each type of user data. In specific embodiments, the FUI displays the user data table. In other specific embodiments a user interface of a smartphone, tablet, and/or other computing device displays the user data table. For example, a wired or wireless tablet is used, in some embodiments, to display the user data table. The sensitivity values of each type of user data, in some embodiments, define in which communication mode(s) the data type is communicated and/or which biometric is used to enable communication of the data type. In some embodiments, a default or preset user data table is displayed and the user revises the user data table using the FUI. The revisions are in response to user inputs using the user's foot and/or contacting or moving relative to the FUI. Although the embodiments are not so limited, the above (and below) described control and display is provided using a wireless or wired tablet or other computing device as a user interface. The output to the wireless or wired tablet, as well as additional external circuitry, is enabled using biometrics. For example, the user is encouraged, in particular embodiments, to configure the scale with various biometrics. The biometric include scale-based biometrics and biometrics from the tablet or other user computing device. The biometric, in some embodiments, used to enable output of data to the tablet and/or other external circuitry includes a higher integrity biometric (e.g., higher likelihood of identifying the user accurately) than a biometric used to identify the user and stored data on the scale.

An example user data table is illustrated below:

| User-data Type | Weight | Body Mass Index | User-Specific Advertisements | Physician-Provided Diagnosis/ Reports | Scale-stored suggestions (symptom & diagnosis) |
|---|---|---|---|---|---|
| Sensitivity (10 = highest, 1 = lowest) | 1 | 3 | 5 | 10 | 9 |

The above-displayed table is for illustrative purposes and embodiments in accordance with the present disclosure can include additional user-data types than illustrated, such as cardiogram characteristics, clinical indications, physiological parameters, user goals, demographic information, etc. In various embodiments, the user data table includes additional rows than illustrated. The rows, in specific embodiments, include different data input sources and/or sub-data types (as discussed below). Data input sources include source of the data, such as physician provided, input from the Internet, user provided, from the external circuitry. The different data from the data input sources, in some embodiments, is used alone or in combination.

In accordance with various embodiments, the scale uses a cardiogram of the user and/or other scale-obtained biometrics to differentiate between two or more users. The scale-obtained data includes health data that is user-sensitive, such that unintentional disclosure of scale-obtained data is not desired. Differentiating between the two or more users and automatically communicating (e.g., without further user input) user data responsive to scale-obtained biometrics, in various embodiments, provides a user-friendly and simple way to communicate data from a scale while avoiding and/or mitigating unintentional (and/or without user consent) communication. For example, the scale, such as during an initialization mode for each of the two or more users and as previously discussed, collects user data to identify the scale-based biometrics and stores an indication of the scale-based biometrics in a user profile corresponding with the respective user. During subsequent measurements, the scale 100 recognizes the particular user by comparing collected signals to the indication of the scale-based biometrics in the user profile. The scale, for example, compares the collected signals to each user profile of the two or more users and identifies a match between the collected signals and the indication of the scale-based biometrics. A match, in various embodiments, is within a range of values of the indication stored. Further, in response to verifying the scale-based biometric(s), a particular communication mode is authorized.

In accordance with a number of embodiments, the scale 100 identifies one or more of the multiple users of the scale 100 that have priority user data. The user data with a priority, as used herein, includes an importance of the user and/or the user data. In various embodiments, the importance of the user is based on parameter values identified and/or user goals, such as the user is an athlete and/or is using the scale to assist in training for an event (e.g., marathon) or is using the scale for other user goals (e.g., a weight loss program). Further, the importance of the user data is based on parameters values and/or user input data indicating a diagnosis of a condition or disease and/or a risk of the user having the condition or disease based on the scale-obtained data. For example, the scale-obtained data of a first user indicates that the user is overweight, recently had an increase in weight, and has a risk of having atrial fibrillation. The first user is identified as a user corresponding with priority user data. A second user of the scale 100 has scale-obtained data indicating a decrease in recovery parameters (e.g., time to return to baseline parameters) and the user inputs an indication that they are training for a marathon. The second user is also identified as a user corresponding with priority user data. The scale 100 displays indications to a user with the priority user data, in some embodiments, on how to use to the scale 100 to communicate the user data to external circuitry 112 for further processing, correlation, and/or other features, such as social network connections. Further, the scale, in response to the priority, displays various feedback to the user, such as user-targeted advertisements and/or suggestions. In some embodiments, only users with priority user data have data output to the external circuitry 112 to determine risks, although embodiments in accordance with the present disclosure are not so limited.

In some embodiments, one or more users of the scale 100 have multiple different scale-obtained biometrics used to authorize different communication modes. The different scale-obtained biometrics are used to authorize communication of different levels of sensitive user data, such as the different user-data types and sensitivity values as illustrated in the above-table. For example, in some specific embodiments, the different scale-obtained biometrics include a high security biometric, a medium security biometric, and a low security biometric. Using the above illustrated table as an example, the three different biometrics are used to authorize communication of the user-data types of the different sensitivity values. For instance, the high security biometric authorizes communication of user-data types with sensitivity values of 8-10, the medium security biometric authorizes communication of user-data types with sensitivity values of 4-7, and the low security biometric authorizes communication of user-data types with sensitivity values of 1-3. The user, in some embodiments, can adjust the setting of the various biometrics and authorization of user-data types.

In a specific example, low security biometrics includes estimated weight (e.g., a weight range), and a toe tap on the foot-controlled user interface. Example medium security biometrics includes one or more the low security biometrics in addition to length and/or width of the user's foot, and/or a time of day or location of the scale 100. For example, as illustrated by FIGS. 2 and 13 and discussed with regard to FIG. 3c, the scale 100 includes impedance electrodes that are interleaved and engage the feet of the user. The interleaved electrodes assist in providing measurement results that are indicative of the foot length, foot width, and type of arch. Further, a specific user, in some embodiments, may use the scale 100 at a particular time of the day and/or authorize communication of data at the particular time of the day, which is used to verify identity of the user and authorize the communication. The location of scale 100, in some embodiments, is based on GPS coordinates and/or a Wi-Fi code. For example, if the scale 100 is moved to a new house, the Wi-Fi code used to communicate data externally from the scale 100 changes. Example high security biometrics include one or more low security biometrics and/or medium security biometrics in addition to cardiogram characteristics and, optionally, a time of day and/or heart rate. Example cardiogram characteristics include a QRS complex, and QRS complex and P/T wave.

In various embodiments, the user adjusts the table displayed above to revise the sensitivity values of each data type. Further, although the above-illustrated table includes a single sensitivity value for each data type, in various embodiments, one or more of the data types are separated into sub-data types and each sub-data type has a sensitivity value. As an example, the user-specific advertisement is separated into: prescription advertisement, external device advertisements, exercise advertisements, and diet plan advertisement. Alternatively and/or in addition, the sub-data types for user-specific advertisement include generic advertisements based on a demographic of the user and advertisements in response to scale collected data (e.g., advertisement for a device in response to physiologic parameters), as discussed further herein.

For example, weight data includes the user's weight and historical weight as collected by the scale. In some embodiments, weight data includes historical trends of the user's weight and correlates to dietary information and/or exercise information, among other user data. Body mass index data, includes the user's body mass index as determined using the user's weight collected by the scale and height. In some embodiments, similar to weight, body mass index data includes history trends of the user's body mass index and correlates to various other user data.

User-specific advertisement data includes various prescriptions, exercise plans, dietary plans, and/or other user devices and/or sensors for purchase, among other advertisements. The user-specific advertisements, in various embodiments, are correlated to input user data and/or scale-obtained data. For example, the advertisements include generic advertisements that are relevant to the user based on a demographic of the user. Further, the advertisements include advertisements that are responsive to scale collected data (e.g., physiological parameter includes a symptom or problem and advertisement is correlated to the symptom or problem). A number of specific examples include advertisements for beta blockers to slow heart rate, advertisements for a peripheral device (e.g., Fitbit) to monitor heart rate, and advertisements for a marathon exercise program (such as in response to an indication the user is training for a marathon), etc.

Physician provided diagnosis/report data includes data provided by a physician and, in various embodiments, is in responsive to the physician reviewing the scale-obtained data. For example, the physician provided diagnosis/report data includes diagnosis of a disorder/condition by a physician, prescription medication prescribed by a physician, and/or reports of progress by a physician, among other data. In various embodiments, the physician provided diagnosis/ reports are provided to the scale from external circuitry, which includes and/or accesses a medical profile of the user.

Scaled stored suggestion data includes data that provides suggestions or advice for symptoms, diagnosis, and/or user goals. For example, the suggestions include advice for training that is user specific (e.g., exercise program based on user age, weight, and cardiogram data or exercise program for training for an event or reducing time to complete an event, such as a marathon), suggestions for reducing symptoms including dietary, exercise, and sleep advice, and/or suggestions to see a physician, among other suggestions. Further, the suggestions or advice include reminders regarding prescriptions. For example, based on physician provided diagnosis/report data and/or user inputs, the scale identifies the user is taking a prescription medication. The identification includes the amount and timing of when the user takes the medication, in some embodiments. The scale reminds the user and/or asks for verification of consumption of the prescription medication using the FUI.

As further specific examples, recent discoveries may align and associate different attributes of scale-based user data collected by the scale to different tools, advertisements, and physician provided diagnosis. For example, it has recently been discovered that atrial fibrillation is more directly correlated with obesity. The scale collects various user data and monitors weight and various components/symptoms of atrial fibrillation. In a specific embodiment, the scale recommends/suggests to the user to: closely monitor weight, recommends a diet, goals for losing weight, and correlates weight gain and losses for movement in cardiogram data relative to arrhythmia. The movement in cardiogram data relative to arrhythmia, in specific embodiments, is related to atrial fibrillation. For example, atrial fibrillation is associated with indiscernible p-waves and beat to beat fluctuations. Thereby, the scale correlates weight gain/loss with changes in amplitude (e.g., discernibility) of a p-wave of a cardiogram (preceding a QRS complex) and changes in beat to beat fluctuations.

Further, the scale can perform various security measures on the sensitive user data as aggregated from the scale and the peripheral device. For example, the scale performs encryption techniques on the data, has a hardware key and/or a software key. In various embodiments, the encryption scheme includes an asymmetric or symmetric key and the user data and/or the identifier is encrypted using an asymmetric or symmetric key cryptography. For example, the scale may not allow the ability to add additional applications or software to the circuitry (or the user may choose not to) and, thus, is more secure than if additional applications or software were added. In such embodiments, a symmetric key is used.

In various embodiments, a symmetric key is used by each scale using symmetric encryption. The key is randomly assigned by the scale instead of derived using a single key. A table of identifiers to keys is stored at the external circuitry (e.g., the second database). With symmetric encryption, the key and/or other data is encrypted by changing the data in a particular way. For example, the data is encrypted by shifting each letter or number by a number of places. Both the scale and the external circuitry know the symmetric key used to decode the data. Thereby, the symmetric key is a shared secret (e.g., piece of data known to the scale and to the external circuitry). The shared secret is known by the external circuitry before or at the start of the communication session.

Alternatively, an asymmetric key is used, which is sometimes referred to as a public key. With asymmetric key cryptography, there are two keys: a private key and a public key. The scale contains the only instance of the private key, which is kept secret, and the public key is provided to the external circuitry. Any message encrypted using the private key is decrypted using the matching public key and any message encrypted using the public key is decrypted by using the private key. The external circuitry contains a list of identifiers to public key mappings. The proof-of-identity supplied by the scale in the exchange is its identifier, as well as information to show authenticity and freshness of the message encrypted with its private key. To verify the user data, the external system looks up the public key and identifies that only the private key on the scale would create a message matching the known public key.

In various embodiments, the scale includes a hardware token that encrypts the data using a hardware security key generated using the hardware token. For example, the scale includes a hardware token and the external circuitry verifies authorization of the user data based on the hardware security key generated using the hardware token.

In accordance with a number of embodiments, the levels of verification and the security measures are provided by the scale based on the level of sensitivity of the data. For example, in response to a data communicate of a high sensitivity, the scale verifies identity of the user using a high level biometric, encrypts the data using a symmetric key encryption and adds a key using a hardware token. If the data is of a medium sensitivity, the scale verifies the identity of the user using a medium level biometric and encrypts the data using a symmetric key encryption. If the data is a low sensitivity, the scale verifies the identity of the user using a low level biometric. Embodiments are not limited to the specific example given and can include various combinations of biometric levels and other data security measures.

Figure 19B:
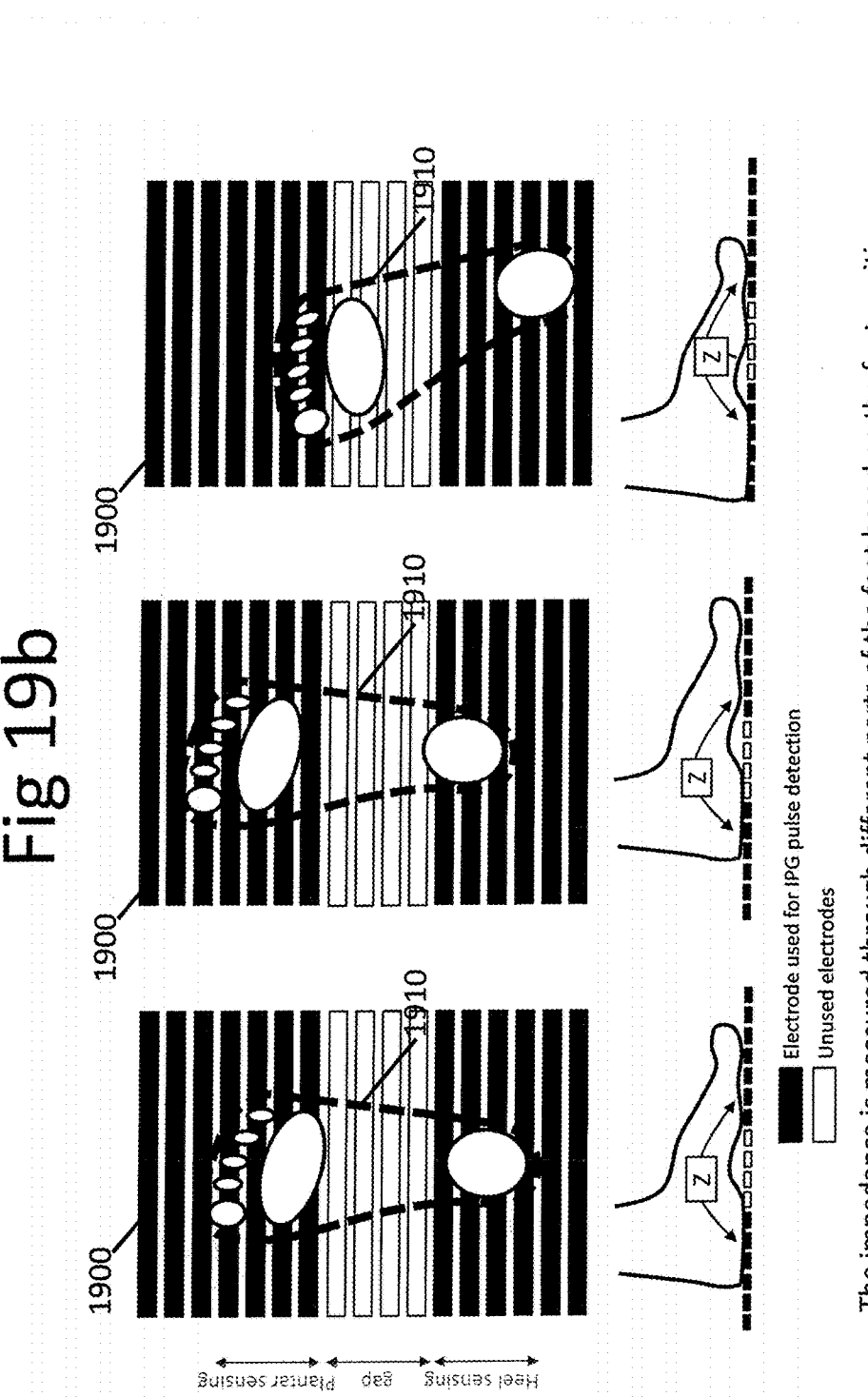

FIGS. 19*a-c* show example impedance as measured through different parts of the foot based on the foot position, consistent with various aspects of the present disclosure. For instance, example impedance measurement configurations may be implemented using a dynamic electrode configuration for measurement of foot impedance and related timings. Dynamic electrode configuration may be implemented using independently-configurable electrodes to optimize the impedance measurement. As shown in FIG. 19*a*, interleaved electrodes 1900 are connected to an impedance processor circuit 1905 to determine foot length, foot position, and/or foot impedance. As is shown in FIG. 19*b*, an impedance measurement is determined regardless of foot position 1910 based on measurement of the placement of the foot across the electrodes 1900. This is based in part in the electrodes 1900 that are engaged (blackened) and in contact with the foot (based on the foot position 1910), which is shown in FIG. 19*c*.

More specifically regarding FIG. 19*a*, configuration includes connection/de-connection of the individual electrodes 1900 to the impedance processor circuit 1905, their configuration as current-carrying electrodes (injection or return), sense electrodes (positive or negative), or both. The configuration is preset based on user information, or updated at each measurement (dynamic reconfiguration) to optimize a given parameter (impedance SNR, measurement location). The system algorithmically determines which electrodes under the foot to use in order to obtain the highest SNR in the pulse impedance signal. Such optimization algorithm may include iteratively switching configurations and measuring the impedance, and selecting the best suited configuration. Alternatively, the system first, through a sequential impedance measurement between each individual electrode 1900 and another electrode in contact with the body (such as an electrode in electrode pair 205 on the other foot), determine which electrodes are in contact with the foot. By determining the two most apart electrodes, the foot size is determined. Heel location can be determined in this manner, as can other characteristics such as foot arch type. These parameters are used to determine programmatically (in an automated manner by CPU/logic circuitry) which electrodes are selected for current injection and return (and sensing if a Kelvin connection issued) to obtain the best foot IPG.

In various embodiments involving the dynamically reconfigurable electrode array 1900/1905, an electrode array set is selected to measure the same portion/segment of the foot, irrespective of the foot location on the array. FIG. 19*b* illustrates the case of several foot positions on a static array (a fixed set of electrodes are used for measurement at the heel and plantar/toe areas, with a fixed gap of an inactive electrode or insulating material between them). Depending on the position of the foot, the active electrodes are contacting the foot at different locations, thereby sensing a different volume/segment of the foot. If the IPG is used by itself (e.g., for heart measurement), such discrepancies may be non-consequential. However, if timings derived from the IPG are referred to other timings (e.g., R-wave from the ECG, or specific timing in the BCG), such as for the calculation of a PTT or PWV, the small shifts in IPG timings due to the sensing of slightly different volumes in the foot (e.g., if the foot is not always placed at the same position on the electrodes) can introduce an error in the calculation of the interval. With respect to FIG. 19*b*, the timing of the peak of the IPG from the foot placement on the right (sensing the toe/plantar region) is later than from the foot placement on the left, which senses more of the heel volume (the pulse reaches first the heel, then the plantar region). Factors influencing the magnitude of these discrepancies include foot shape (flat or not) and foot length.

Various embodiments address challenges relating to foot placement. FIG. 19*c* shows an example embodiment involving dynamic reconfiguration of the electrodes to reduce such foot placement-induced variations. As an example, by sensing the location of the heel first (as described above), it is possible to activate a subset of electrodes under the heel, and another subset of electrodes separated by a fixed distance (1900). The other electrodes (e.g., unused electrodes) are left disconnected. The sensed volume will therefore be the same, producing consistent timings. The electrode configuration leading to the most consistent results may be informed by the foot impedance, foot length, the type of arch (all of which can be measured by the electrode array as shown above), but also by the user ID (foot information can be stored for each user, then looked up based on automatic user recognition or manual selection (e.g., in a look-up-table stored for each user in a memory circuit accessible by the CPU circuit in the scale).

In certain embodiments, the apparatus measures impedance using a plurality of electrodes contacting one foot and with at least one other electrode (typically many) at a location distal from the foot. The plurality of electrodes (contacting the one foot) is arranged on the platform and in a pattern configured to inject current signals and sense signals in response thereto, for the same segment of the foot so that the timing of the pulse-based measurements does not vary because the user placed the one foot at a slightly different position on the platform or scale. In FIG. 19*a*, the foot-to-electrode locations for the heel are different locations than that shown in FIGS. 19*b* and 19*c*. As this different foot placement can occur from day to day for the user, the timing and related impedance measurements are for the same (internal) segment of the foot. By having the processor circuit inject current and sense responsive signals to first locate the foot on the electrodes (e.g., sensing where positions of the foot's heel plantar regions and/or toes), the pattern of foot-to-electrode locations permits the foot to move laterally, horizontally and both laterally and horizontally via the different electrode locations, while collecting impedance measurements relative to the same segment of the foot.

The BCG/IPG system can be used to determine the PTT of the user, by identification of the average I-Wave or derivative timing near the I-Wave from a plurality of BCG heartbeat signals obtained simultaneously with the Dual-IPG measurements of the present disclosure to determine the relative PTT along an arterial segment between the ascending aortic arch and distal pulse timing of the user's lower extremity. In certain embodiments, the BCG/IPG system is used to determine the PWV of the user, by identification of the characteristic length representing the length of the user's arteries, and by identification of the average I-Wave or derivative timing near the I-Wave from a plurality of BCG heartbeat signals obtained simultaneously with the Dual-IPG measurements of the present disclosure to determine the relative PTT along an arterial segment between the ascending aortic arch and distal pulse timing of the user's lower extremity. The system of the present disclosure and alternate embodiments may be suitable for determining the arterial stiffness (or arterial compliance) and/or cardiovascular risk of the user regardless of the position of the user's feet within the bounds of the interleaved electrodes. In certain embodiments, the weighing scale system incorporated the use of strain gage load cells and six or eight electrodes to measure a plurality of signals including: bodyweight, BCG, body mass index, fat percentage, muscle mass percentage, and body water percentage, heart rate, heart rate variability, PTT, and PWV measured simultaneously or synchronously when the user stands on the scale to provide a comprehensive analysis of the health and wellness of the user.

In other certain embodiments, the PTT and PWV are computed using timings from the Leg IPG or Foot IPG for arrival times, and using timings from a sensor located on the upper body (as opposed to the scale measuring the BCG) to detect the start of the pulse. Such sensor may include an impedance sensor for impedance cardiography, a hand-to-hand impedance sensor, a photoplethysmogram on the chest, neck, head, arms or hands, or an accelerometer on the chest (seismocardiograph) or head.

Communication of the biometric information is another aspect of the present disclosure. The biometric results from the user are stored in the memory on the scale and displayed to the user via a display on the scale, audible communication from the scale, and/or the data is communicated to a peripheral device such as a computer, smart phone, tablet computing device. The communication occurs to the peripheral device with a wired connection, or can be sent to the peripheral device through wireless communication protocols such as Bluetooth or WiFi. Computations such as signal analyses described therein may be carried out locally on the scale, in a smartphone or computer, or in a remote processor (cloud computing).

Other aspects of the present disclosure are directed toward apparatuses or methods that include the use of at least two electrodes that contacts feet of a user. Further, circuitry is provided to determine a pulse arrival time at the foot based on the recording of two or more impedance signals from the set of electrodes. Additionally, a second set of circuitry is provided to extract a first pulse arrival time from a first impedance signal and use the first pulse arrival time as a timing reference to extract and process a second pulse arrival time in a second impedance signal.

Reference may also be made to published patent documents, U.S. Patent Publication 2010/0094147 and U.S. Patent Publication 2013/0310700, which are, together with the references cited therein, herein fully incorporated by reference for the purposes of sensors and sensing technology. The aspects discussed therein may be implemented in connection with one or more of embodiments and implementations of the present disclosure (as well as with those shown in the figures). In view of the description herein, those skilled in the art will recognize that many changes may be made thereto without departing from the spirit and scope of the present disclosure.

As illustrated herein, various circuit-based building blocks and/or modules may be implemented to carry out one or more of the operations/activities described herein shown in the block-diagram-type figures. In such contexts, these building blocks and/or modules represent circuits that carry out these or related operations/activities. For example, in certain embodiments discussed above (such as the pulse circuitry modularized as shown in FIGS. 3a-b), one or more blocks/modules are discrete logic circuits or programmable logic circuits for implementing these operations/activities, as in the circuit blocks/modules shown. In certain embodiments, the programmable circuit is one or more computer circuits programmed to execute a set (or sets) of instructions (and/or configuration data). The instructions (and/or configuration data) can be in the form of firmware or software stored in and accessible from a memory circuit. As an example, first and second modules/blocks include a combination of a CPU hardware-based circuit and a set of instructions in the form of firmware, where the first module/block includes a first CPU hardware circuit with one set of instructions and the second module/block includes a second CPU hardware circuit with another set of instructions.

Based upon the above discussion and illustrations, those skilled in the art will readily recognize that various modifications and changes may be made to the present disclosure without strictly following the exemplary embodiments and applications illustrated and described herein. For example, the input terminals as shown and discussed may be replaced with terminals of different arrangements, and different types and numbers of input configurations (e.g., involving different types of input circuits and related connectivity). Such modifications do not depart from the true spirit and scope of the present disclosure, including that set forth in the following claims.

What is claimed is:

1. An apparatus comprising:
a weighing-scale platform and weighing-scale housing configured and arranged for a user to stand on the platform;
in the housing, a plurality of sensors and sensor-data processing circuitry configured and arranged to collect a first set of physiological data from the plurality of sensors and specific to the user while the user is standing on the platform, the first set of physiological data from the user having a time-based interval or time-based metric; and
data-assimilation circuitry being configured and arranged to provide synchronization by:
identifying and connecting to a peripheral device including physiological-measuring circuitry with a second set of physiological data, the second set of physiological data being from and specific to the user and being subject to time-based inaccuracies relative to the time-based interval or time-based metric, and
while accounting for the time-based inaccuracies, comparing aspects of the first and second sets of physiological data and therein correcting for the time-based inaccuracies between the first and second sets of physiological data using a time reference message shared between the platform and the peripheral device.

2. The apparatus of claim 1, further including communication circuitry configured and arranged to output the time reference message to the peripheral device requesting a time stamp and to receive a return message from the peripheral device with the time stamp, the data-assimilation circuitry configured and arranged to determine a time adjustment for the second set of physiological data based on the time stamp in the return message and a time-latency associated with the peripheral device.

3. The apparatus of claim 1, wherein the data-assimilation circuitry is configured and arranged to provide the synchronization responsive to verification of identification of the user by the peripheral device within a threshold period of time.

4. The apparatus of claim 1, further including the peripheral device having at least one accelerometer, and configured and arranged to output a signal indicative of impact of the peripheral device in response to a mechanical input caused by interaction between the peripheral device and the weighing-scale platform, which wherein the data-assimilation circuitry is configured and arranged to provide synchronization in response to receiving the output signal.

5. An apparatus comprising:
a weighing-scale platform and weighing-scale housing configured and arranged for a user to stand on the platform;
in the housing, a plurality of sensors and sensor-data processing circuitry configured and arranged to collect a first set of physiological data from the plurality of sensors and specific to the user while the user is standing on the platform, the first set of physiological data from the user having an accuracy component that is dependent on or defined using a time-based interval or time-based metric; and
data-assimilation circuitry being configured and arranged to provide synchronization by:
accessing a profile having information for identifying the user in response to the user standing on the platform,
accessing an indication of the time-based interval or metric derived from the first set of physiological data specific to the user,
identifying a peripheral device including physiological-measuring circuitry with a second set of physiological data, the second set of physiological data being from and specific to the user and being subject to time-based inaccuracies, and while accounting for the time-based inaccuracies, comparing aspects of the first and second sets of physiological data.

6. The apparatus of claim 5, wherein the data-assimilation circuitry is further configured and arranged to synchronize the second set of physiological data with the first set of physiological data based on the time-based interval or time-based metric.

7. The apparatus of claim 5, further including communication circuitry configured and arranged to output a message to the peripheral device requesting a time stamp and receive a return message from the peripheral device with the time stamp, the data-assimilation circuitry configured and arranged to determine a time adjustment for the second set of physiological data based on the time stamp in the return message and a time-latency associated with the peripheral device receiving the message.

8. The apparatus of claim 7, wherein the data-assimilation circuitry is configured and arranged to suggest the time adjustment to the peripheral device to time-synchronize with the peripheral device.

9. The apparatus of claim 7, wherein the data-assimilation circuitry is further configured and arranged to determine the time-latency associated with the peripheral device, the time-latency including an amount of time that has passed from when the communication circuitry outputs the message and when the peripheral device receives the message.

10. The apparatus of claim 9, wherein data-assimilation circuitry is configured and arranged to determine the time-latency based on a time according to the communication circuitry that the message was output, a time according to the communication circuitry that the return message is received, a time according to the peripheral device that the message is received, and a time according to the peripheral device that the return message is output.

11. The apparatus of claim 5, wherein the data-assimilation circuitry is located in the housing and integrated with the sensor-data processing circuitry.

12. The apparatus of claim 5, further including communication circuitry and wherein the data-assimilation circuitry is remote from the weighing-scale platform and housing and communicatively coupled thereto via a communication channel defined by the communication circuitry.

13. The apparatus of claim 5, further including the peripheral device having at least one accelerometer, and configured and arranged to output a signal indicative of movement of the peripheral device in response to a user dropping the peripheral device on the weighing-scale platform, wherein the data-assimilation circuitry is configured and arranged to provide synchronization in response to receiving the output signal.

14. The apparatus of claim 5, wherein the data-assimilation circuitry is configured and arranged to provide the synchronization responsive to verification of identification of the user by the data-assimilation circuitry and the peripheral device within a threshold period of time.

15. The apparatus of claim 5, wherein the data-assimilation circuitry is configured and arranged to communicate with the peripheral device via a direct communication include a communication selected from the group consisting of: Near Field Communication (NFC), Bluetooth, and wireless.

16. An apparatus comprising:

a weighing-scale platform and weighing-scale housing configured and arranged for a user to stand on the platform;

in the housing, a plurality of sensors and sensor-data processing circuitry configured and arranged to collect a first set of physiological data from the plurality of sensors and specific to the user while the user is standing on the platform, the first set of physiological data from the user being combinable with a second set of physiological data from a peripheral device to derive additional physiological data that is defined using a time-based interval or time-based metric; and data-assimilation circuitry being configured and arranged to provide synchronization between the first set of physiological data and the second set of physiological data by:

identifying and connecting to a peripheral device including physiological-measuring circuitry configured and arranged to collect the second set of physiological data, the second set of physiological data being from and specific to the user and being subject to time-based inaccuracies relative to the time-based interval or time-based metric;

providing a time reference message shared between the weighing-scale platform and the peripheral device to assess the time-based interval or time-based metric; and using the shared time reference message, comparing aspects of the first and second sets of physiological data and therein correcting for time-based inaccuracies between the first and second sets of physiological data.

17. The apparatus of claim 16, further including communication circuitry configured and arranged to output the time reference message to the peripheral device requesting a time stamp and receive a return message from the peripheral device with the time stamp, the data-assimilation circuitry configured and arranged to determine a time adjustment for the second set of physiological data based on the time stamp in the return message and a time-latency associated with the peripheral device.

18. The apparatus of claim 17, wherein the data-assimilation circuitry is further configured and arranged to determine the time-latency associated with the peripheral device, the time-latency including an amount of time that has passed from when the scale outputs the message and when the peripheral device receives the time-reference message.

19. The apparatus of claim 18, wherein data-assimilation circuitry is configured and arranged to determine the time-latency based on a time according to the scale that the message was output, a time according to the scale that the return message is received, a time according to the peripheral device that the time-reference message is received, and a time according to the peripheral device that the return message is output.

20. The apparatus of claim 16, wherein the time reference message is a radio frequency signal transmitted between the weighing-scale platform and the peripheral device.

21. The apparatus of claim 16, wherein the time reference message is an acoustic signal transmitted between the weighing-scale platform and the peripheral device.

22. The apparatus of claim 16, wherein the time reference message is an optical signal transmitted between the weighing-scale platform and the peripheral device.

23. The apparatus of claim 16, wherein the time reference message is a mechanical input signal transmitted between the weighing-scale platform and the peripheral device, the mechanical input signal being caused by mechanically contacting together the weighing-scale platform and peripheral device.

24. A method for use with a weighing-scale platform and weighing-scale housing having a plurality of sensors and sensor-data processing circuitry configured to interact with a user while the user stands on the platform, the method comprising:

collecting a first set of physiological data from the plurality of sensors and specific to the user, the first set of physiological data obtained while the user is standing on the platform;

combining the first set of physiological data from the user with a second set of physiological data from a peripheral device to derive additional physiological data that is defined using a time-based interval or time-based metric; and via data-assimilation circuitry, providing synchronization between the first set of physiological data and the second set of physiological data by:

identifying and connecting to a peripheral device including physiological-measuring circuitry configured and arranged to collect the second set of physiological data, the second set of physiological data being from and specific to the user and being subject to time-based inaccuracies relative to the time-based interval or time-based metric;

providing a time reference message shared between the weighing-scale platform and the peripheral device to assess the time-based interval or time-based metric; and using the shared time reference message, comparing aspects of the first and second sets of physiological data and therein correcting for time-based inaccuracies between the first and second sets of physiological data.

\* \* \* \* \*